US011128528B2

(12) United States Patent
Nolan et al.

(10) Patent No.: US 11,128,528 B2
(45) Date of Patent: Sep. 21, 2021

(54) DECENTRALIZED DATA STORAGE AND PROCESSING FOR IOT DEVICES

(71) Applicant: INTEL CORPORATION, Santa Clara, CA (US)

(72) Inventors: Keith Nolan, Mullingar (IE); Mark Kelly, Leixlip (IE); Michael Nolan, Maynooth (IE); Davide Carboni, London (GB); John Brady, Celbridge (IE); Niall Cahill, Galway (IE); Ned M. Smith, Beaverton, OR (US); Gregory Burns, Seattle, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/466,987

(22) PCT Filed: Dec. 28, 2017

(86) PCT No.: PCT/US2017/068806
§ 371 (c)(1),
(2) Date: Jun. 5, 2019

(87) PCT Pub. No.: WO2018/126065
PCT Pub. Date: Jul. 5, 2018

(65) Prior Publication Data
US 2019/0349733 A1    Nov. 14, 2019

Related U.S. Application Data

(60) Provisional application No. 62/441,070, filed on Dec. 30, 2016.

(51) Int. Cl.
*H04L 12/24*    (2006.01)
*H04W 12/69*    (2021.01)
(Continued)

(52) U.S. Cl.
CPC ...... *H04L 41/0806* (2013.01); *G06F 16/1824* (2019.01); *G06F 16/1834* (2019.01);
(Continued)

(58) Field of Classification Search
CPC ............ H04L 41/0806; H04L 61/1505; H04L 61/2069; H04L 67/1046; H04L 67/1093;
(Continued)

(56) References Cited

U.S. PATENT DOCUMENTS 5,644,717 A * 7/1997 Clark ................. H04L 43/0864
709/224
6,058,383 A    5/2000 Narasimhalu et al.
(Continued)

FOREIGN PATENT DOCUMENTS

CN          1472937 A  *  2/2004
CN        101990238       3/2011
(Continued)

OTHER PUBLICATIONS

International Search Report for related PCT Application PCT/US2017068806 with a completion date of Mar. 14, 2018 and dated Mar. 21, 2018, 3 pages.
(Continued)

*Primary Examiner* — Harry H Kim
(74) *Attorney, Agent, or Firm* — Hanley, Flight & Zimmerman, LLC

(57) ABSTRACT

An Internet of Things (IoT) network includes an IoT device with data manager, data classifier, and data mapper; or includes IoT device with bloom filter, blockchain logic, content creator, and search manager; or includes IoT device with device connector, namespace discoverer, partition creator, service advertiser, and data router; or includes IoT device with IoT network topology identifier, IoT node resource identifier, neural network topology identifier, map-
(Continued)

ping optimizer, and decomposable task processor; or includes IoT device with blockchain logic, Merkle tree with hash code entries, and locator to search the Merkle tree; or includes IoT device with bloom filter topic list, subscription manager, and content locator; or includes IoT device with topic classifier to determine if topic includes encrypted content, notifier of the encrypted content, and key subscriber; or includes IoT device with an attestator to provide group membership credential and a subscriber to supply bloom filter and receive a key.

20 Claims, 51 Drawing Sheets

(51) Int. Cl.
| | |
|---|---|
| H04L 29/12 | (2006.01) |
| H04L 29/08 | (2006.01) |
| H04L 29/06 | (2006.01) |
| H04W 4/70 | (2018.01) |
| G06F 16/182 | (2019.01) |
| H04L 9/08 | (2006.01) |
| H04L 9/32 | (2006.01) |
| H04L 12/733 | (2013.01) |
| H04W 4/08 | (2009.01) |
| H04W 84/22 | (2009.01) |
| H04W 84/18 | (2009.01) |

(52) U.S. Cl.
CPC .......... *H04L 9/0825* (2013.01); *H04L 9/3239* (2013.01); *H04L 41/12* (2013.01); *H04L 45/20* (2013.01); *H04L 61/1505* (2013.01); *H04L 61/2069* (2013.01); *H04L 67/10* (2013.01); *H04L 67/104* (2013.01); *H04L 67/1046* (2013.01); *H04L 67/1093* (2013.01); *H04L 67/12* (2013.01); *H04L 67/2809* (2013.01); *H04L 69/18* (2013.01); *H04L 69/22* (2013.01); *H04W 4/08* (2013.01); *H04W 4/70* (2018.02); *H04W 12/69* (2021.01); *H04W 84/22* (2013.01); *H04L 2209/38* (2013.01); *H04L 2209/56* (2013.01); *H04W 84/18* (2013.01)

(58) Field of Classification Search
CPC . H04L 67/2809; H04L 69/22; H04L 2209/56; H04L 9/0825; H04L 9/3239; H04L 45/20; H04L 67/104; H04L 69/18; H04L 41/12; H04L 67/10; H04L 67/12; H04L 2209/38; G06F 16/1824; G06F 16/1834; H04W 12/0052; H04W 4/70; H04W 12/0051; H04W 4/08; H04W 84/22; H04W 84/18
See application file for complete search history.

(56) References Cited

U.S. PATENT DOCUMENTS

| | | | |
|---|---|---|---|
| 6,678,888 B1 | 1/2004 | Sakanishi | |
| 7,424,602 B2 | 9/2008 | Reiss et al. | |
| 8,345,701 B1* | 1/2013 | Davis | H04L 49/10 370/412 |
| 8,918,775 B1 | 12/2014 | Carpenter et al. | |
| 8,996,459 B2 | 3/2015 | Arthursson et al. | |
| 10,185,550 B2 | 1/2019 | Smith et al. | |
| 2004/0081203 A1 | 4/2004 | Sodder et al. | |
| 2007/0157170 A1 | 7/2007 | Reiss et al. | |
| 2007/0233881 A1 | 10/2007 | Nochta et al. | |
| 2007/0277237 A1* | 11/2007 | Adelman | H04L 41/145 726/22 |
| 2012/0210066 A1 | 8/2012 | Joshi et al. | |
| 2013/0036328 A1 | 2/2013 | Mutisya et al. | |
| 2013/0055233 A1 | 2/2013 | Hatton et al. | |
| 2013/0159447 A1* | 6/2013 | Wei | H04L 41/0886 709/208 |
| 2013/0301641 A1* | 11/2013 | Anand | H04L 63/0263 370/389 |
| 2015/0095899 A1 | 4/2015 | Carpenter et al. | |
| 2015/0156266 A1 | 6/2015 | Gupta | |
| 2015/0244690 A1 | 8/2015 | Mossbarger | |
| 2016/0182497 A1 | 6/2016 | Smith | |
| 2016/0191345 A1 | 6/2016 | Despotovic et al. | |
| 2016/0261690 A1 | 9/2016 | Ford | |
| 2016/0275461 A1 | 9/2016 | Sprague et al. | |
| 2017/0068530 A1* | 3/2017 | Berrange | H04L 63/126 |
| 2017/0085486 A1* | 3/2017 | Chung | H04L 45/42 |
| 2017/0090755 A1* | 3/2017 | Sun | G06F 3/0688 |
| 2017/0213209 A1 | 7/2017 | Dillenberger | |
| 2018/0054853 A1* | 2/2018 | Rios Almanza | H04L 67/2838 |
| 2018/0084000 A1* | 3/2018 | Baukes | H04L 61/1511 |
| 2018/0088928 A1 | 3/2018 | Smith et al. | |
| 2018/0116004 A1* | 4/2018 | Britt | H04L 69/14 |
| 2019/0087115 A1* | 3/2019 | Li | G06F 16/137 |

FOREIGN PATENT DOCUMENTS

| | | |
|---|---|---|
| CN | 103106068 | 5/2013 |
| EP | 2566204 A1 | 3/2013 |
| GB | 2549085 | 10/2017 |
| WO | 0065800 | 11/2000 |
| WO | 0065800 A1 | 11/2000 |
| WO | 2004073281 A2 | 8/2004 |
| WO | 2009141385 A2 | 11/2009 |
| WO | 2015126734 A1 | 8/2015 |
| WO | 2015130752 A1 | 9/2015 |
| WO | 2017066002 A1 | 4/2017 |
| WO | 2018064154 | 4/2018 |
| WO | 2018125989 A2 | 7/2018 |
| WO | 2018126029 A2 | 7/2018 |
| WO | 2018126065 A1 | 7/2018 |
| WO | 2018126075 A1 | 7/2018 |
| WO | 2018126076 A1 | 7/2018 |
| WO | 2018126077 A1 | 7/2018 |

OTHER PUBLICATIONS

Kim et al; "Increasing Web Server Throughput with Network Interface Data Caching"; Computer Systems Laboratory, Rice University Houston Texas; Operating Systems Review, vol. 36 No. 5; ACM Oct. 2002.
International Search Report for related PCT Application PCT/US2017068830 with a completion date of Mar. 14, 2018 and dated Mar. 22, 2018, 2 pages.
Ergen et al; "MAC Protocol Engine for Sensor Networks" Global Telecommunications Conference Nov. 2009 GLOBECOM, Piscataway New Jersey. 17 pages.
International Search Report for related PCT Application PCT/US2017/068828 with a completion date of Mar. 22, 2018 and dated Mar. 29, 2018, 3 pages.
Hardjono et al; "Cloud-Based Commissioning of Constrained Devices using Permissioned Blockchains" Proceedings of ACM IoT Privacy, Trust & Security—IoTPTS 2016 Xi'an, China, May 2016, 8 pages.
International Search Report for related PCT Application PCT/US2017/068743 with a completion date of Jun. 28, 2018 and dated Jul. 6, 2018, 6 pages.
Hardjono et al; "Anonymous Identities for Permissioned Blockchains" (Draft v06C—Jan. 24, 2016—Please Do Not Distribute) 16 pages, retrieved from the internet on May 31, 2019 https://pdfs.semanticscholar.org/2ef6/d571f3d0a9927fbe29363a8038b0d148f881.pdf.
Hardjono et al; "Verifiable Anonymous Identities and Access Control in Permissioned Blockchains" Draft Apr. 17, 2016, retrieved from the internet on May 31, 2019 https://arxiv.org/pdf/1903.04584.pdf 9 pages.
Antonopoulos, Andreas M. "Mastering Bitcoin: Unlocking Digital Cryptocurrencies" Chapter 9, Dec. 20, 2014 O'Reilly Publishing,Tokyo Japan.

(56) References Cited

OTHER PUBLICATIONS

International Search Report for related PCT Application PCT/US2017068683 with a completion date of Jul. 4, 2018 and dated Jul. 7, 2018, 7 pages.
International Search Report for related PCT Application PCT/US2017/068832 with a completion date of Mar. 15, 2018 and dated May 17, 2018, 4 pages.
Fromknecht et al;:"A Decentralized Public Key Infrastructure with Identity Retention" Published in IACR Cryptology ePrint Archive Nov. 2014, 16 pages.
Fromknecht et al; "CertCoin:A NameCoin Based Decentralized Authentication System 6.857 Class Project" May 2014, retrieved from the Internet on Jun. 3, 2019 https://courses.csail.mit.edu/6.857/2014/files/19-fromknecht-velicann-yakoubov-certcoin.pdf 19 pages.
European Patent Office, "Intention to Grant," issued in connection with European Patent Application No. 17784468.5, dated Jul. 22, 2020, 7 pages.
Hardjono et al., "Cloud-Based Commissioning of Constrained Devices using Permissioned Blockchains," IoTPTS'16 Proceedings of the 2nd ACM International Workshop on IoT Privacy, Trust, and Security, May 2016, pp. 29-36 (8 pages).
Christidis et al., "Blockchains and Smart Contracts for the Internet of Things," IEEE Special Section on the Plethora of Research in Internet of Things (IoT), received Apr. 23, 2016, accepted May 8, 2016, date of publication May 10, 2016, date of current version Jun. 3, 2016, vol. 4, pp. 2292-2303 (12 pages).
Drescher, "Blockchain Basics: A Non-Technical Introduction in 25 Steps." Chapter 24. Mar. 16, 2017. Apress. pp. 1-6 (6 pages).
United States Patent and Trademark Office, "Notice of Allowance," issued in connection with U.S. Appl. No. 16/224,013, dated Jun. 17, 2020, 12 pages.
European Patent Office, "Communication pursuant to Article 94(3) EPC," issued in connection with European Patent Application No. 17832879.5, dated Oct. 26, 2020, 5 pages.
Kim et al., "Increasing web server throughput with network interface data caching," ACM SIGOPS Operating Systems Review, vol. 36, Issue 5, Oct. 2002, 6 pages. (Abstract only).
International Searching Authority, "Search Report and Written Opinion," issued in connection with International Patent Application No. PCT/US2017/053696, dated Jan. 5, 2018, 10 pages.
United States Patent and Trademark Office, "Non-Final Office Action," issued in connection with U.S. Appl. No. 15/278,936, dated Feb. 27, 2018, 14 pages.
United States Patent and Trademark Office, "Notice of Allowance," issued in connection with U.S. Appl. No. 15/278,936, dated Sep. 13, 2018, 20 pages.
The International Bureau of WIPO, "International Report on Patentability," issued in connection with International Patent Application No. PCT/US2017/053696, dated Apr. 2, 2019, 6 pages.
China National Intellectual Property Administration, "First Office Action," issued in connection with Application No. 201780074262.4, dated Jun. 9, 2021, 9 pages.

* cited by examiner

400

2700

2800

3700

4700

4800

DECENTRALIZED DATA STORAGE AND PROCESSING FOR IOT DEVICES

CROSS REFERENCE TO RELATED APPLICATIONS

Pursuant to 35 U.S.C. § 371, this application is the United States National Stage Application of International Patent Application No. PCT/US2017/068806, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016, and which both are incorporated herein by reference.

This application is related to International Patent Application No. PCT/US2017/068743, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068743, filed on Jun. 5, 2019.

This application is related to International Patent Application No. PCT/US2017/068832, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068832, filed on Jun. 5, 2019.

This application is related to International Patent Application No. PCT/US2017/068683, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068683, filed on Jun. 5, 2019.

This application is related to International Patent Application No. PCT/US2017/068830, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068830, filed on Jun. 5, 2019.

This application is related to International Patent Application No. PCT/US2017/068828, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068828, filed on Jun. 5, 2019.

TECHNICAL FIELD

The present techniques relate generally to Internet of Things (IoT) devices. More specifically the present techniques relate to devices that can perform remote sensing and actuation functions.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The Internet-of-Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 1 and 2.

Figure 1:
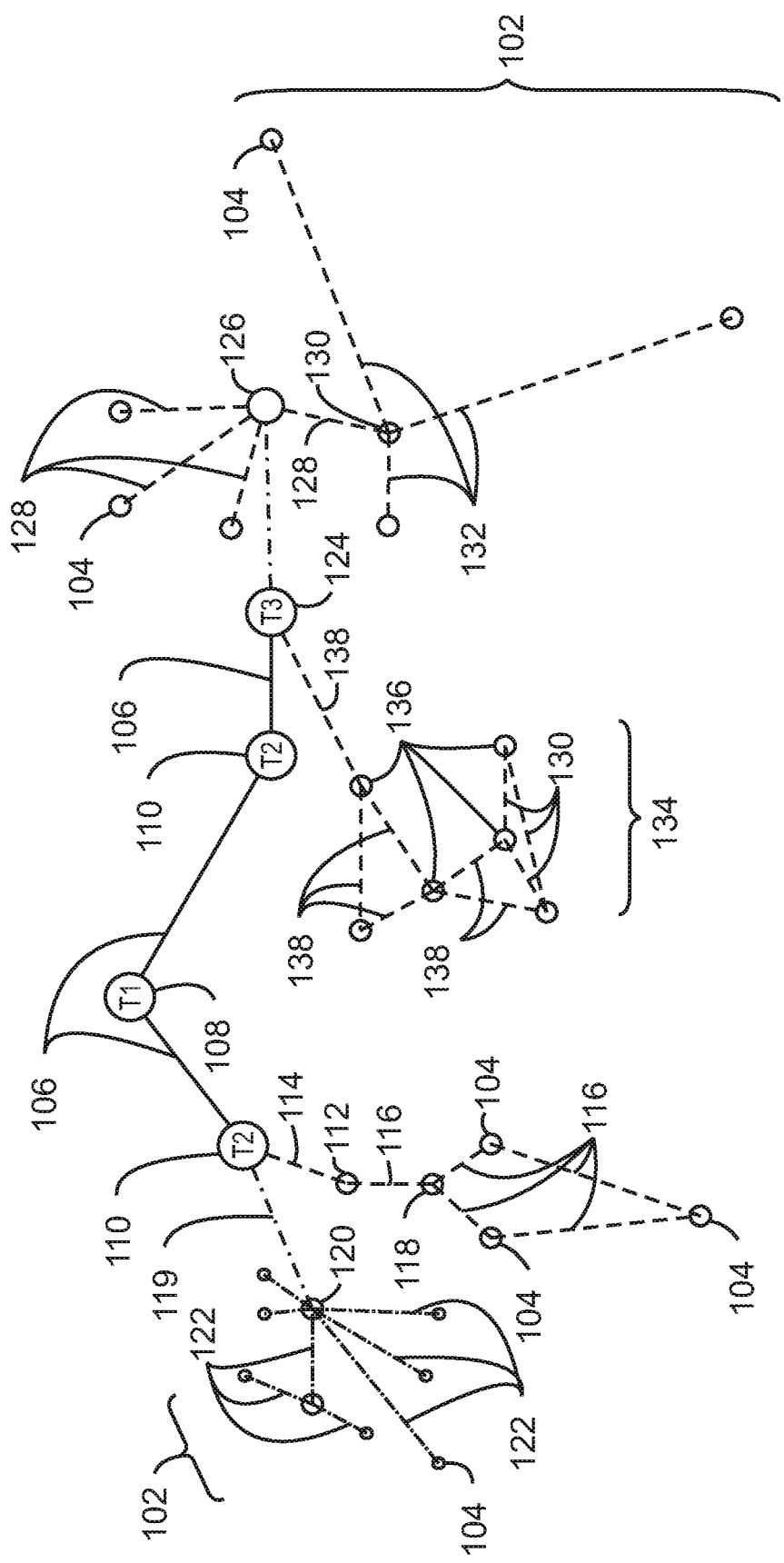
FIG. 1 is a drawing of interconnections that may be present in the Internet in accordance with some embodiments.
Figure 2:
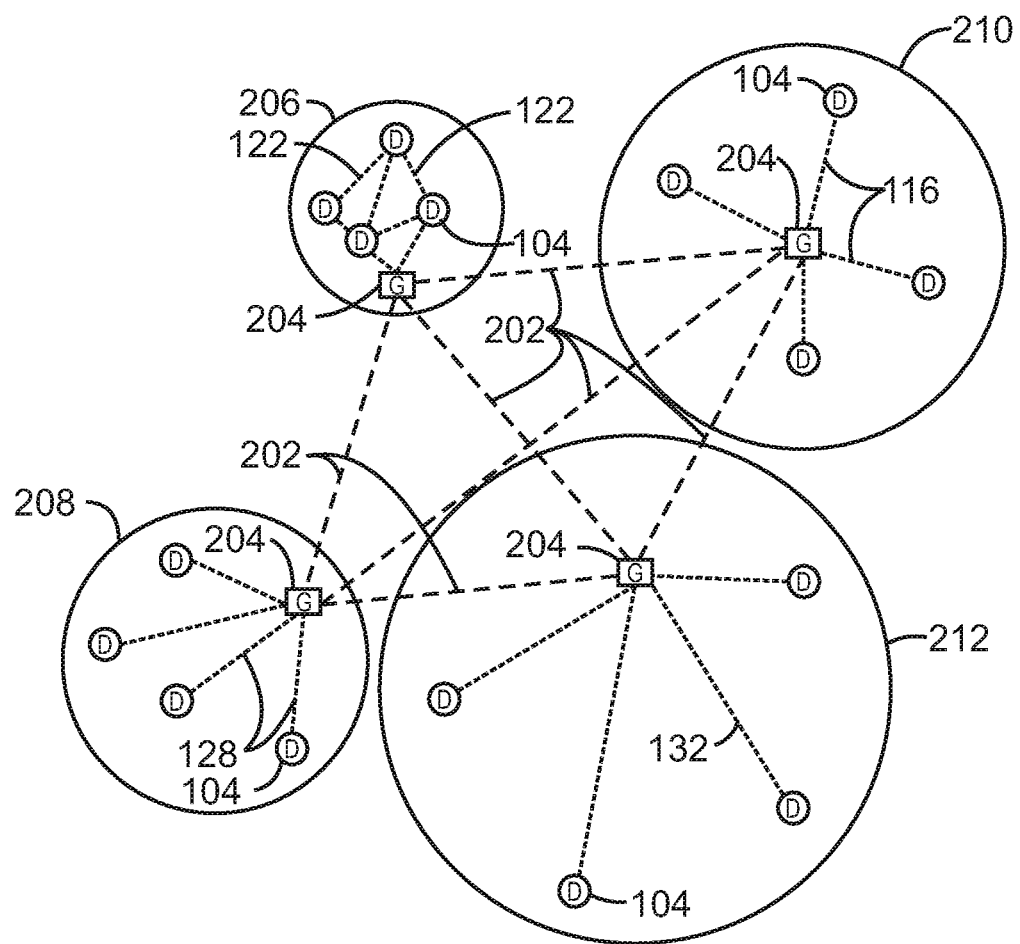
FIG. 2 is a drawing of a network topology for a number of internet-of-things (IoT) networks coupled through backbone links to gateways in accordance with some embodiments.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWan specification promulgated by the LoRa alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms one or more cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 9.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology (or rather than a strictly hub-and-spoke topology).

The network topology 200 may include any number of types of IoT networks, such as a mesh network 206 using Bluetooth Low Energy (BLE) links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, and vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each. Furthermore, the proper components of infrastructure and resource based trust and service indices may be inserted to improve the data integrity, quality assurance, and deliver a metric of data confidence.

As described herein, the WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
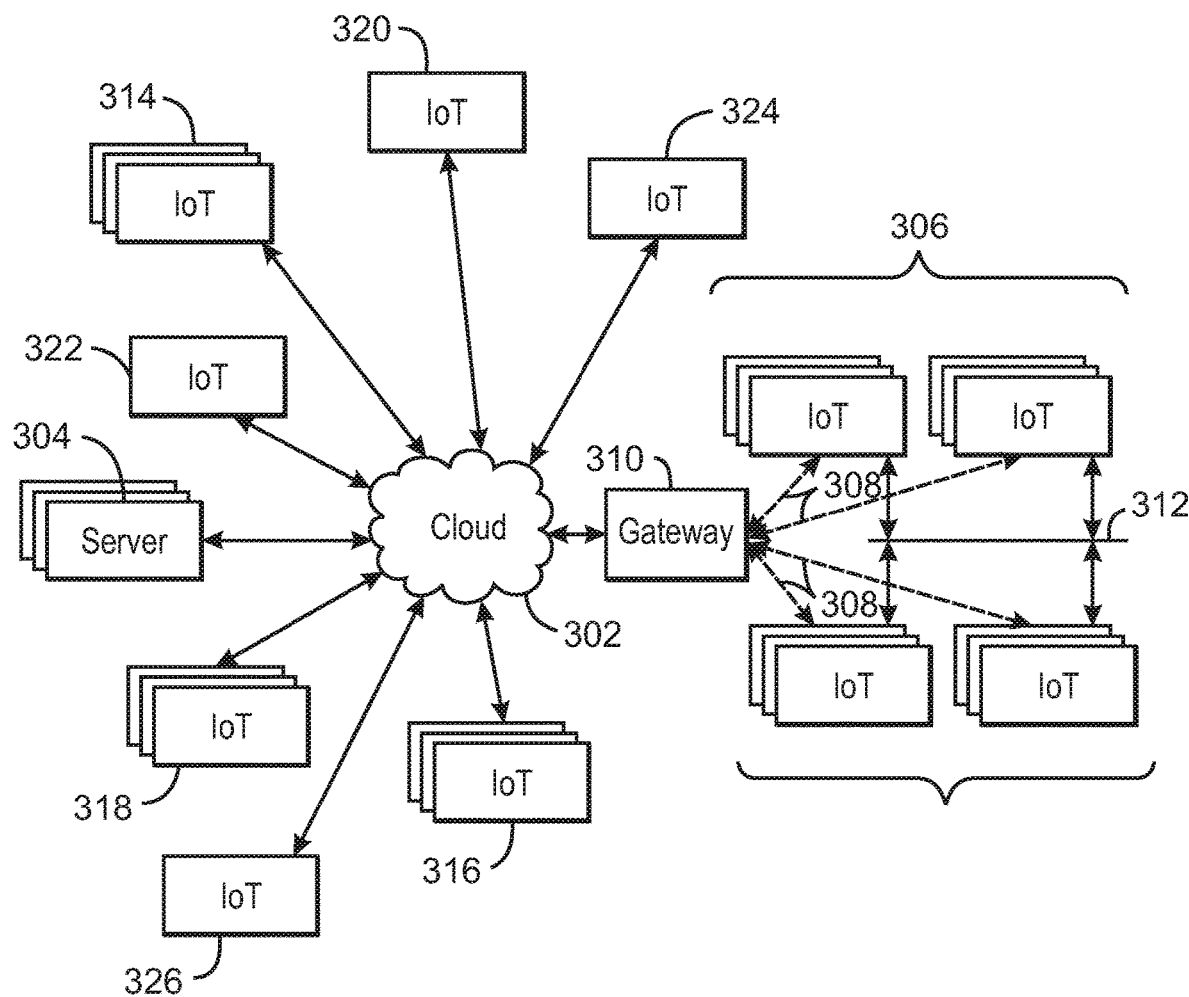
FIG. 3 is a drawing of a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
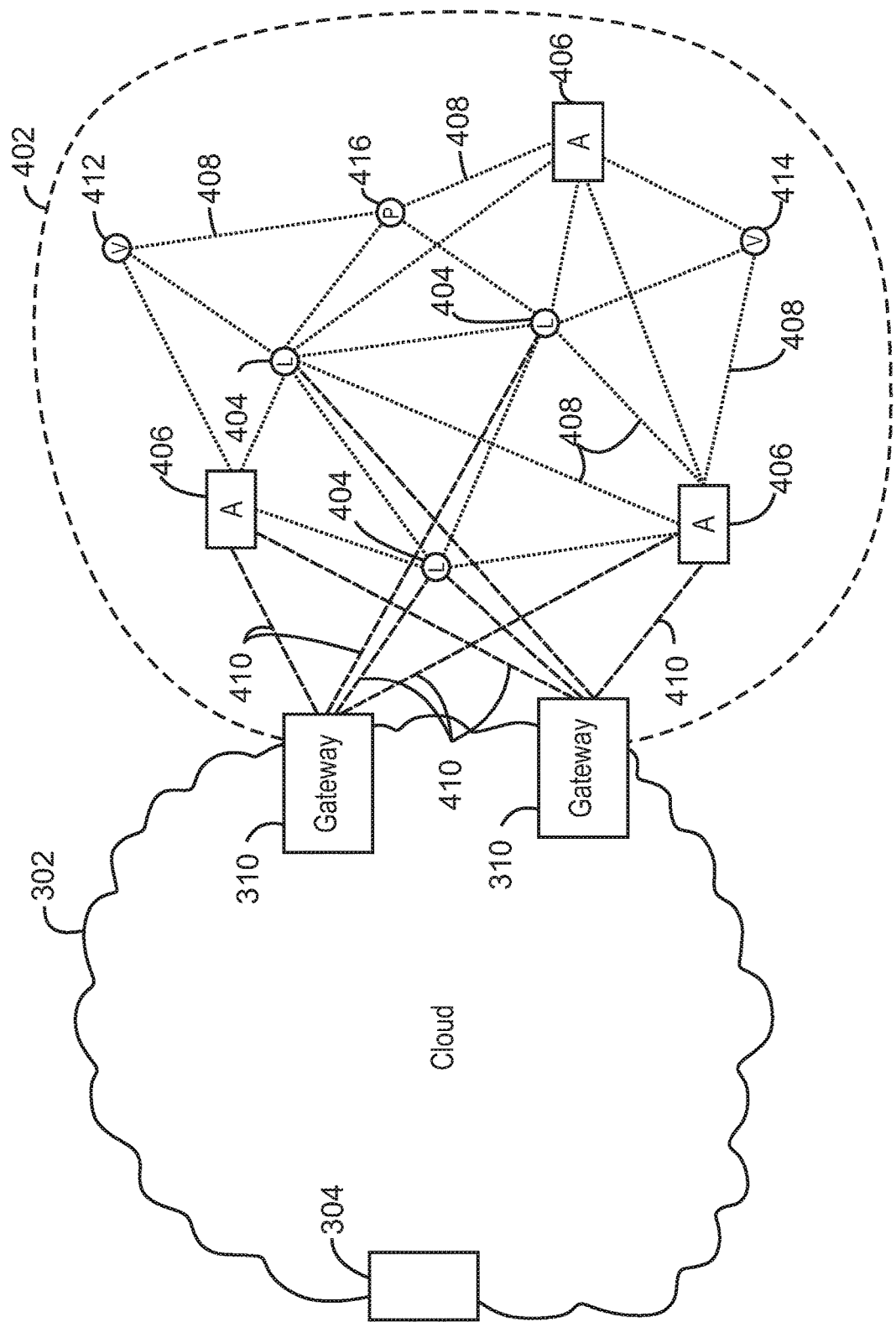
FIG. 4 is a drawing of a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices, which may be termed a fog device 402, operating at the edge of the cloud 302 in accordance with some embodiments. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, traffic analyses, and the like.

For example, traffic flow through the intersection may be controlled by a plurality of traffic lights 404 (e.g., three traffic lights 404). Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in the exemplary system 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416. Other IoT devices may also be present, such as IoT devices in bicycle computers, motorcycle computers, drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 416, cyclists, or non-autonomous vehicles.

As the transient devices 412, 414, and 416, leave the vicinity of the intersection of the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Figure 5:
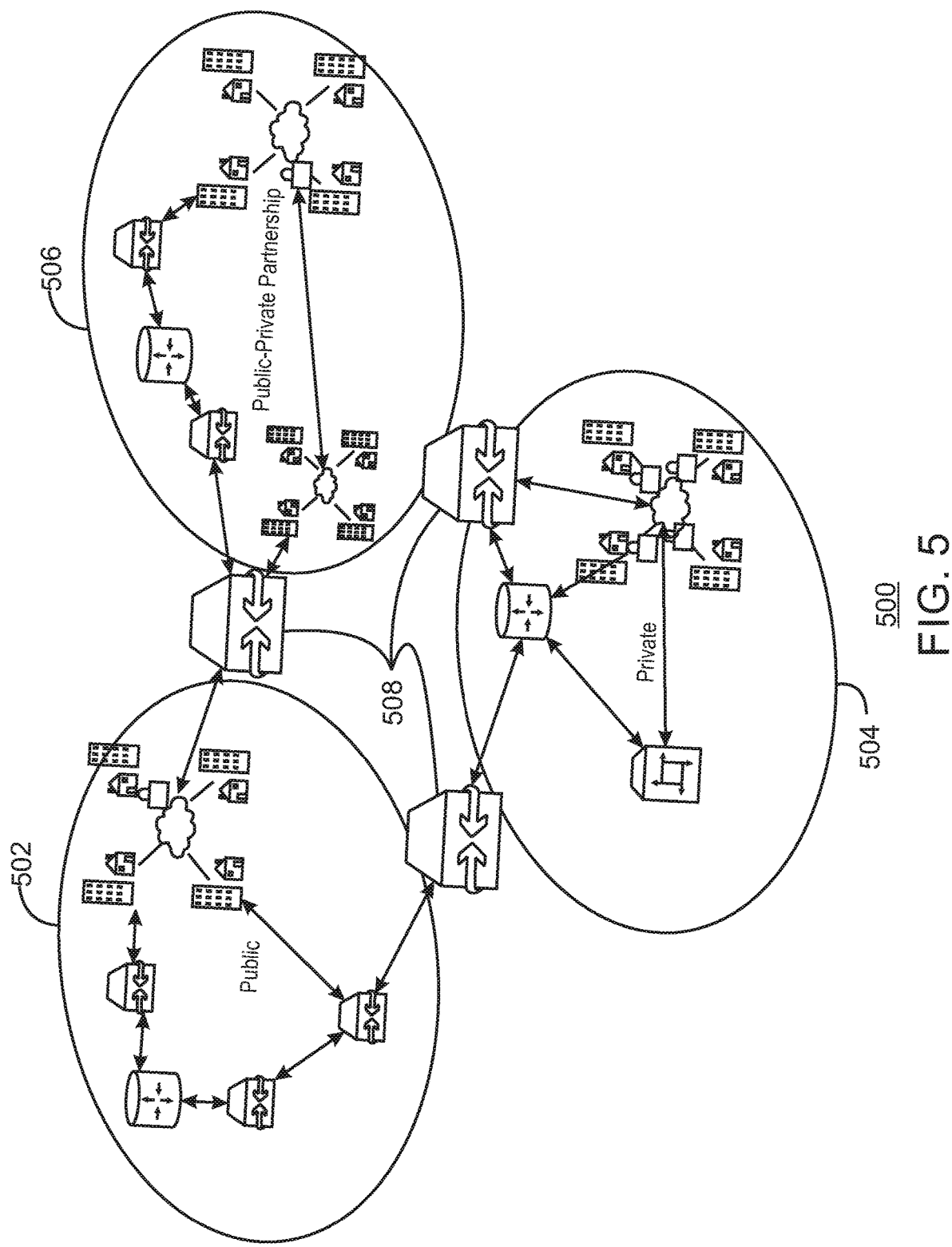
FIG. 5 is a schematic drawing illustrating interoperability across public domains, private domains, and public-private domains in accordance with some embodiments.

FIG. 5 is a schematic drawing 502 illustrating interoperability across public domains 502, private domains 504, and public-private domains 506 in accordance with some embodiments. The network topology may be in a continuous state of change, making any attempt at permanent maps impossible. Accordingly, IoT devices may use the backbone resources, such as domain name servers (DNS) to send packets between domains. The packets may be routed between the domains 502, 504, and 506 through the Internet backbone, shown as routers 508.

In some aspects, the routers 508 provide the edge connections that couple the domains to one another. As described herein, any number of services may be provided at the edges of the domains 502, 504, and 506 to enhance the interconnectivity. For example, interconnections between the public domain 502 and the private domains 504 may provide opportunities for micropayments for domain access, explicit permission and tracking for domain access, and the separation of public and private traffic, among others. Similarly, interconnections between the public domain 502 and the public-private domain 506 may provide opportunities for services such as time-based leases, resource marketplaces, and distributed identity servers, among others. Interconnections between the private domains 504 and the public-private domains 506 may provide opportunities for inline service interconnects, behavior based threat analysis, and proof-of-provenance, among others.

Figure 6:
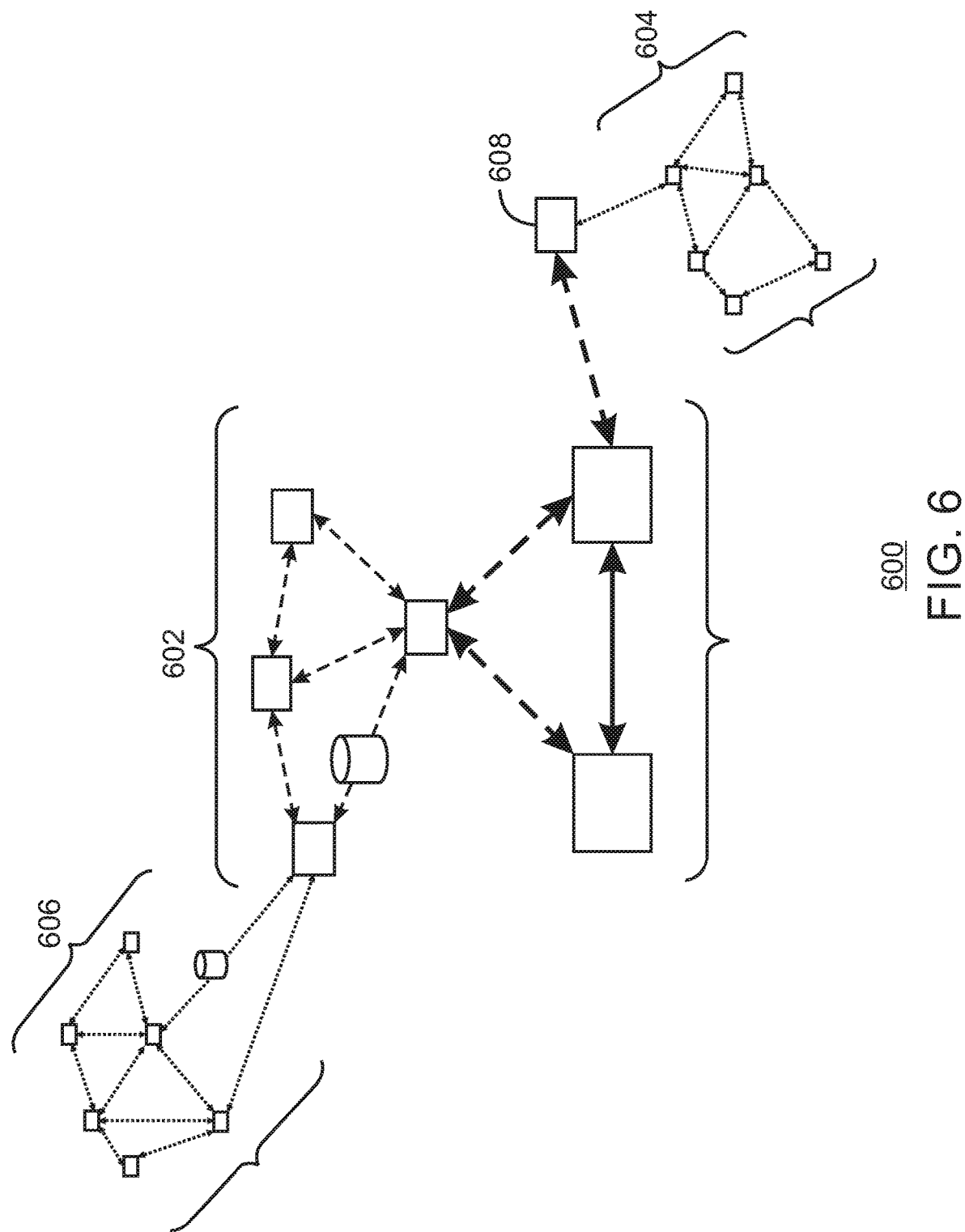
FIG. 6 is a schematic drawing of interoperability across a heterogeneous network of wired networks and wireless networks in accordance with some embodiments.

FIG. 6 is a schematic drawing of interoperability across a heterogeneous 600 network of wired networks 602 and wireless networks 604 and 606 in accordance with some embodiments. The wireless networks 604 and 606 may be communicatively coupled by devices in the wired network 602. This provides opportunities for efficiency improvements in communications between devices in the wireless networks 604 and 606, as well as improvements in communications between devices in a wireless network 604 or 606 and a device in the wired network 602. For example, edge device 608 coupling a first wireless network 604 to the wired network 602 may provide a data to information transform to reduce the size of the payload. Further, the edge device 608 may have a permissioning system that allows packets from the first wireless network 604 to pass, while blocking unpermitted packets from transferring. The permissioning system may include systems to make micropayments to allow the information to move across the wired network 602. As an example, the first wireless network 604 may be a ground moisture sensor array on an agricultural site. The reporting frequency may depend on the rate of change, which may increase costs due to the need to purchase bandwidth to match the highest reporting rate. Thus, a micropayment system may lower costs by allowing transactions to paid for on an as-needed basis.

Almost all methods for storing and delivering information around a network utilize a push or pull method. Push can often be equated to the broadcast of a gateway or base station to all connected base nodes. This type of model is also often use in publish/subscribe models, where devices send data via channels as a means of sending data. Further, most model use a central server from where end-points broadcast data from (push), or a content server where they pull from. The techniques described with respect to FIGS. 7 to 10 use a combination of push and pull to distribute content across networks.

Figure 7:
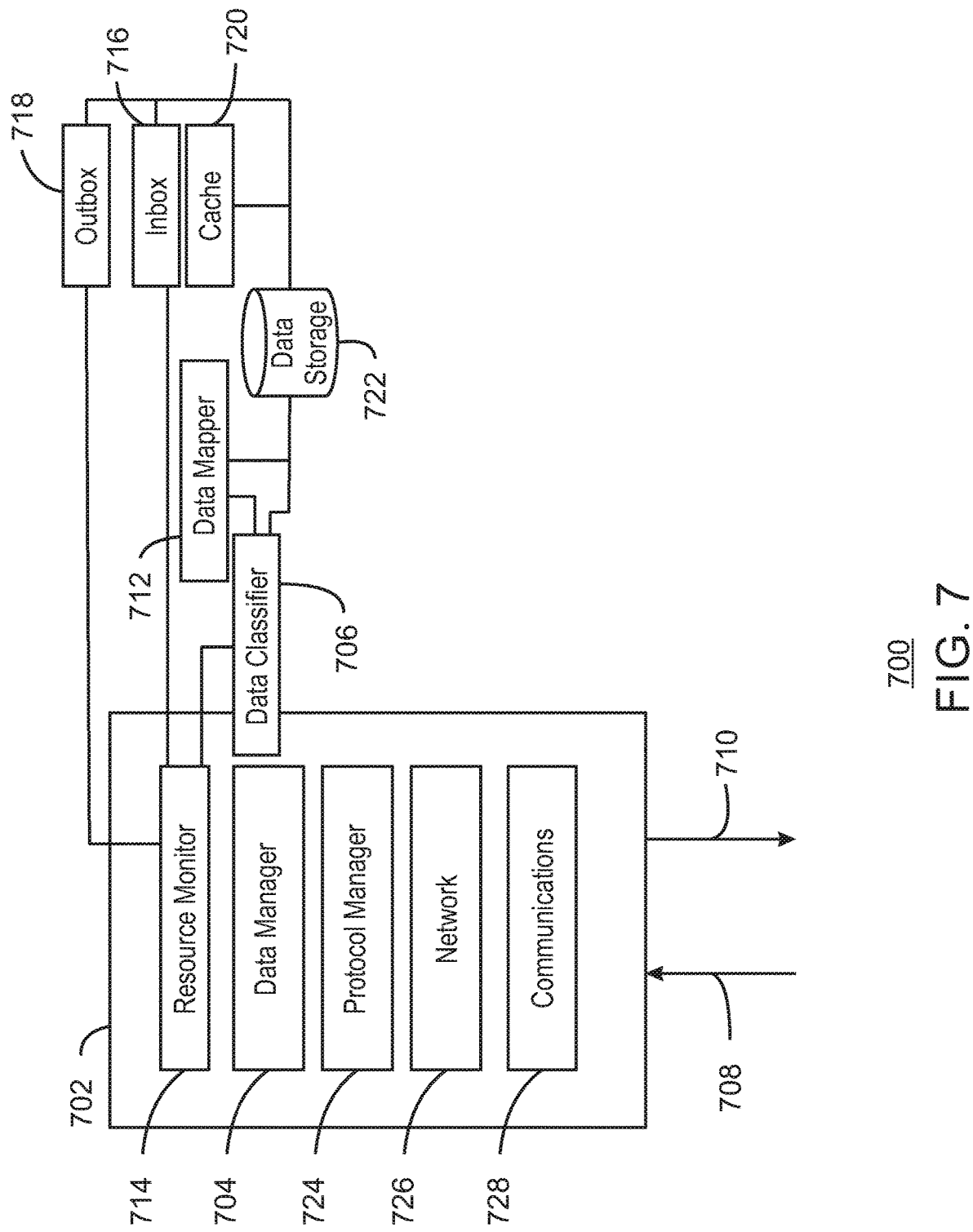
FIG. 7 is a schematic drawing of a distributed content-distribution system for heterogeneous networks in accordance with some embodiments.

FIG. 7 is a schematic drawing of a distributed content-distribution system 700 for heterogeneous networks in accordance with some embodiments. The use of the distributed content-distribution system 700 may enable the distribution across heterogeneous networks which may be lossy or have intermittent connectivity. Furthermore, it enables the distribution of data in a stateless fashion. One, or more, IoT device, or node 702, in the distributed content-distribution system 700 has a data manager 704 that is responsible for the management of data on the node. The data manager 704 has a number of sub systems, including a data classifier 706 that may classify the inbound data 708 and outbound data 710 that passes through the distributed content-distribution system 700. It uses three main classifications for the data, inbound, outbound, and cache.

In some aspects, a data mapper 712 is responsible for mapping the classified data to a physical location on the system. The data mapper 712 may use an algorithm, such as a hash function, to determine the optimum location of the data. The data classifier 706 communicates with a resource manager 714 to determine the classification for outbound and cache data. Inbound data 708 is data intended to be consumed by the node itself. The data mapper 712 transfers the data to an inbox 716, and the resource manager 714 monitors for changes or updates to the inbox 716.

Outbound data 710 may be shared by a node 702 at greater than one hop distance, and is determined by the resource manager 714. The outbound data 710 may be stored in an outbox 718. The resource manager 714 calculates the number of hops by calculating the current resource availability at the node 702, such as power and network node count.

Cached data is saved in a cache 720, and is data that has been determined to be useful for the node 702. A data historian 722 may track data moving in and out of the node 702, such as inbound and outbound data requests. A protocol manager 724 may manage the protocols used for incoming and outgoing frames, for example, based on the communications channels in use for the particular frames. A network manager 726 may handle network communications on the various communications channels, for example, hosting the network stack. A communications manager 728 may handle physical level, or PHY, operations, such as radios, network interface controllers, and the like.

Figure 8:
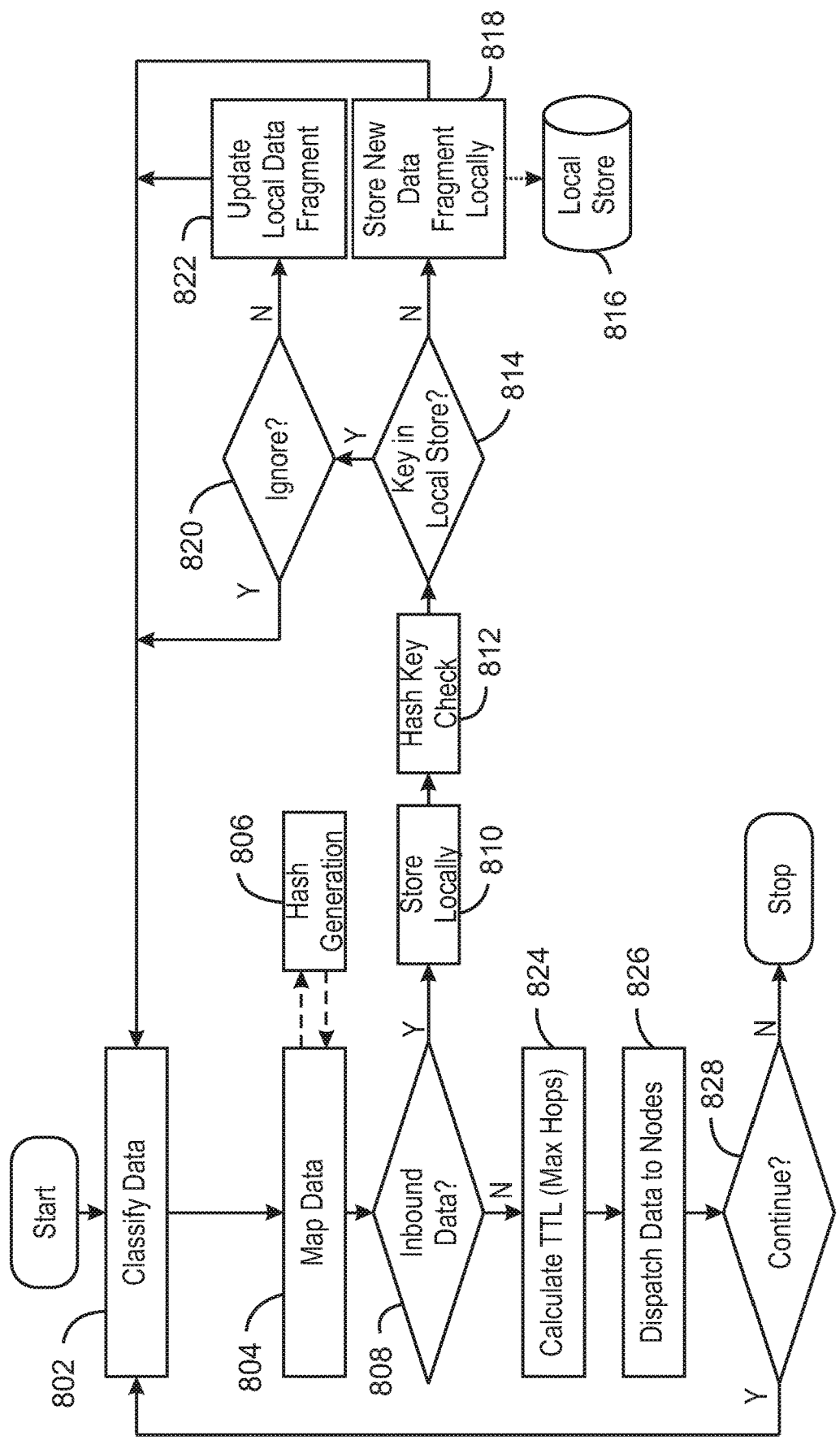
FIG. 8 is a process flow diagram of an example method for dispersed content distribution in accordance with some embodiments.

FIG. 8 is a process flow diagram of an example method 800 for dispersed content distribution in accordance with some embodiments. The method 800 of FIG. 8 may be implemented by the IoT device 702 described with respect to FIGS. 7 and 9. In block 802, the data is classified. This is performed by classifying one or more pieces of inbound and outbound data that passes through the system, for example, as inbound data, outbound data, and cache data.

At block 804, the classified data is mapped to the correct physical location on the system. For example, as indicated at block 806, this may be performed using an algorithm to generate a hash code identifying the location of inbound data.

At block 808, a determination is made as to whether the data is inbound. If so, the data is locally stored at block 810. At block 812, the hash key is checked. At block 814, a determination is made as to whether the hash key is in the local store 816. If not, at block 818, the new data fragment is stored locally. Process flow then returns to block 802.

If the key is determined to be in the local store 816 at block 814, at block 820 a determination is made as to whether the information should be ignored, for example, if it is identical to the previous information in the local store 816. If so, process flow returns to block 802. If not, the data is the local store 816 is updated with the new fragment, and process flow returns to block 802.

If at block 808, the data is determined to be outbound data, at block 824, the maximum number of hops is calculated. This is termed time-to-live (TTL), and may be determined by calculating the current resource availability at the node, such as power, network node count. At block 826, the data is dispatched, or pushed, to the target node.

A target node may also pull data by requesting data from a node of one hop. The data pull request may have a TTL, measured in terms of hop count, i.e. number of hops a packet makes as it traverses a network where the TTL is decremented following each hop. When the TTL reaches a zero count, the data fragment is invalidated. The TTL may be measured in absolute time, for example, in seconds, minutes, or hours, where the data fragment is invalidated when the timeout expires. If it does not get a pull request within the timeout, it can push a request to the node, which can then be forwarded through the system.

At block 826, a determination is made as to whether to continue the distributed sharing of content. If so, process flow resumes at block 802.

Each node may keep track of inbound and outbound requests received in the data historian. A cache window may be maintained for all requests. The frequency can be determined by a number of factors, such as the number of requests over a period of time.

The device also self-manages its cache size by applying an accessed counter and timer to determine how often the cached data is accessed. If the data is being accessed frequently it may increase the cache, and if accessed less frequently, it may decrease the cache. Each node also will determine if it can push or pull data via the data manager.

Figure 9:
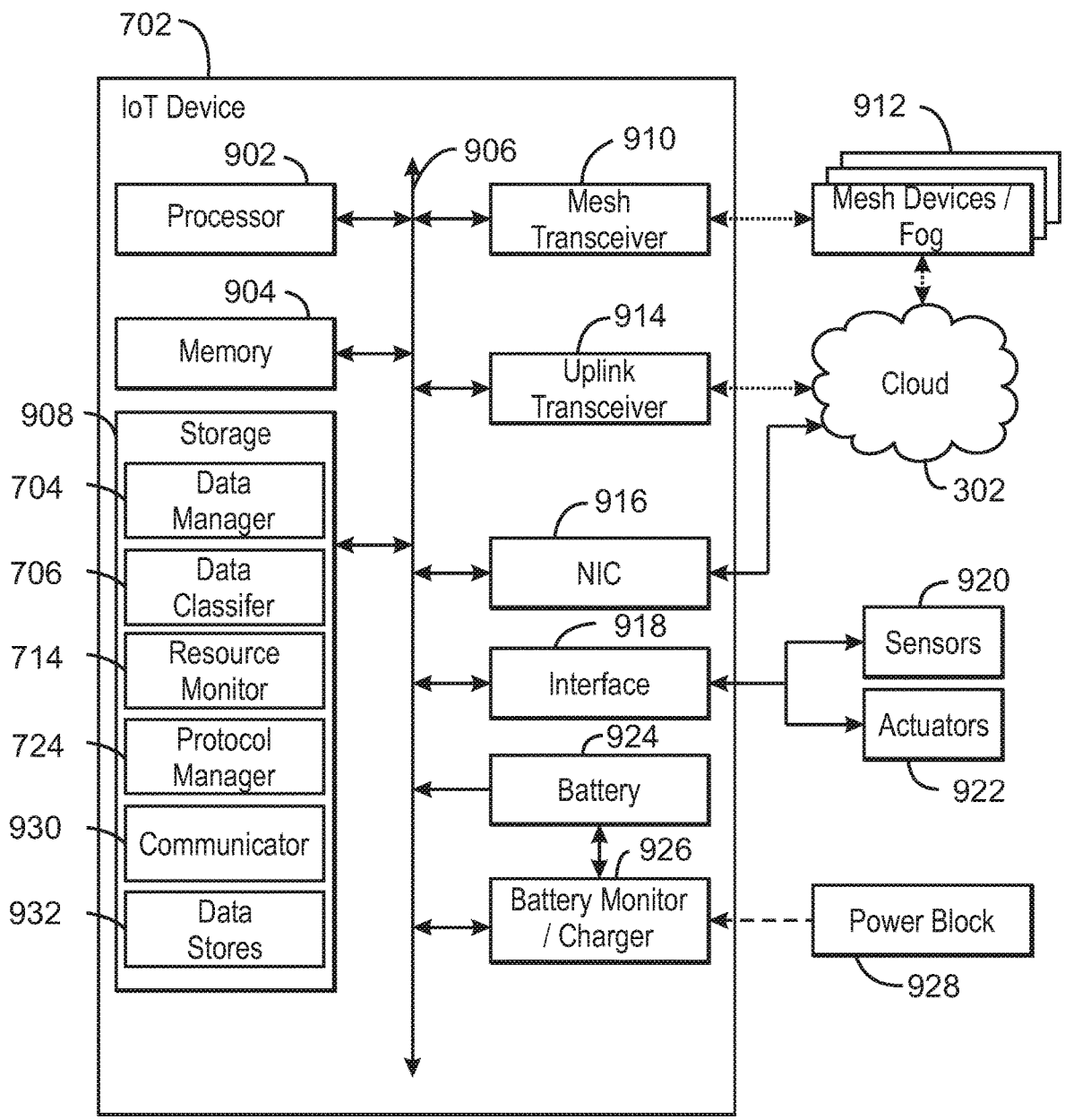
FIG. 9 is a block diagram of an example of components that may be present in an IoT device for implementing a distributed content-distribution system in accordance with some embodiments.

FIG. 9 is a block diagram of an example of components that may be present in an IoT device 900 (or an IoT device 702) for implementing a distributed content-distribution system in accordance with some embodiments. The IoT device 900 (or 702) may include any combinations of the components shown in the example. The components may be implemented as ICs, portions thereof, discrete electronic devices, or other modules, logic, hardware, software, firmware, or a combination thereof adapted in the IoT device 900 (or 702), or as components otherwise incorporated within a chassis of a larger system. The block diagram of FIG. 9 is intended to show a high level view of components of the IoT device 900 and IoT device 702. However, some of the components shown may be omitted, additional components may be present, and different arrangement of the components shown may occur in other implementations.

Like numbered items are as described with respect to FIGS. 3 and 7. It can be noted that different components may be selected and used for the IoT device 900 than for those selected for other IoT devices discussed herein.

The IoT device 900 or 702 may include a processor 902, which may be a microprocessor, a multi-core processor, a multithreaded processor, an ultra-low voltage processor, an embedded processor, or other known processing element. The processor 902 may be a part of a system on a chip (SoC) in which the processor 902 and other components are formed into a single integrated circuit, or a single package, such as the Edison™ or Galileo™ SoC boards from Intel. As an example, the processor 902 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 902 may communicate with a system memory 904 over a bus 906. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2GB and 16GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 908 may also be coupled to the processor 902 via the bus 906. To enable a thinner and lighter system design, the mass storage 908 may be implemented via a solid state drive (SSD). Other devices that may be used for the mass storage 908 include flash memory cards, such as SD cards, microSD cards, xD picture cards, and the like, and USB flash drives.

In low power implementations, the mass storage 908 may be on-die memory or registers associated with the processor 902. However, in some examples, the mass storage 908 may be implemented using a micro hard disk drive (HDD). Further, any number of new technologies may be used for the mass storage 908 in addition to, or instead of, the technologies described, such resistance change memories, phase change memories, holographic memories, or chemical memories, among others. For example, the IoT device 900 (or IoT device 702) may incorporate the 3D XPOINT memories from Intel® and Micron®.

The components may communicate over the bus 906. The bus 906 may include any number of technologies, including industry standard architecture (ISA), extended ISA (EISA), peripheral component interconnect (PCI), peripheral component interconnect extended (PCIx), PCI express (PCIe), or any number of other technologies. The bus 906 may be a proprietary bus, for example, used in a SoC based system. Other bus systems may be included, such as an $I^2C$ interface, $I^3C$ interface, an SPI interface, point to point interfaces, and a power bus, among others.

The bus 906 may couple the processor 902 to a mesh transceiver 910, for communications with other mesh devices 912. The mesh transceiver 910 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 912. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 910 may communicate using multiple standards or radios for communications at different range. For example, the IoT device 900 (or IoT device 702) may communicate with geographically proximate devices, e.g., within about 10 meters, using a local transceiver based on BLE, or another low power radio, to save power. More distant mesh devices 912, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 910 may be incorporated into an MCU as an address directly accessible by the chip, such as in the Curie® units available from Intel.

An uplink transceiver 914 may be included to communicate with devices in the cloud 302. The uplink transceiver 914 may be LPWA transceiver that follows the IEEE 802.15.4, IEEE 802.15.4g, IEEE 802.15.4e, IEEE 802.15.4k, or NB-IoT standards, among others. The IoT device 900 (or IoT device 702) may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 910 and uplink transceiver 914, as described herein. For example, the radio transceivers 910 and 912 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 910 and 912 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System-Time-Division Duplex), TD-CDMA (Time Division-Code Division Multiple Access), Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 914, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 916 may be included to provide a wired communication to the cloud 302 or to other devices, such as the mesh devices 912. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 916 may be included to allow connect to a second network, for example, a NIC 916 providing communications to the cloud over Ethernet, and a second NIC 916 providing communications to other devices over another type of network.

The bus 906 may couple the processor 902 to an interface 918 that is used to connect external devices. The external devices may include sensors 920, such as accelerometers, level sensors, flow sensors, temperature sensors, pressure sensors, barometric pressure sensors, and the like. The interface 918 may be used to connect the IoT device 900 (or IoT device 702) to actuators 922, such as power switches, valve actuators, an audible sound generator, a visual warning device, and the like.

While not shown, various input/output (I/O) devices may be present within, or connected to, the IoT device 900 (or the IoT device 720). For example, a display may be included to show information, such as sensor readings or actuator position. An input device, such as a touch screen or keypad may be included to accept input.

A battery 924 may power the IoT device 900 (or the IoT device 720), although in examples in which the IoT device 900 (or IoT device 702) is mounted in a fixed location, it may have a power supply coupled to an electrical grid. The battery 924 may be a lithium ion battery, a metal-air battery, such as a zinc-air battery, an aluminum-air battery, a lithium-air battery, a hybrid super-capacitor, and the like.

A battery monitor/charger 926 may be included in the IoT device 900 (or IoT device 702) to track the state of charge (SoCh) of the battery 920. The battery monitor/charger 926 may be used to monitor other parameters of the battery 924 to provide failure predictions, such as the state of health (SoH) and the state of function (SoF) of the battery 924. The battery monitor/charger 926 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 926 may communicate the information on the battery 924 to the processor 902 over the bus 906. The battery monitor/charger 926 may also include an analog-to-digital (ADC) convertor that allows the processor 902 to directly monitor the voltage of the battery 926 or the current flow from the battery 924. The battery parameters may be used to determine actions that the IoT device 900 (or IoT device 702) may perform, such as transmission frequency, mesh network operation, sensing frequency, and the like.

A power block 928, or other power supply coupled to a grid, may be coupled with the battery monitor/charger 926 to charge the battery 924. In some examples, the power block 928 may be replaced with a wireless power receiver to obtain the power wirelessly, for example, through a loop antenna in the IoT device 900 (or IoT device 702). A wireless battery charging circuit, such as an LTC4020 chip from Linear Technologies of Milpitas, Calif., among others, may be included in the battery monitor/charger 926. The specific charging circuits chosen depend on the size of the battery 924, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 928 may be augmented or replaced with solar panels, a wind generator, a water generator, or other natural power systems.

The mass storage 908 may include a number of modules to implement the coalition group formation described herein. Although shown as code blocks in the mass storage 908, it may be understood that any of the modules may be fully or partially replaced with hardwired circuits, for example, built into an application specific integrated circuit (ASIC).

The mass storage 908 may include the modules described with respect to FIG. 7. Data stores 932, such as the inbox 716, outbox 718, cache 720, and data historian 722 may be included in the mass storage 908, or may be stored in other locations, such as memory on another device.

Figure 10:
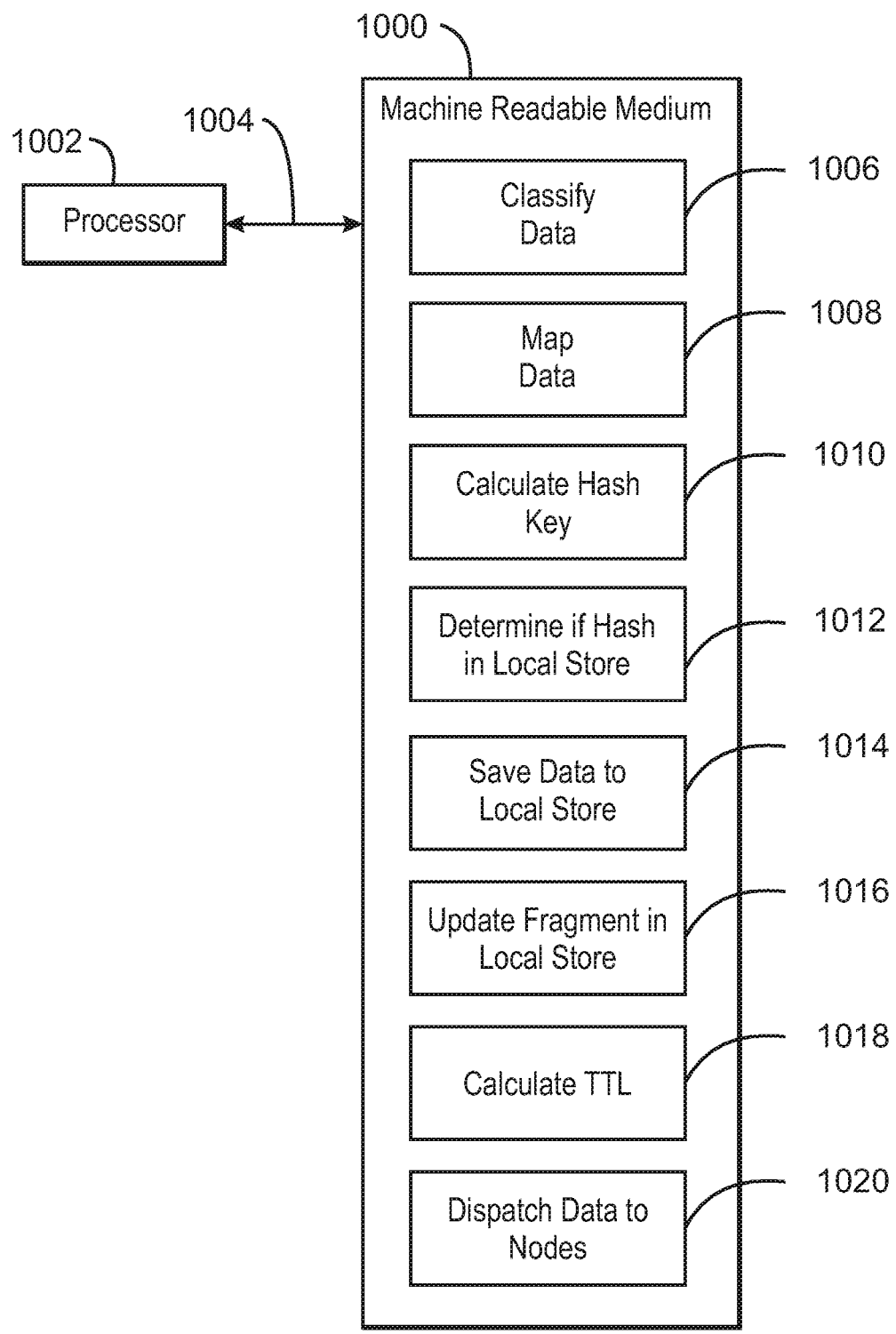
FIG. 10 is a block diagram of a non-transitory, machine readable medium including code to direct a processor to implement a distributed content-distribution system in accordance with some embodiments.

The mass storage 908 may include a communicator 930 that sends packets to and receives frames from mesh devices 912 or devices in the cloud 302 over one or more communications links, for example, through a mesh transceiver 910, an uplink transceiver 914, and a NIC 916, among others. In addition to the functions described with respect to FIG. 9, the communicator 930 may perform other functions, such as translation of packets between protocols, performing proof-of-provenance additions, and the like. Further, the communicator 930 may be part of an easement system FIG. 10 is a block diagram of an exemplary non-transitory, machine readable medium 1000 including code to direct a processor 1002 to form group objects in accordance with some embodiments. The processor 1002 may access the non-transitory, machine readable medium 1000 over a bus 1004. The processor 1002 and bus 1004 may be selected as described with respect to the processor 902 and bus 906 of FIG. 9. The non-transitory, machine readable medium 1000 may include devices described for the mass storage 908 of FIG. 9 or may include optical disks, thumb drives, or any number of other hardware devices.

The non-transitory, machine readable medium 1000 may include code 1006 to classify the data that passes through the distributed content-distribution system as inbound data, outbound data, or cache data. Code 1008 may be included to direct the processor 1002 to map the classified data to a physical location on the system. The code 1008 may direct the processor 1002 to determine the optimum location of the data. The code 1010 may direct the processor 1002 to calculate a hash function of the data. Code 1012 may be included to direct the processor 1002 to determine if the hash key is in the local store.

Code 1014 may be included to direct the processor 1002 to store a new data fragment locally. Code 1016 may be included to update a locally stored data fragment. Code 1018 may be included to direct the processor to calculate a time-to-live for a data fragment, for example, in number of hops before deletion, or in amount of time before deletion, or both. Code 1020 may be included to dispatch data to other nodes, for example, in frames. The protocol for the frames may be selected based on the communications channel used for sending the frames.

To participate in a network, a device or agent requiring data or resources may search the network and other interconnected networks to acquire the data or resources. As used herein, the data may be any data needed to complete a function in the present device, such as distance traffic flow for an intersection controller. Resources include any function that may be used to complete a task, such as a predictive model run on an upstream system, or code used to perform a local function, among others. However, flooding the network with queries may overload the network communications, and may cause problems for energy constrained devices. Further, centralize networks may be vulnerable to distributed denial-of-service (DDoS) attacks. The use of a ledger or blockchain certified credit may help decrease network loading and allow objects to better manage their resources, as well as lowering the vulnerability of the network to DDoS attacks.

To better organize resources for tracking, the resources may be distributed in a distributed hash table (DHT) based network such as Kademlia. In a Kademlia network consisting of n nodes, finding any node in the network will take a maximum of $O(\log(n))$ hops. Additionally, such networks use the concept of k-buckets, which effectively means that nodes in a network know their own neighborhood well and thus, their local k-bucket will have a large number of nodes. However, in some cases, the further away nodes are from a node, the less nodes will be present, indicating that k-buckets with lower k values will have fewer nodes.

As noted, current blockchain techniques may build a Merckle hash tree as a way to index to a particular block in the block chain. If a block hash is known, the block may be efficiently located in a repository of blocks. This may be considered a form of DHT. DHT may also be used to identify specific data that are included in a blockchain. In this approach, a data value may be hashed to a DHT where the location in the DHT database reveals the blockchain block hash where the data can be found.

A system that wants to verify the trust of the data may follow a two-step lookup process, where the interesting data are hashed to a DHT location. That location reveals the block hash values. The block hash values are hashed into the Merckle Tree revealing the actual block in the block chain. A calculation of the block hash and check of the next previous block verifies the block integrity within the chain. In this way, any data that is recognizable in a DHT may have its integrity validated according to an infrastructural trust mechanism.

A bloom filter mechanism, as described herein, may be implemented using DHT. When a DHT value is used to form a bloom filter, it may indicate that there is a topic for that data item available for subscription by a community of subscribers. The community may be interested in the bloom filter value and may be notified whenever a transaction involving the data value is found on a blockchain.

Data analytics is intended to find correlations between seemingly uncorrelated data. Hence, an analytics engine might hypothesize a previously unanticipated correlation, and may subscribe to these topics. If the DHTs for the hypothetically correlated values fire within a frame of time that is statistically interesting, then a data analyst can test his hypothesis. Given a significant body of transactions mapped to the blockchain, this may enable efficient notification of data analysts' hypothesis testing.

This approach to a network structure means queries to far away nodes may return detailed information about the remote neighborhood without having to replicate a complete network map to every participating node. This may keep the network much more dynamic. Broadcasts to discover resources in the local network are relatively inexpensive and the federated nature of an overall network means that the level of resource discovery broadcast traffic across the entire network may be reduced.

However, prior consensus networks do not incorporate this concept because the methods of how to use a blockchain as a control plane with a complementary off-chain data/storage plane were not developed. Therefore, aspects disclosed herein provide a method, which may be used to enable this, and thus, address issues of scalability that arise as more data is stored on-chain over time.

As described herein, a blockchain designed so that the consensus nodes are distributed in a k-bucket fashion may improve the efficiency of the blockchain to locate resources. The k-buckets may introduce local, segmented networks are semi-autonomous and where locally available services and contracts can be stored without distributing them to the entire network. This storage may be done off-chain or on-chain.

As described herein, devices may wish to locate service, smart contract and other information within the network. Storing such information in the chain may create scalability and performance issues as the blockchain can be considered a control plane, rather than a data plane. Using this concept of ledger certified credit, a dynamic cost can be associated with each hop that it takes to acquire a service or smart contract. While a global search may result in the best available matches, it may cost more in terms of time and credit to perform. A searching entity must therefore make a tradeoff decision between paying the cost for a hop or being satisfied with the current search result, which could be an empty set. The resources being searched for must be in a discoverable format and the idea of a bloom filter could be applied as a technique to further increase the efficiency of searches across the network.

Figure 11:
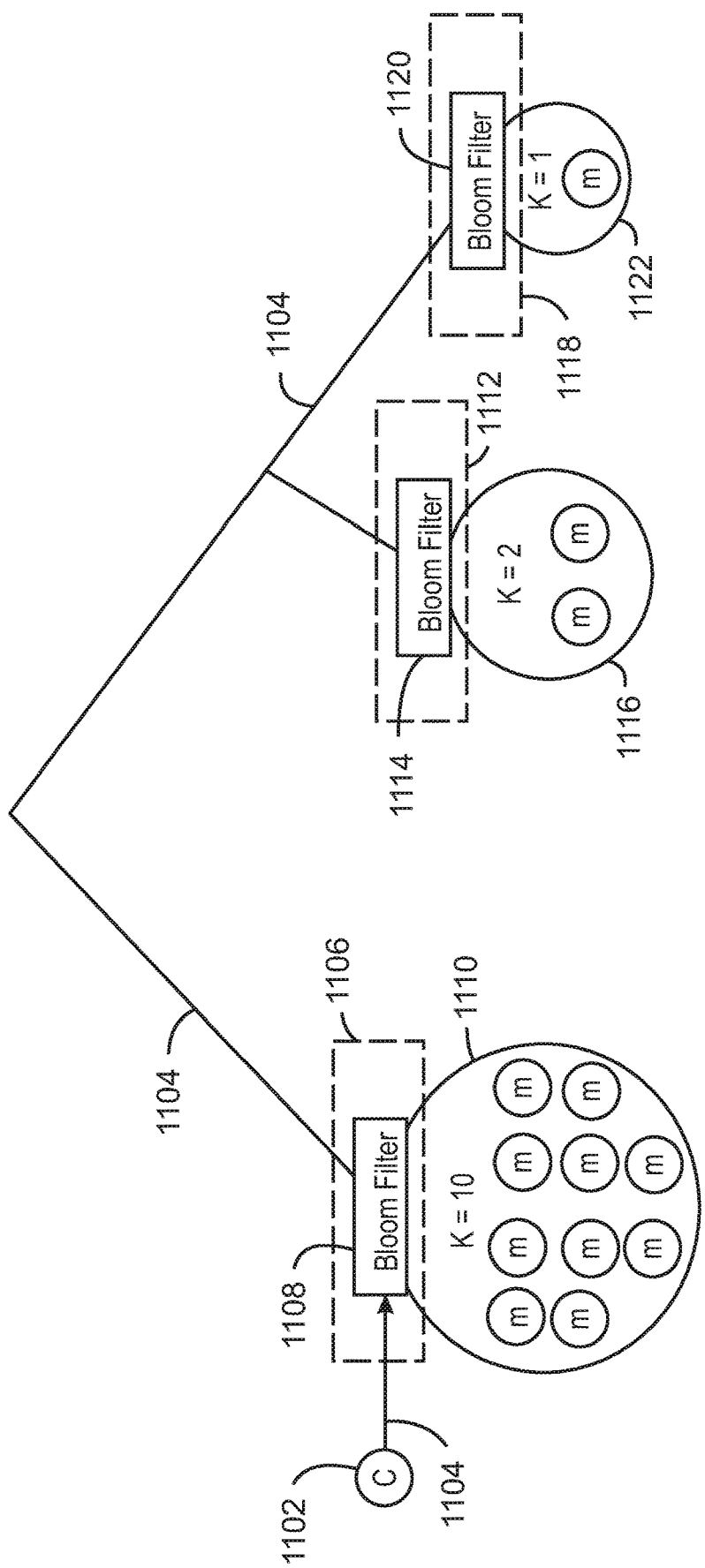
FIG. 11 is a schematic diagram of a process using bloom filter hops to discover resources in accordance with some embodiments.

FIG. 11 is a schematic diagram of a process 1100 using bloom filter hops to discover resources. In the process 1100, a client, c, node 1102, broadcasts a search 1104 for a resource to a nearest mining, m, node$_{1106}$ in accordance with some embodiments. The m node 1106 maintains its own bloom filter 1108 populated with the contents of services, smart contracts and files held within nodes within its local k-bucket 1110, or as dictated by the operation of the underlying DHT protocol. If the result is negative, then the search has failed and the c node 1102 can decide using any of a number of criteria whether to terminate the search or to continue. If the result is to continue, then a more exhaustive search of the contents of the network may be carried out.

As used herein, a bloom filter is a probabilistic data structure, such as a storage structure including a number of bits, that may be used to test whether an element is a member of a set. A query may return one of two different results, possibly in a set or not in the set. Each element, or result, in the bloom filter is a hash function used to populate some set of bits in the filter. If a hash used for search matches all the bits in a bloom filter, then the desired result may be included in the associated K bucket. In contrast, if any of the bits do not match, then the desired result is not in that K bucket. If a potential positive result is returned, a further search of hash codes in the DHT of nodes associated with that K bucket may be performed to determine if the desired result is present.

To continue, the m node 1106 broadcasts the search 1104 to another node 1112. That node 1112 may include a bloom filter 1114 populated with the contents of nodes in its local K bucket 1116. If that search is not successful, the c node 1102 has the choice whether to continue the search. If the c node 1102 chooses to continue the search 1104, it may be broadcast to another node 1118. This node 1118 also includes a bloom filter 1120 listing the contents of the nodes in its K bucket 1122. In this case, the search 1104 successfully locates a target service in three hops. Exemplary criteria for continuing a search includes a balance between the criticality of finding a match versus the additional cost to the network of a further search.

Figure 12:
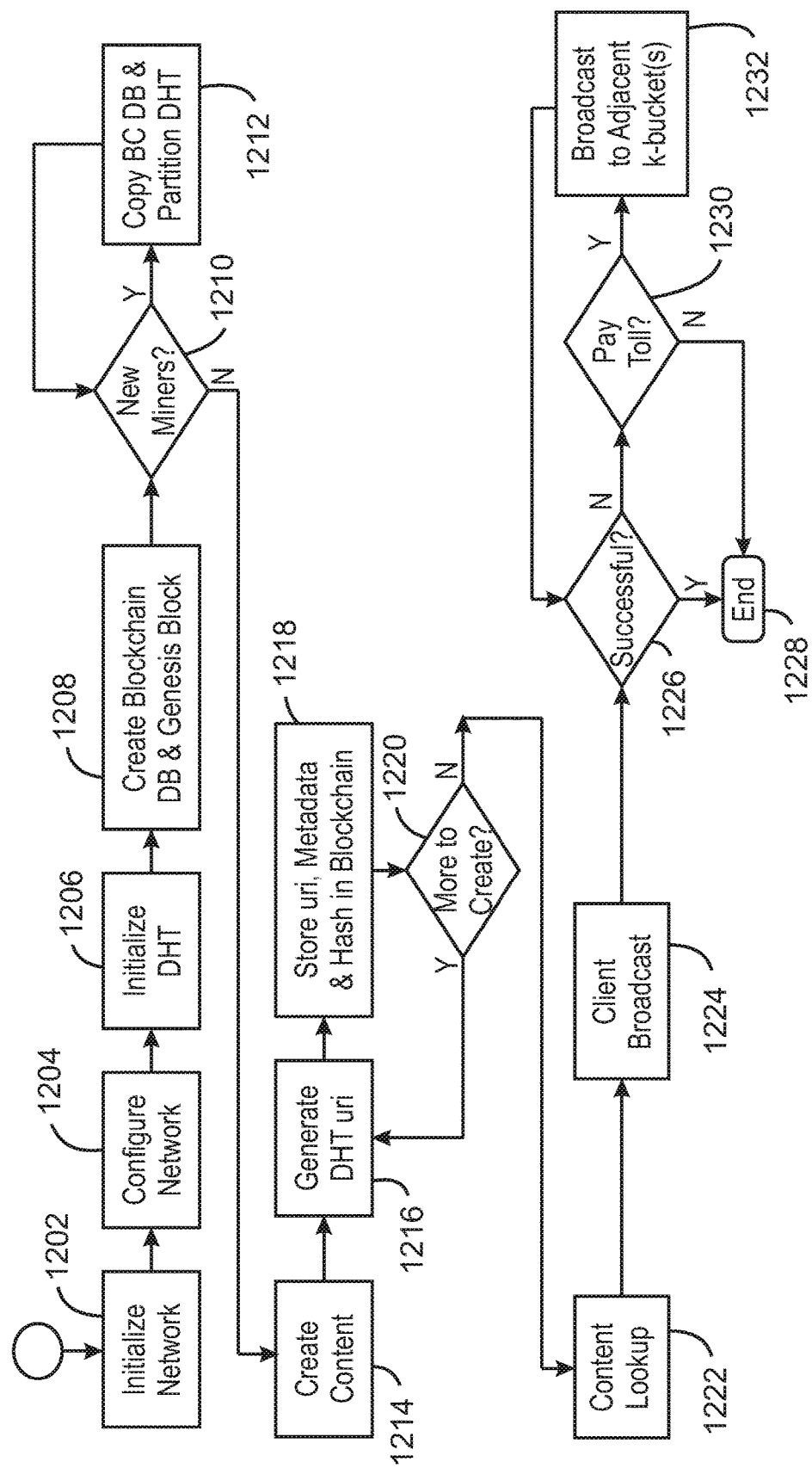
FIG. 12 is a process flow diagram of an example method resource discovery using DHT in accordance with some embodiments.

FIG. 12 is a process flow diagram of an example method 1200 for resource discovery using distributed hashtags (DHT) in accordance with some embodiments. The method 1200 of FIG. 12 may be implemented by the IoT device 1300 described with respect to FIG. 13. As described herein, a decentralized blockchain may store most of its data in an associated DHT, thus lowering the size of the blockchain database (DB). Resources, such as smart contracts or even files, may be located in the DHT. The providence of the resources may be backed up by the presence of the blockchain record and its associated hash.

A toll payment may be associated with lookups to encourage clients to accept search results that may include a sub-optimal result, so long as a result may fulfill the requirements. The toll payment is a charge for extending the search across devices through further hops between devices and networks. It may be charged if a search is not successful in a first k-bucket, and the client requests that the search be extended. This may save costs over performing an exhaustive search of the network for a somewhat better result.

The block 1202 represents, for example, when the network is powered or new devices are added to it. At block 1204, the network is configured. Both the blockchain and the DHT may need to be configured. Blockchain settings may include a choice of consensus algorithm, a reward level for miners or validators who propose successful blocks, the difficulty level of the algorithm, how often the reward levels are adjusted, and the like. As used herein, the miners or validators are devices that identify devices that may be able to provide a service or function by accessing blockchains and DHTs to located a likely target. The difficulty level of the algorithm may indicate the number of search terms to be matched for a successful search. The reward level may be considered the payment made to a miner or validator for performing a successful search. It may be based on the complexity of the search, the number of hops to reach a reslt, and the like.

At block 1206, the DHT is initialized. The DHT is instantiated and begins its operation. The DHT owner is free to use any existing DHT or to specify or implement their own specialized protocol, which may further integrate with the blockchain or enable their own differentiating features. The DHT may include non-typical settings, such as how many replicas of a piece of data should be held within the network. In a DHT, files may expire, for example, when the last of any of the peers in a swarm, or the tracker node are no longer available. As described herein, a blockchain-aware DHT may maintain replicas of files automatically within the network. Data may be preserved indefinitely, if the owner of that data has not specified any conditions around how the data can be removed or deleted. Otherwise, data can have a fixed time-to-live (TTL) or the owner and specified delegates may remove it.

At block 1208, the initially empty blockchain database (DB) and genesis block are created. Not all of the data is needed to be stored in the blockchain, as data stored in the blockchain may point to other locations. The blockchain developer may specify what fields or parameters are included in records added to the blockchain through the specific protocols that are implemented. The parties creating or maintaining the blockchain may delegate that decision to application developers, who may choose to store particular data on the blockchain or the blockchain depending on the rules permitted to them by the blockchain developers. In this example, data stored off of the blockchain may be stored in the DHT. At any time in the process, other units may join the network as miners or validators. The miners may add data to the DHT, and to the blockchain, concerning stored resources. The validators may confirm that that data is correct, store the DHT, and perform search functions to locate data concerning stored resources.

At block 1210, a determination is made as to whether there are new participants, such as miners or validators, joining the network. If so, at block 1212, a newly joined miner or validator may copy the blockchain database and the partition DHT. Process flow then returns to block 1210 to determine if any more miners or validators wish to join the network. Any node may be both a miner and a validator, if so permitted by the blockchain protocol in operation. Further, any node may be a blockchain storage or DHT node. If new notes joining the network are participating in the DHT network, this may result in the repartitioning of the DHT in accordance with the protocol rules of the DHT.

At block 1214, the content for the blockchain database and the partition DHT may be created. The content creation may be a two-step process, in which the data gets stored, replicated, and distributed in the DHT and a record pointing to the data location is stored in the blockchain. The content creation may include additional steps for specific types of content, such as determining and accessing content sources, among others. One aspect of this approach over traditional blockchains is that not all miners or validators in the network need to keep records of all the same data. In Ethereum, for example, smart contracts are stored on-chain, meaning that every validator in the network has a duplicate copy. In this example, if the DHT specifies to keep three replicas of each data object, then file fragments for three copies are distributed across nodes participating in the DHT and not every node needs to have a full copy of every file.

At block 1216, a Uniform Resource Identifier (URI) is generated for the created content. The URI may use traditional approaches where a tracker is involved. However, this would introduce a centralized component. Accordingly, to keep the data distributed across the network, the URI may utilize a magnet link or similar content based networking approach, rather than a location based identifiers for data.

At block 1218, the content creator stores the URI, any additional metadata prescribed by the blockchain protocol, and a hash of the contents of the object as stored in the DHT. The hash, stored in the blockchain, assures the providence of the data object, and may be used to verify its contents have not changed. Further, storing the hash in a blockchain may be used to confirm that it existed on a particular date, was created or owned by a specific identity, and the like.

The metadata may be used to control what content creators are allowed to do. For example, a smart contract owner may create a computer program and "orphan" it on the chain so that it may not be subsequently terminated its execution. Accordingly, the blockchain protocol owner may need to give careful consideration on what functions to enable to the blockchain. If enabled, data may live forever in the DHT without deletion for the life of the blockchain, and rights to the data may not be delegated. The data in the DHT may be encrypted using any method that is at the disposal of the data creator to utilize.

At block 1220, a determination is made as to whether there is more content to create. The content creation may be a continuous loop in the method 1200 running in parallel to other activities, so long as both the DHT and the blockchain continue to exist.

At block 1222, content may be identified in the blockchain, or the DHT, or both. The content lookup may begin by checking a bloom filter stored in the blockchain to determine if there is a bit match between the hash of the search target and the bloom filter. If so, this may indicate that the content may be present in the K bucket associated with the bloom filter. The content lookup may then examine the DHT to determine if the content is present.

Content lookup is performed to find data that is no longer stored on-chain and replicated to every node in the network. The data may be stored in a global network, or data plane, making an exhaustive search of the entire network potentially problematic. The DHT implements its own distance metric algorithm to form the k-buckets. Distance may not necessarily be representative of geographical distances, but may be based on, for example, number of hops between participating nodes, latency across those hops, and the like.

Aspects disclosed herein may allow for finding "good enough" search results without necessarily having to find the best global result. As disclosed further below, a disincentive against exhaustive searching may be introduced based on an alternative concept of "toll." As explained earlier, a client may want to search for or discover nodes within the network, which are offering or consuming particular services or data. A typical scenario might be a decentralized global market place for IOT data in which data suppliers and data consumers want to find and contact each other but without the need for centralized marketplace hosters (an example might be eBay or Amazon).

At block 1222, a client broadcasts the hash code of the search target to its n nearest mining or validating nodes. The nodes are defined as being "close" to another node by the DHT distance algorithm. The nodes that are defined as being close may be considered the nodes within the K bucket.

Further, the nearest mining or validating nodes have a substantial amount of information about the resources stored within their region. They implement bloom filters as an optimization, for example, so that the client broadcast can be quickly responded to if negative, or a more exhaustive search can be used if it is positive.

At block 1226, a determination is made as to whether the search was successful. The search is successful if it returns one or more results. The "toll" cost for a local broadcast is either minimal or 0, depending on the preference of the blockchain or DHT protocol developers to encourage clients to accept results when possible. If the search identifies a data supplier, the client has to decide if the results are satisfactory, in which case the search process ends, or if they want to search further. The network applies algorithms to calculate "toll" costs for wider searches, should the client wish to proceed further.

At block 1230, a determination is made as to whether the client can pay the toll. In some examples, the client may opt to change the criteria of the search and perform a different local search rather than proceed with the costlier search. The toll cost can be paid in many ways, such as a charge in the crypto-coin currency used by the blockchain. The toll cost may be paid as a service charge added into any contract engagement, where suppliers and producers have concluded a successful contract engagement. The toll cost may be part of the billing calculation of the internet service provider.

If the total cost is paid at block 1230, at block 1232 the broadcast is extended to adjacent K buckets. Process flow then returns to block 1226 to determine if the search has been successful. If so, or if the toll has not been paid at block 1230, the search ends at block 1228.

Figure 13:
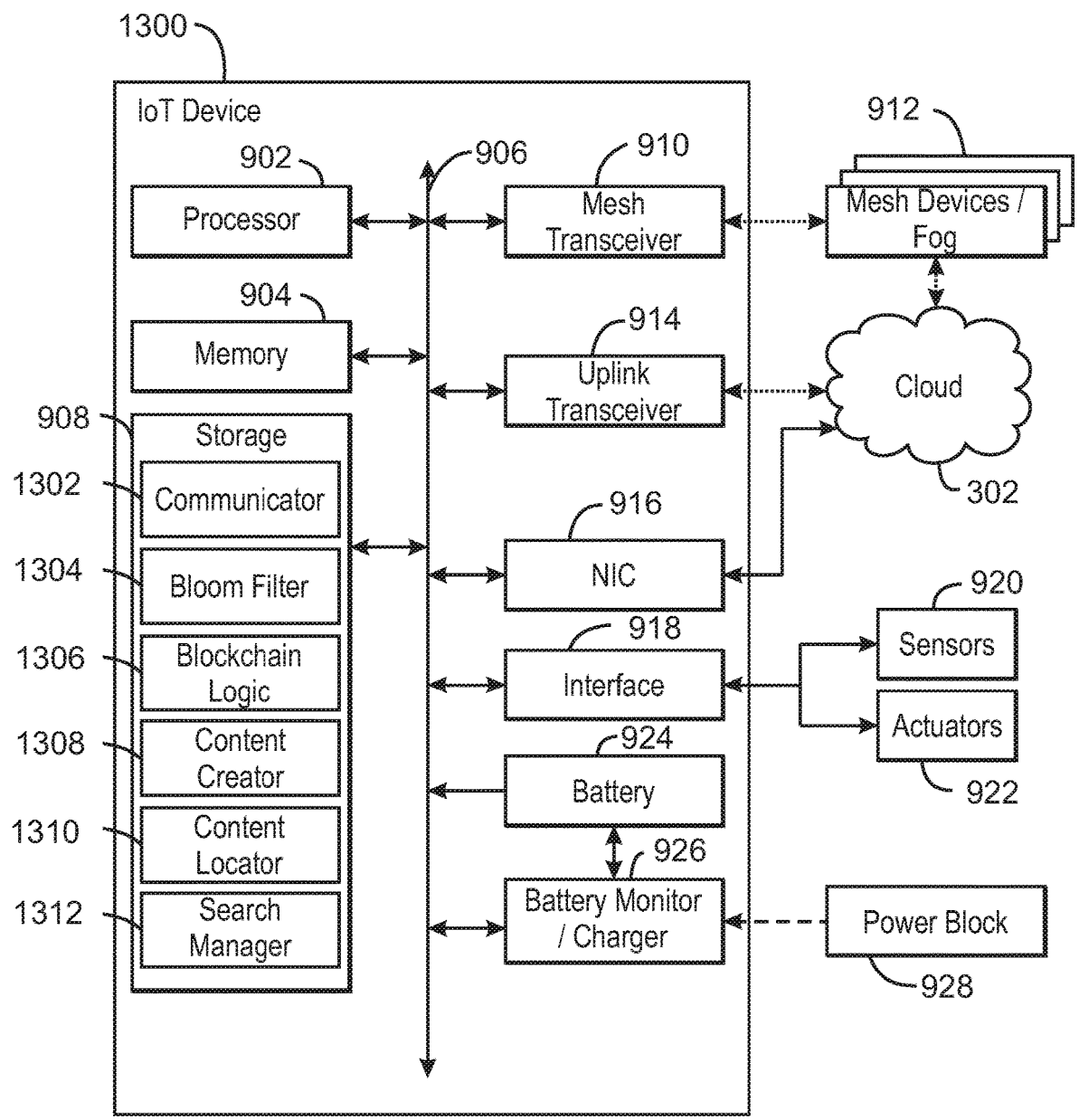
FIG. 13 is a block diagram of an example of components that may be present in an IoT device for assembling multiple fractional keys from different nodes in an IP mesh network into a single complete key in accordance with some embodiments.

FIG. 13 is a block diagram of an example of components that may be present in an IoT device 1300 for assembling multiple fractional keys from different nodes in an IP mesh network 812 into a single complete key in accordance with some embodiments. Like numbered items are as described with respect to FIGS. 3 and 9. It can be noted that different components may be selected and used for the IoT device 1300 than for those selected for the IoT device 900 discussed with respect to FIG. 9, and other IoT devices discussed herein.

The IoT device 1300 or the mass storage 908 therein may include a number of modules to implement the coalition group formation described herein. Although shown as code blocks in the mass storage 908, it may be understood that any of the modules may be fully or partially replaced with hardwired circuits, for example, built into an application specific integrated circuit (ASIC).

The mass storage 908 may include a communicator 1302 that sends packets to and receives packets from mesh devices 912 or devices in the cloud 302 over one more communications links, for example, through a mesh transceiver 910, an uplink transceiver 914, and a NIC 916, among others. The communicator 1302 may perform other functions in addition to those described with respect to FIG. 12, such as translation of packets between protocols, performing proof-of-provenance additions, and the like. Further, the communicator 1302 may be part of an easement system.

A bloom filter 1304 may be included in the mass storage 909 to hold a bit sequence that contains overlapping hash values for items, such as resources or smart contracts, in an associated K bucket. The K bucket may include information for a number of different IoT devices, wherein an IoT device is capable of providing resources, services, or smart contracts. The bloom filter 1304 may also be associated with entries in a DHT database.

Blockchain logic 1306 may be used to create entries in a blockchain, such as the URI, any additional metadata prescribed by the blockchain protocol, and a hash of the contents of the object as stored in the DHT. The content creator 1308, may be included to create the content for the bloom filter and for the blockchain, such as the URI, the metadata, and the hash codes. A content locator 1310 may be included to locate content. A search manager 1312 may direct the search for values, for example, accepting results from searches that may have resulted in potential positive results, or determining if further searching is needed. The search manager 1312 may pay any tolls required for further hops in the search.

Figure 14:
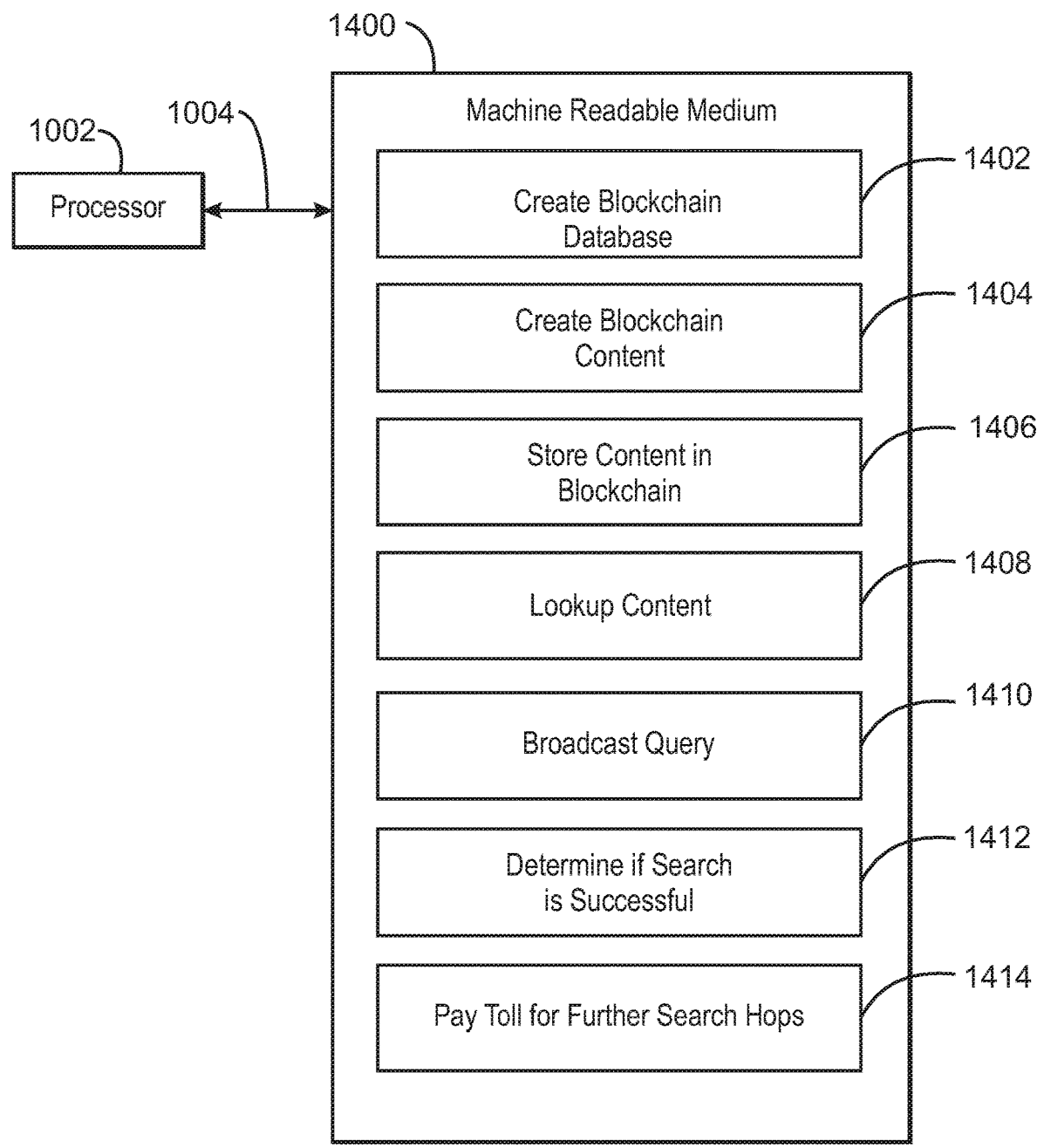
FIG. 14 is a block diagram of a non-transitory, machine readable medium including code to direct a processor to use a bloom filter hops method for resource discovery in accordance with some embodiments.

FIG. 14 is a block diagram of a non-transitory, machine readable medium 1400 including code to direct a processor 1002 to use a bloom filter hops method for resource discovery in accordance with some embodiments. The processor 1002 may access the non-transitory, machine readable medium 1400 over a bus 1004. The processor 1002 and bus 1004 may be as described with respect to FIG. 10. The non-transitory, machine readable medium 1400 may include devices described for the mass storage 908 of FIG. 9 or may include optical disks, thumb drives, or any number of other hardware devices.

The non-transitory, machine readable medium 1400 may include code 1402 to direct the processor 1002 to create a blockchain database. Code 1404 may be included to direct the processor 1002 to create blockchain content. Code 1406 may be included to direct the processor 1002 to store blockchain content in the blockchain DB. Code 1408 may be included to direct the processor 1002 to search for content. Code 1410 may be included to direct the processor 1002 to broadcast the query to devices within one hop. Code 1412 may be included to direct the processor 1002 to determine if the search has been successful. Code 1414 may be included to direct the processor 1002 to pay a toll for further search hops.

Techniques disclosed herein may refer to a native decentralized database. The native decentralized database may be a database which understands the concept of participation in a decentralized cluster as opposed to a distributed one. In an example, the decentralized database may function through the use of public and private partitioning of tables within a database for natively supporting decentralized operation of distributed databases. This may improve the operation of an IoT system by allowing the distributed storage of data across a number of constrained devices.

Figure 15:
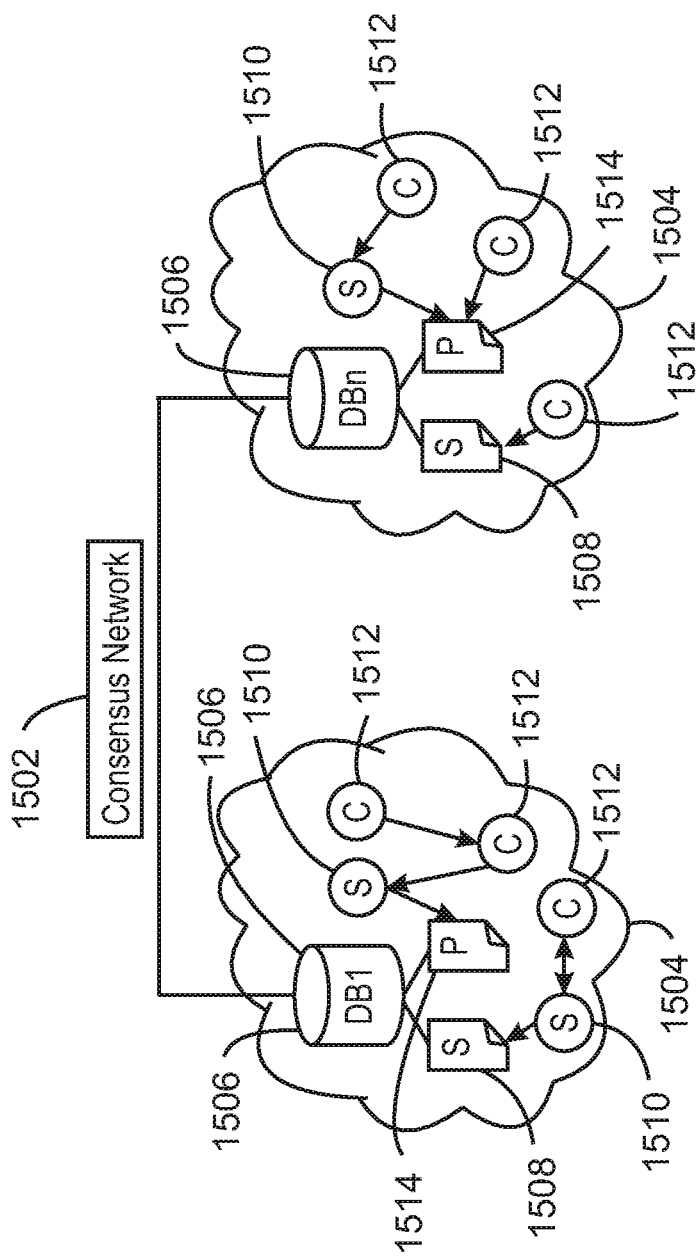
FIG. 15 is a schematic diagram of a process for configuring and operating a consensus network using a native decentralized database in accordance with some embodiments.

FIG. 15 is a schematic diagram of a process 1500 for configuring and operating a consensus network 1502 using a native decentralized database in accordance with some embodiments. The consensus network 1502 can have a node 1504. The consensus network can have a number of nodes 1504 including a first node through an nth node. While using a natively decentralized database cluster, a party not known to the network may join the network. The existing nodes 1504 may be barred from forming a central authority. Joining the network may include a request to join a transaction that may be issued to a public uniform resource locator (URL) or advertised name space. The namespace may be hardcoded into a storage or adjustable by a user. If a node 1504 in the consensus network 1502 indicates a message requesting implementation of a central authority, made up of the nodes in the network, the nodes 1504 may vote on the accession of new members. Nodes in a central authority may establish rules allowing by default, new members to join the network. Once a new member joins, the database 1506 of the new member may be synchronized with the databases 1506 of existing members. The synchronization may include the shared, S, partitions 1508 to be replicated. The databases may be block-chain databases.

Shared partitions 1508 may be replicated by the underlying database 1506. Shared partitions 1508 may be used to house a data plane. Shared partitions 1508 may be used to house the consensus block-chain. A network may consist of many services 1510 and clients 1512 which may be performing tasks. The services 1510 and clients 1512 may, for example, be IOT systems collecting and processing data to make actuation decisions locally. Data gathered and calculated by the services 1510 and clients 1512 may be sent to a private partition 1514. The private partitions may be centrally controlled.

Whenever a network owner indicates a service may be shared, or that the service data derived from a service may be shared, the settings of the private partition may change or be copied to a public partition 1508. The moving of data from a private partition 1514 to a public partition 1508 may include adding data to an off-chain mechanism. The changing of data from private to public may, for example, include using the consensus nature of a decentralized database 1506 to participate in voting within the decentralized network 1502. Other techniques for changing the data from public to private, or vice versa, may include commands received from central systems, an expiration date on the data, and the like. Combinations of these may be used. For example, an expiration date may be included in a policy, after which a consensus of devices in a network determine that the status should be changed from private to public.

Private partitions 1514 may be replicated to other nodes owned by the network owner. Private partitions 1514 may in some cases be limited in their replication to other database instances operated by other members of the consensus network. The shared partitions may be permissioned and/or encrypted.

A network owner may, for example, be the data owner and by creating a shared partition 1508, the permissions and encryption on the partition may be set by the network owner. Permissions may, for example, be role based, or they can be RADIUS/DIAMETER protocol based, among others. Role based permissions may include other actors in the network possessing a particular role to access certain data. RADIUS or DIAMETER based may, for example, refer to an authentication method used by the internet as a permission control mechanism. Encryption may employed by the network. For example, encryption may include public key methods, private key methods, passwords, passphrases, Triple Data Encryption Standard (DES), Blowfish, Twofish, or AES. By adjusting the permissions and encryption with a shared partition, a data owner may retain the ability to control the parties in the network that may be authorized to access the data. By adjusting the permissions and encryption with a shared partition, a data owner may be able to store data in an off-chain manner.

Copies of the data may be replicated to nodes containing the identified privileges. Nodes containing identified privileges may have these identified privileges revoked at any time by the data owner. Revocation of identified privileges may result in either the loss of access to future data shared by the data owner, or revocation of privileges extending to historical data. The permissions system may be created to control the ability of a data consumer to make copies of the data. Limiting the ability of the data consumer to make copies of data may include the ability to revoke access to previously shared data if a role is revoked and the data consumer does not have permissions to make copies of the data.

The ability to grant and revoke roles may be handled by the control plane. The control plane may run as part of the consensus network and such roles and access to data may be granted between parties either in exchange for a digital currency. The digital currency may be an agreement to mutually share data between peers.

Figure 16:
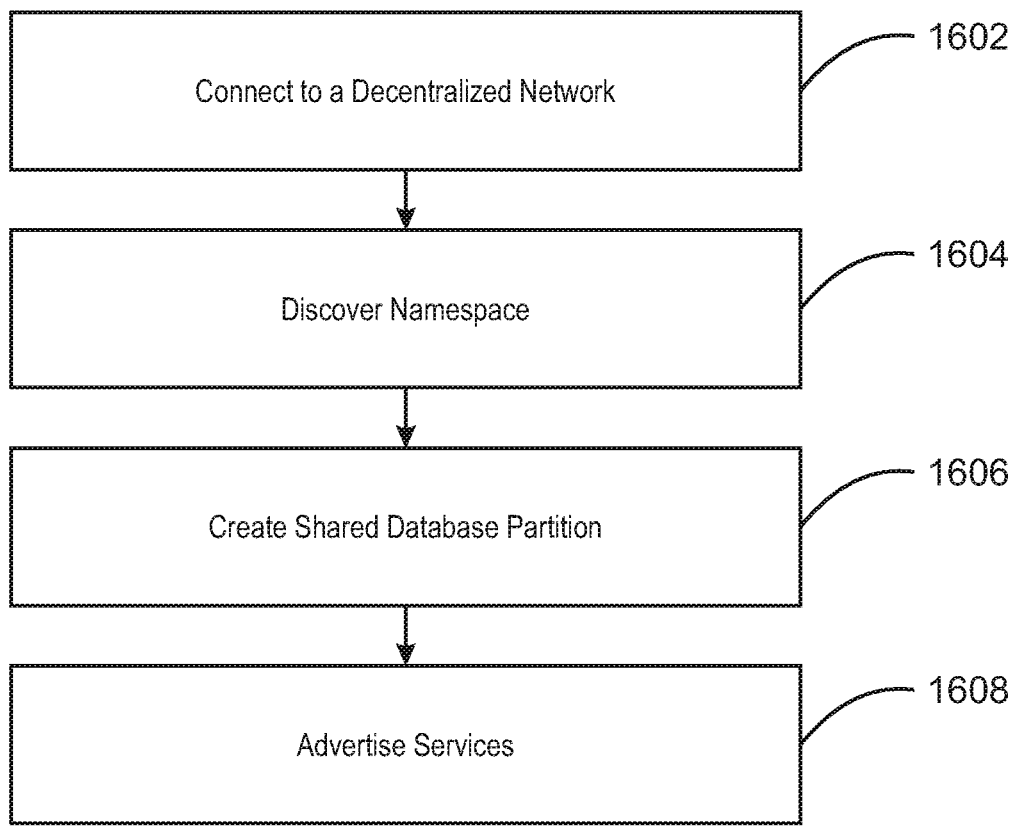
FIG. 16 is a process flow diagram of an example method for joining and operating within a consensus network using a native decentralized database in accordance with some embodiments.

FIG. 16 is a process flow diagram of an example method 1600 for joining and operating within a consensus network using a native decentralized database in accordance with some embodiments. The method 1600 of FIG. 16 may be implemented by the IoT device 1700 described with respect to FIG. 17. At block 1602, a device may connect to a decentralized database network. Connecting may be distinguished from joining in some examples, as joining may imply acceptance and trust by other nodes. Decentralized binary software may be installed. The database may create private database partitions, or tables, which may be limited from replication on other nodes. The number, size, and function of those bases may be at the discretion of the system owner or system developer.

At block 1604, the system may discover namespaces. Namespaces may, for example, refer to other networks, and the other networks may be offering decentralized database services. The discovery of namespaces may, for example, be done through location lookups, network discovery, device discovery, and the like. The discovery process may be automated or hardcoded. A request to join the network may be initiated by the device attempting to join. The request may be driven by a construct such as a permissions guide. The request to join the network may be made through a known node on an existing network of the device, where the joining node may use the known node of the cluster to join the cluster. A decision on how to allow a new node to join a network may be made when the network developers first initialize the network or at an earlier or later time. As discussed above, the network developers, may set the conditions for the allowance of nodes through policies implemented on participant nodes in a decentralized database cluster. The policies may automatically accept participants requesting to join, once the participants are running a verified version of the decentralized database software. The verification of the decentralized database software may be performed using a measured environment to confirm that the software is on a whitelist, as described herein. Any number of other techniques may also be used to confirm the version and validity. The acceptance policies may use a vote to accept or reject the new entity.

New entities may join initially with roles which have limited authority in the decentralized database cluster, and over time the entity may become more authoritative as trust measures for the entity increase. The network developers may allow a designated node to become a validator on the network. For example, network developers may designate nodes as validators for block-chains like bitcoin. If a node attempting to join a decentralized database cluster gets rejected, the node may continue operating as a standalone database. The standalone database may serve centralized application that exist in the same security domain and/or network as the standalone database. A node attempting to join a decentralized database cluster may attempt to discover one or multiple namespaces. A node attempting to join a decentralized database cluster may join more than one consensus network, if polices implemented by the network developers permit.

At block 1606, a node allowed to join a decentralized database cluster may create a number of shared partitions and tables as specified, for example, by the network developers. Data stored in shared partitions and shared tables may be replicated within the network. The network may indicate how many copies of a data object may be stored for redundancy. A replication factor may be global, or the replication factor may be applied differently based, for example, on data object type. The replication factor may be selected based on the criticality of the data, or may be selected on piecemeal basis for partitions and tables, depending on the importance of the data. Data being stored may be sharded. Sharded data may refer to data stored in partial pieces across participating nodes in the network so that no single node has a complete set of shards for reconstruction of a particular object.

At block 1608, a node may be synchronized with the rest of the network and may advertise its services. Advertisement for services may, for example, include listening on a particular port or range of ports. Clients using the database may access the databases services over a range of ports. The natively centralized database may route data it receives so that the data may be stored in the private partitions and private tables or the shared partitions and shared tables. The clients may be aware of the decentralized nature of the database and the client may request that the decentralized database store the data privately. The clients may be aware of the decentralized nature of the database and the client may request that the decentralized database store the data publicly. Participants in the decentralized network may keep the data of the participant in one location, and later choose data the participant may be willing to share and which data not to share. Data stored in private partitions or shared partitions may be encrypted at the direction of the data owner before the data is stored. Encryption may be done by the clients and/or may be implemented in the decentralized database, for example, if the data owner trusts the database. A decentralized database may enable a shared market place for IoT data.

Figure 17:
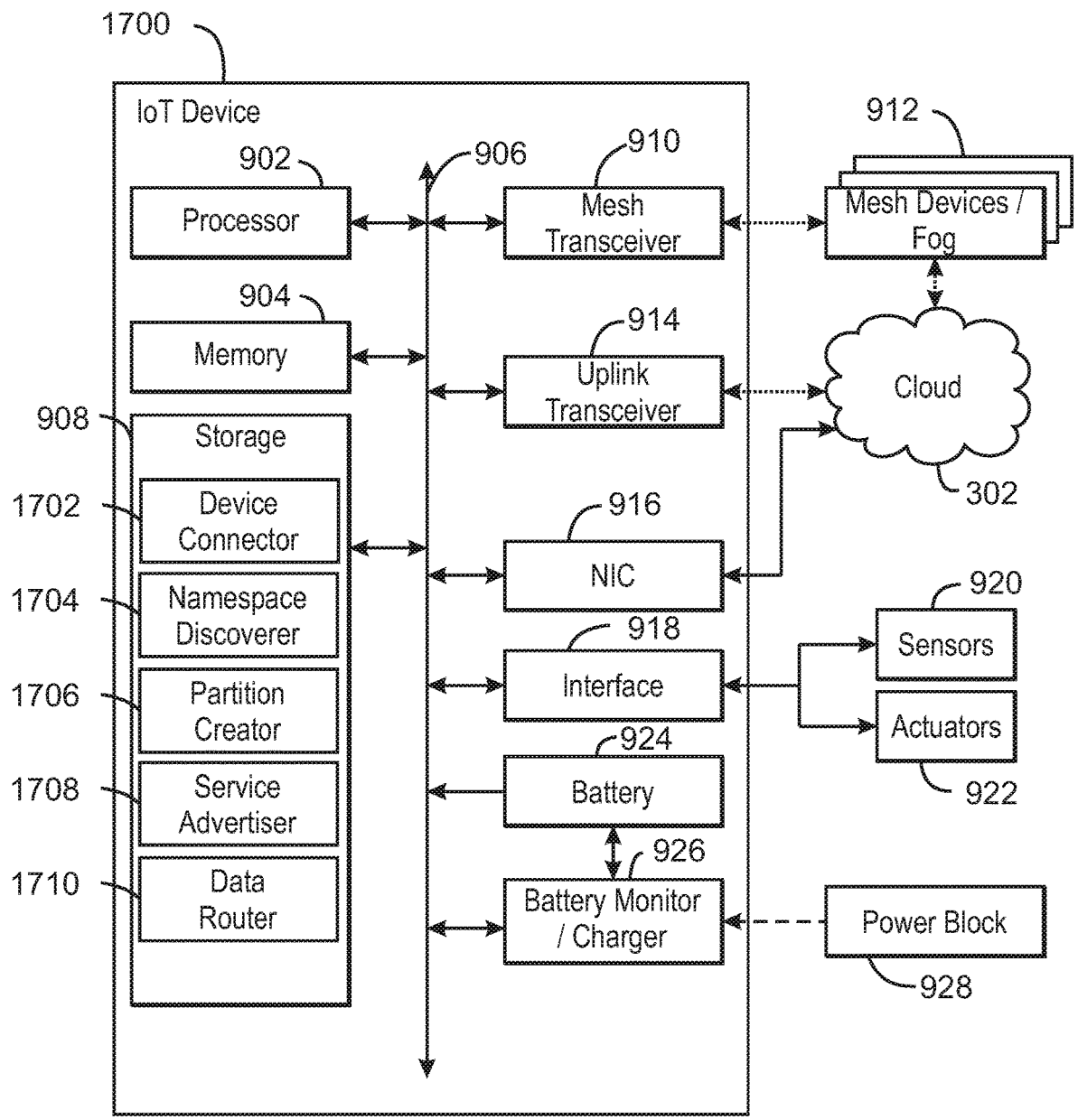
FIG. 17 is a block diagram of an example of components that may be present in an IoT device for joining and operating a decentralized database in accordance with some embodiments.

FIG. 17 is a block diagram of an example of components that may be present in an IoT device 1700 for joining and operating a decentralized database in accordance with some embodiments. Like numbered items are as described with respect to FIGS. 3 and 9. It can be noted that different components may be selected and used for the IoT device 1700 than for those selected for the IoT device 900 discussed with respect to FIG. 9, and other IoT devices discussed herein.

The mass storage 908 may include a number of modules for joining and operating a decentralized database. Although shown as code blocks in the mass storage 908, it may be understood that any of the modules may be fully or partially replaced with hardwired circuits, for example, built into an application specific integrated circuit (ASIC).

The mass storage 908 may include a device connector 1702 to connect a device to a network of a decentralized database. The device may install decentralized database software in response to connecting to the network of a decentralized database. The device may create a shared database partition in response to connecting to the network of a decentralized database.

The mass storage 908 may include a namespace discoverer 1704 to discover a namespace of a node of the decentralized database. The device may request to join the decentralized database in response to discovering the namespace of the node of the decentralized database. The device may be accepted to the decentralized database in response to discovering the namespace of the node of the decentralized database.

The mass storage 908 may include a partition creator 1706 to create a shared database partition in response to being accepted by the node. The shared database partition may be at least one of permissioned and encrypted. Copies of data stored in a shared database partition may be replicated to a second node in response to the second node presenting privileges indicating the authority of the second node to copy the data. The device may replicate a shared node partition for storage in the shared database partition, in response to creating the shared database partition.

The mass storage 908 may include a service advertiser 1708 to advertise a service to the decentralized database. The mass storage 908 may include a data router 1710 to route data received and generated during the execution of a service between a private database partition and a shared database partition. The data in the shared partition may be replicated for storage in a shared node partition in response to data being routed to the shared database partition. The device may receive acceptance to the decentralized database in response to the node voting on acceptance of the device.

Figure 18:
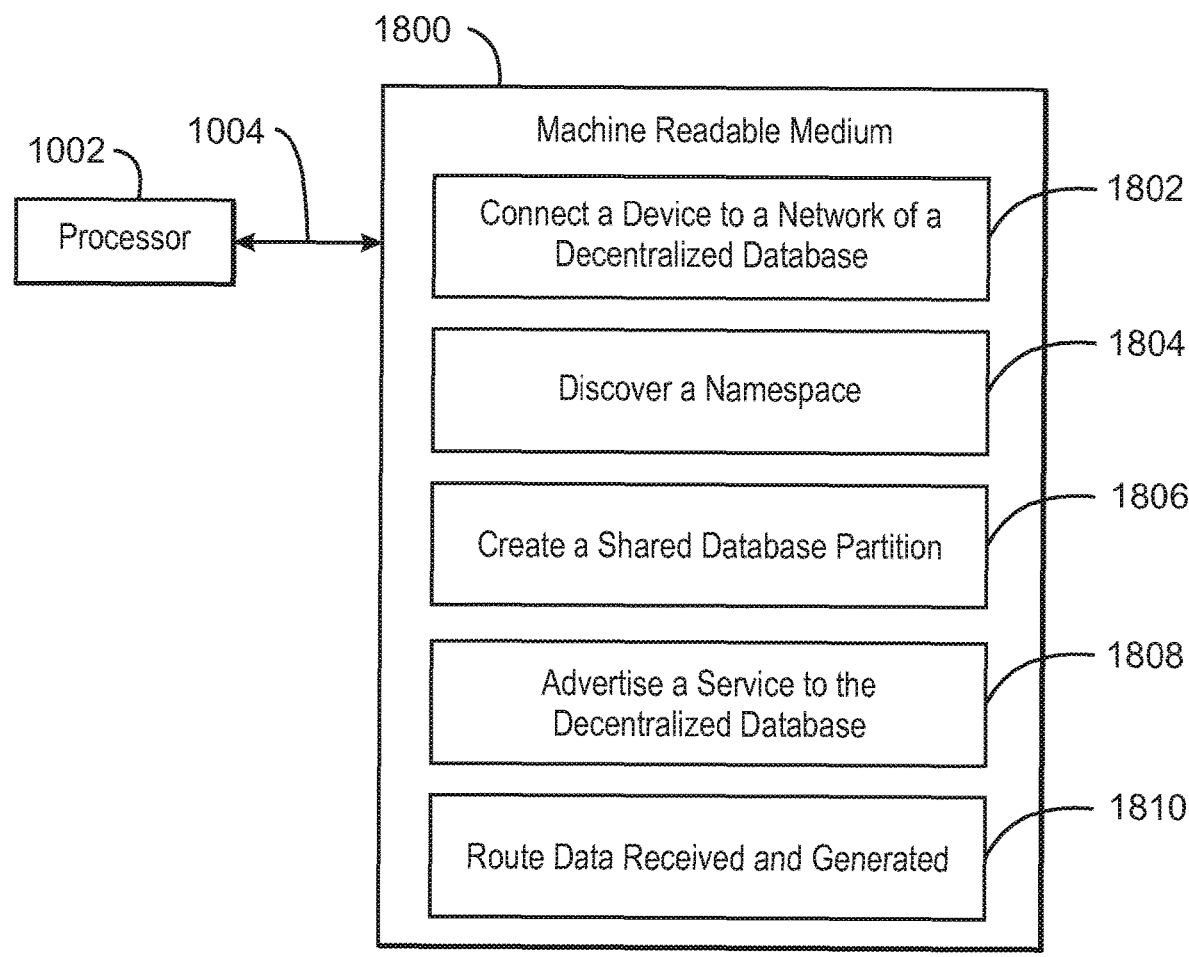
FIG. 18 is a block diagram of a non-transitory, machine readable medium including code to direct a processor for joining and operating a decentralized database in accordance with some embodiments.

FIG. 18 is a block diagram of a non-transitory, machine readable medium 1800 including code to direct a processor 1002 for joining and operating a decentralized database in accordance with some embodiments. The processor 1002 may access the non-transitory, machine readable medium 1800 over a bus 1004. The processor 1002 and bus 1004 may be implemented in a manner similar to the processor 1002 and bus 1004 described with respect to FIG. 10. The non-transitory, machine readable medium 1800 may include devices described for the mass storage 908 of FIG. 9 or may include optical disks, thumb drives, or any number of other hardware devices.

The non-transitory, machine readable medium 1800 may include code 1802 to direct the processor 1002 to connect a device to a network of a decentralized database. The device may install decentralized database software in response to connecting to the network of a decentralized database. The device may create a shared database partition in response to connecting to the network of a decentralized database.

The non-transitory, machine readable medium 1800 may include code 1804 to direct the processor 1002 to discover a namespace of a node of the decentralized database. The device may request to join the decentralized database in response to discovering the namespace of the node of the decentralized database. The device may be accepted to the decentralized database in response to discovering the namespace of the node of the decentralized database.

The non-transitory, machine readable medium 1800 may include code 1806 to direct the processor 1002 to create a shared database partition in response to being accepted by the node. The shared database partition may be at least one of permissioned and encrypted. Copies of data stored in a shared database partition may be replicated to a second node in response to the second node presenting privileges indicating the authority of the second node to copy the data. The device may replicate a shared node partition for storage in the shared database partition, in response to creating the shared database partition.

The non-transitory, machine readable medium 1800 may include code 1808 to direct the processor 1002 to advertise a service to the decentralized database. The non-transitory, machine readable medium 1800 may include code 1810 to direct the processor 1002 to route data received and generated in response to execution of a service between a private database partition and a shared database partition. The data in the shared partition may be replicated for storage in a shared node partition in response to data being routed to the shared database partition. The device may receive acceptance to the decentralized database in response to the node voting on acceptance of the device.

In addition to using active data collection and modeling within an IoT network, IoT devices may be passive producers of data that is remotely processed and consumed by other systems, devices, or users. In some frameworks, data flows through a network to be stored and processed remotely either in the fog or the cloud. Based on the application, the processed information may be delivered to IoT device or devices in geographical proximity to the IoT nodes that generated the data.

In the present disclosure, an in-network processing paradigm may leverage an IoT network to act as an integrated computation and communication system. One method enables an IoT network to function as a parallel processor by collaboratively processing data as the data is transmitted through the network. Processing data in a parallel fashion may reduce or remove a dependency on further processing at the destination IoT device.

Providing proximity-based parallel processing in an IoT network allows data generated in a network to remain local to that network. Proximity-based parallel processing may also reduce or eliminate processes that forward data to external systems and networks, thereby reducing inherent potential security and privacy flaws in external data exposure. Proximity-based parallel processing may reduce latency present in an IoT system and may preserve the locality of the generated information. The reduction in latency for the calculations, and the preservation of the locality, may aid in automatic or semi-automatic control applications in which the consumers of the processed information are likely to be located in proximity to the sensing devices.

In one example of parallel processing in an IoT network, artificial neural networks (ANNs) may be used as the generic parallel processor implemented by an IoT network. ANNs may approximate any measurable function. In an example, a computation that is performed by a feed forward neural network may be partitioned into different tasks to be executed concurrently. The processing may exploit distributed processing, preserved locality, reduced latency, and similar characteristics to process the data while optimizing the use of resources in the network. The different computing tasks may be distributed into multiple IoT nodes taking into account the resources available at each node, the connectivity of the IoT network, producers and consumers of information in the network.

In an example, compute tasks may be decomposed for deployment across a fog resource that applies a computational practice of separating a computational task into pieces suitable for deployment upon a number of platforms within a network. In one example, the deployment and computation approach may be based on deployment across a fog resulting in utilization of another communications network as a tool for exchanging data between compute platforms. In this example, the computation and communications are considered as separate processes. Accordingly, deployment of distributed computing in this example system is undertaken without consideration of network topology or operation to support computation. The presently disclosed techniques jointly considers communication and computation in accordance with some embodiments.

Figure 19:
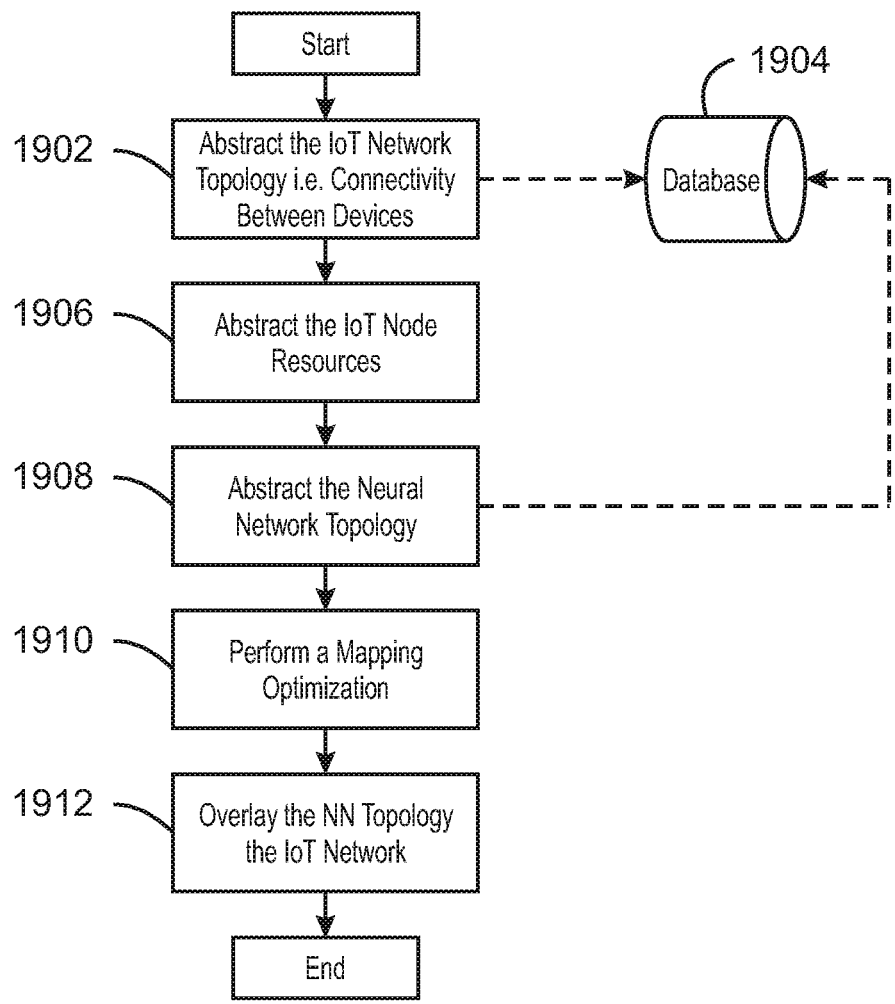
FIG. 19 shows a process flow diagram of an example method for use by an IoT device in distributed neural network mapping and resource management in accordance with some embodiments.

FIG. 19 shows a process flow diagram of an example method 1900 for use by an internet-of-things (IoT) device in distributed neural network mapping and resource management in accordance with some embodiments. The method 1900 of FIG. 19 may be implemented by the IoT device 2100 described with respect to FIG. 21. The method 1900 may be run using the system 900 described with respect to FIG. 9. Process flow may begin at block 1902.

At block 1902, an IoT device may obtain a network topology map and listing by identifying connected nodes and physical network characteristics. Physical network characteristics may include exact location or relative position to each other. Physical network characteristics may also include inter-node distances, clustering, dispersal information, received signal strengths, and signal to noise ratios. The obtaining of a network topology by the IoT device may additionally provide an abstraction of the IoT network topology for further use by the neural net mapping system. This may include determining the proximity of the devices to each other and the current power levels of the devices. As part of the abstraction, signal measurements may be retrieved from IoT devices. An example of signal measurements may include received signal strength indicator (RSSI) and broadcasting power. Once a topology is obtained, the IoT device may model expected path loss and interference in the network between devices. The results of the abstraction may be stored in an IoT database 1904.

At block 1906, the method may include abstracting the IoT node resources. These resources may include power levels, available storage space, current processing loads, networking capabilities, uptime, and node reliability information. In an example, networking capabilities may include interface types, latency, and data capacity. In an example, the IoT resources that are abstracted may be exposed via an application programming interface (API) wrapper function or representational state calls. Abstracting the IoT node resources may include software abstraction of a residual memory, power, and storage. Another subtask may include having the API wrapper function for the system resource info. Once abstracted, the IoT device may retrieve resource information it may access.

At block 1908, a neural network topology may be determined by executing subtasks, such as determining the location of input nodes with source data for processing, hidden nodes for intermediate neural net processing, and output nodes using sink data. As discussed with respect to other steps in this method, data may be stored either locally or remotely in the database 1904 or equivalent storage medium. Abstracting a neural network topology may, for example, include identifying a location using Euclidian distance using signal triangulation, or direct global positioning system (GPS) position reporting, among others.

At block 1910, the method performs a mapping optimization. The mapping optimization may include selecting and refining a multi-variate objective function with the objective of optimal assignment of node tasks based on current and historical network and node characteristics. The objective function may, for example, favor cost, reliability, processing speed and result production time, or geographical area spread. Another subtask of block 1910 may include formulating an integer linear program, objective function selection, refining constraints, and model development.

At block 1912, the method may include overlaying the neural network topology on the network. This may include mapping roles and tasks obtained from the optimization stage to physical nodes in the network. Tasks for a node are created, prepared, and dispatched to the physical nodes or devices. One subtask of block 1912 may include confirming successful deployment of the roles and tasks of from the optimization stage. Following the successful dispatch of tasks and roles, the system may commence an updated network and node mapping exercise in preparation for subsequent workload assignment requests. Process flow may then end, and may also start again as needed to abstract the IoT into a series of tasks that are distributable along nodes of communication and processing as discussed in the language above.

Figure 20:
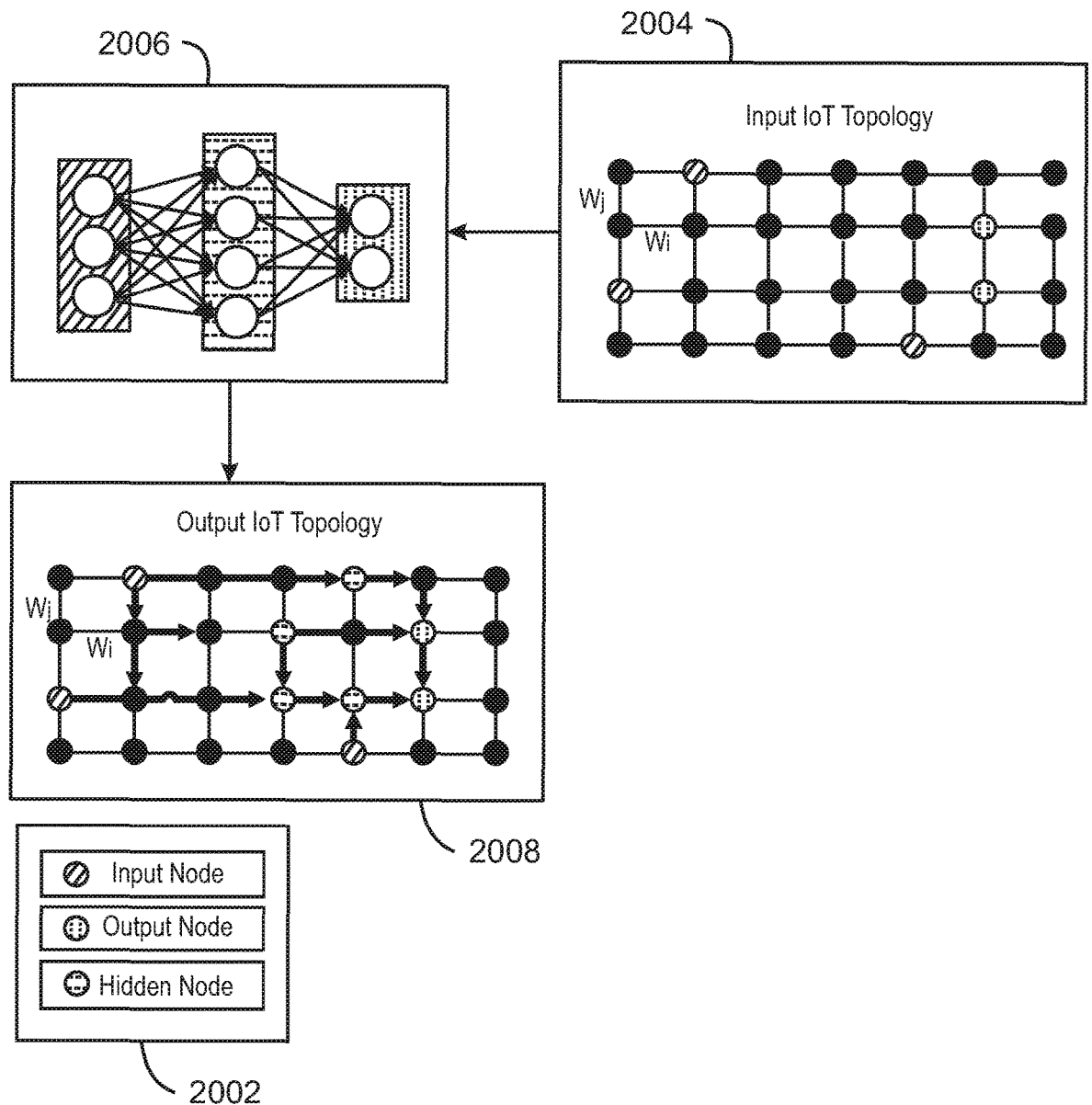
FIG. 20 is a schematic diagram for a distributed neural network mapping for resource management in accordance with some embodiments.

FIG. 20 is a schematic diagram for a distributed neural network mapping 2000 for resource management in accordance with some embodiments. A legend of symbols is provided in block 2002 that identifies the input nodes, output nodes, and hidden nodes in the example IoT network topologies shown.

In the input IoT network topology 2004, three input layer nodes, four hidden layer nodes, and two output layer nodes are shown scattered in the mesh of the IoT connections. In an example, each dot of the IoT topology represents a node. Nodes may be as described above and throughout this application, and may represent an IoT device, server, or other inter-connectable tool of communication and processing. In an example, the input IoT network topology may represent a visualization of nodes connections prior to optimization of mapping a neural network into a physical IoT network. Each of the pictured nodes, or devices, may act as one or more neurons and connections are realized via wireless links.

A mapping framework 2006 may represent attempting mapping between nodes to minimize transmission power and the transmission time for transmission of information from the input nodes to the output nodes. The mapping may take into account the resources available on each device, capabilities of each device, and the connectivity of IoT network. The node connection shown in the mesh of the IoT visualized node networks may each represent a weight and a time of transfer of information across a particular node.

The mapping framework 2006 may yield a mapping that shows data paths for an output IoT network topology 2008. The output IoT network topology may include an identification of physical nodes on to which to map neurons. The mapping may be achieved by formulating an optimization model that uses all the inputs associated with the underlay IoT network and the overlay neural network. Inputs to the optimization model may include the IoT topology and the resources available at each node, the neural network topology that is to be mapped on the IoT topology, the set of source nodes, and the set of output nodes. For the purposes of IoT network topology, the resources at each node may, for example, refer to memory resources, power resources, sensor resources, or storage resources, among others. Similarly, a neural network topology may be mapped on an IoT topology, including the number of layers and hidden neurons as shown at least in FIG. 20.

Figure 21:
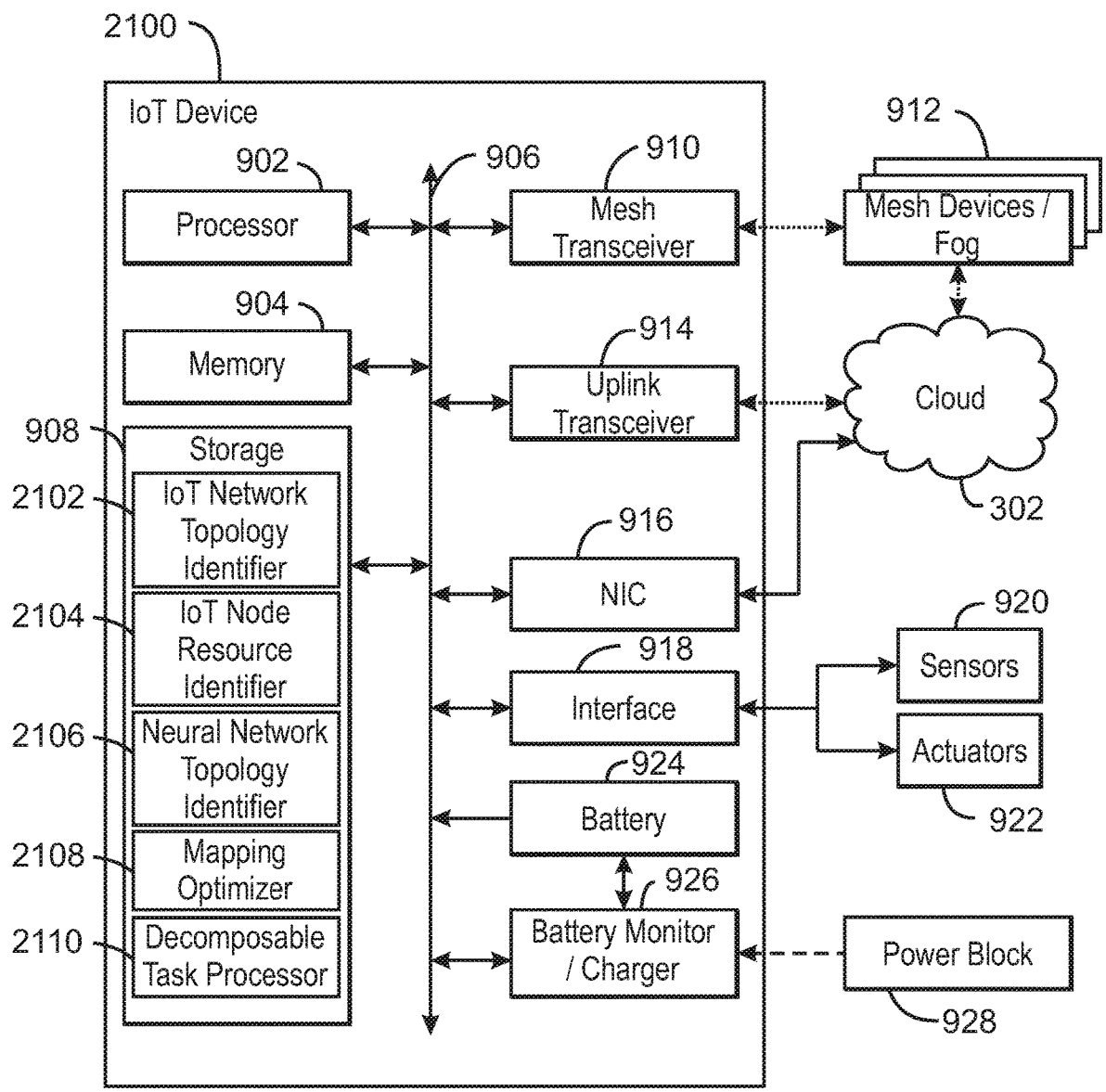
FIG. 21 is a block diagram of an example of components that may be present in an IoT device for distributed neural network mapping and resource management in accordance with some embodiments.

FIG. 21 is a block diagram of an example of components that may be present in an IoT device 2100 for distributed neural network mapping and resource management in accordance with some embodiments. Like numbered items are as described in FIG. 9.

In an example, the mass storage 908 may include a number of modules to implement the mapping framework described herein. Although shown as code blocks in the mass storage 908, it may be understood that any of the modules may be fully or partially replaced with hardwired circuits, for example, built into an application specific integrated circuit (ASIC). The mass storage 908 may include an IoT network topology identifier 2102, to identify an IoT network topology showing the connections between a number of IoT nodes in an IoT network. The IoT network topology shows node characteristics including, for example, at least one of inter-node distances, clustering, dispersal information, received signal strengths, and signal to noise ratios. Identifying the IoT network topology may include determining the proximity of the number of nodes to each other, the current power levels of the number of nodes, and a signal measurement for the number of nodes. In an example, retrieving the signal measurement of the number of nodes may be through retrieval of at least a received signal strength indicator or broadcasting power.

The mass storage 908 may include an IoT node resource identifier 2104, to identify IoT node resources for each IoT node identified in the IoT network topology. The IoT node resources may comprise at least one of a power level, an available storage space, a current processing load, networking capabilities, uptime, or node reliability information.

The mass storage 908 may include a neural network topology identifier 2106, to identify a neural network topology of node distances and node locations. The neural network may be an artificial neural network.

The mass storage 908 may include a mapping optimizer 2108, to optimize a mapping based on the IoT node resources, the node distances, and the node locations. The optimized mapping preserves a location of processing the decomposable task across the IoT network by using the node locations of the number of nodes to identify a node or the number of nodes located in a same physical location. The optimizing of the mapping includes determining a transmission time for transmission of information from the input nodes to the output nodes.

The mass storage 908 may include a decomposable task processor 2110, to process a decomposable task in the number of IoT nodes based on an overlay of the neural network topology on the IoT network. The processing of a decomposable task in the number of IoT nodes includes dispatching portions of the decomposable task to the number of IoT nodes based on if the IoT nodes have identified as being located in a physical location on a same network. The overlay of the neural network topology may include three layers, for example, including an input layer, a hidden layer, and an output layer.

Figure 22:
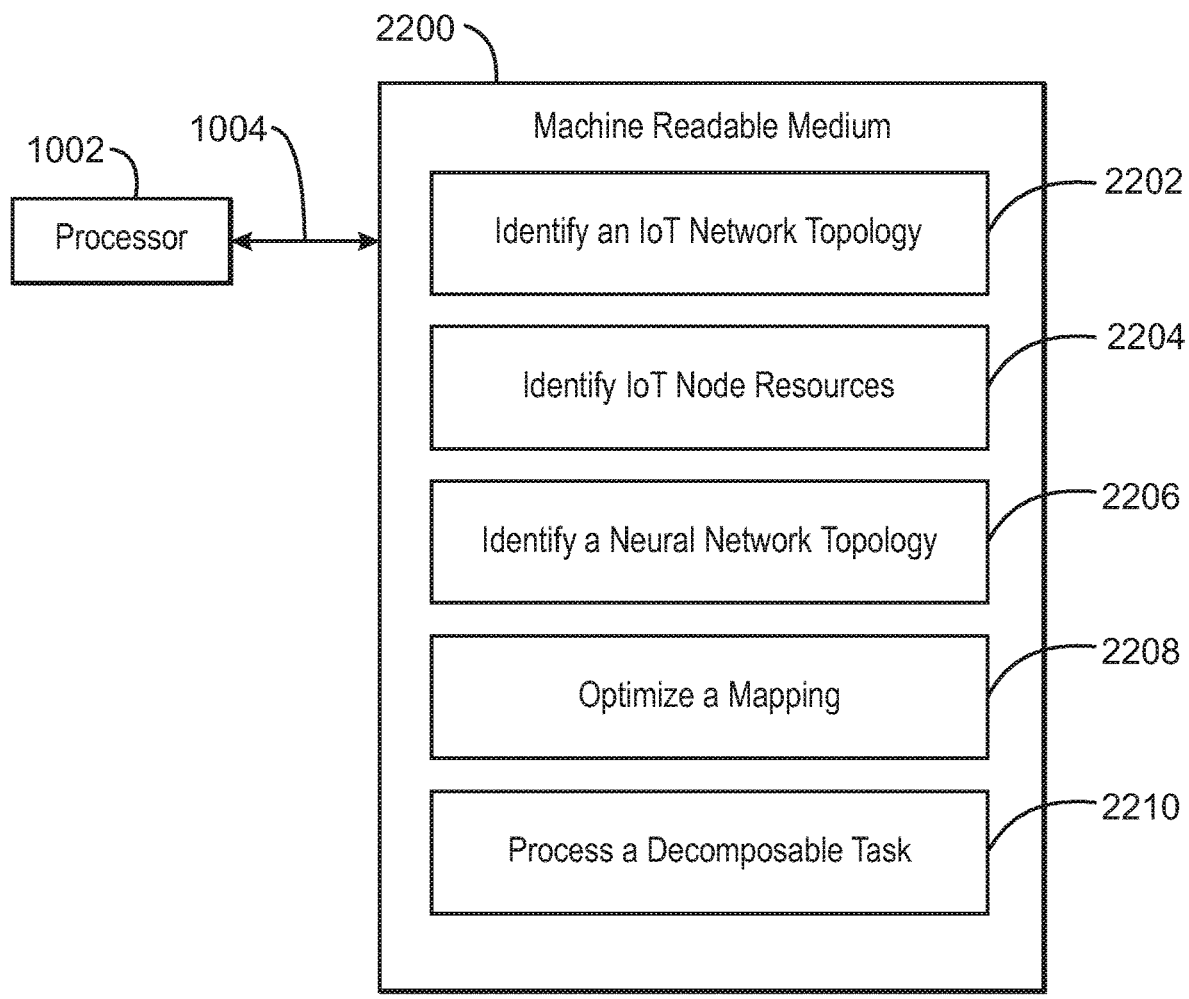
FIG. 22 is a block diagram of a non-transitory, machine readable medium including code to report health of a network and network devices in accordance with some embodiments.

FIG. 22 is a block diagram of a non-transitory, machine readable medium 2200 including code to report health of a network and network devices in accordance with some embodiments. Like numbered items are as they are described with regards to FIG. 10.

The non-transitory, machine readable medium 2200 may include code 2202 to direct the processor 1002 to identify an IoT network topology showing the connections between a number of IoT nodes in an IoT network. The IoT network topology may, for example, show node characteristics including at least one of inter-node distances, clustering, dispersal information, received signal strengths, and signal to noise ratios. Identifying the IoT network topology may include determining the proximity of the number of nodes to each other, the current power levels of the number of nodes, and a signal measurement for the number of nodes. In an example, retrieving the signal measurement of the number of nodes may be through retrieval of at least a received signal strength indicator or broadcasting power.

The non-transitory, machine readable medium 2200 may include code 2204 to direct the processor 1002 to identify IoT node resources of each IoT node identified in the IoT network topology. The IoT node resources comprise at least one of a power level, an available storage space, a current processing load, networking capabilities, uptime, or node reliability information.

The non-transitory, machine readable medium 2200 may include code 2206 to direct the processor 1002 to identify a neural network topology of node distances and node locations. The neural network may be an artificial neural network.

The non-transitory, machine readable medium 2200 may include code 2208 to direct the processor 1002 to optimize a mapping based on the IoT node resources, the node distances, and the node locations. The optimized mapping preserves a location of processing the decomposable task across the IoT network by using the node locations of the number of nodes to identify a node or the number of nodes located in a same physical location, for example, in a region of a city, such as an intersection, a building, a room in a building, and the like. The optimizing a mapping includes a transmission time for transmission of information from the input nodes to the output nodes.

The non-transitory, machine readable medium 2200 may include code 2210 to direct the processor 1002 to process a decomposable task in the number of IoT nodes based on an overlay of the neural network topology on the IoT network. The processing of a decomposable task in the number of IoT nodes may include dispatching portions of the decomposable task to the number of IoT nodes based on whether the IoT nodes have been identified as being located in a physical location or on a same local network, such as coupled by a router or a peer-to-peer connection. The overlay of the neural network topology may, for example, include three layers including at least an input layer, a hidden layer, and an output layer.

In some embodiments, IoT networks may utilize blockchains for multiple functions. These may include, for example, creating group identities, creating type identities, archiving trust measurements, registering object identifiers, secure device introduction, event tracking, and data logging among others. However, blockchain synchronization introduces additional overhead that may be difficult for constrained devices. The use of non-localized blockchains, such as those accepting transactions from anywhere, may result in the saturation of constrained bandwidth IoT subnets, which may result in functional delays, or the loss of data, among other issues. Consequently, a strategy for localizing blockchain processing may be needed to lower the demand. Further, smaller blockchains may be less trustworthy due to fewer nodes.

Figure 23:
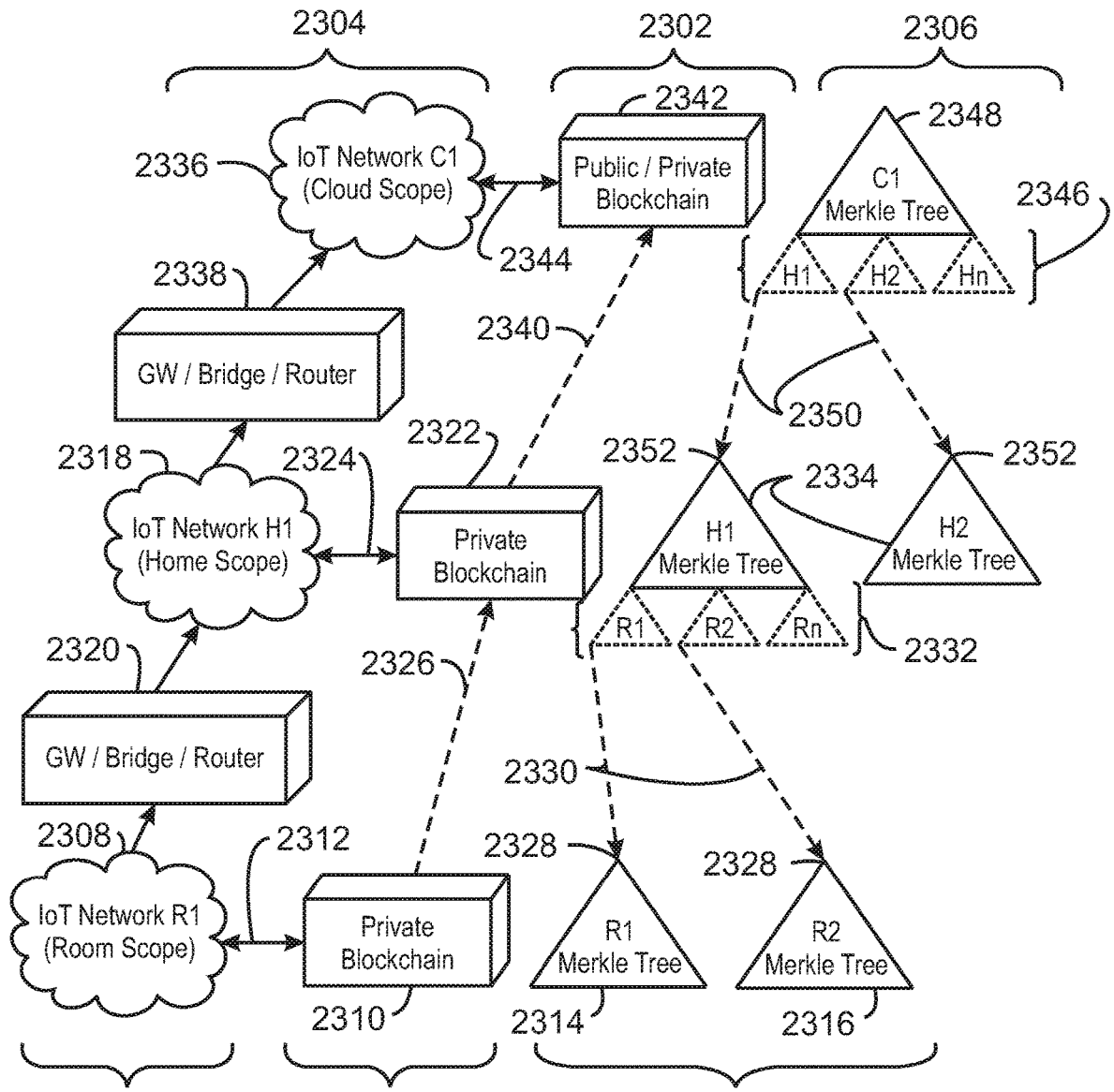
FIG. 23 is a schematic diagram of a hierarchy of blockchains associated with levels in a network hierarchy in accordance with some embodiments.

FIG. 23 is a schematic diagram of a hierarchy of blockchains 2302 associated with levels in a network hierarchy 2304 in accordance with some embodiments. The hierarchy of blockchains 2302 may increase the efficiency of the local subnet traffic to maintain and use blockchains 2302. To further improve efficiency, the blockchains 2304 may be indexed by an associated hierarchy of Merkle trees 2306, as described further with respect to FIG. 25. As used herein, a Merkle tree is generally a form of hash tree in which every non-leaf node is labeled with a hash of the labels or the values of two child nodes.

IoT subnets may each have a blockchain that is local to the subnet such that blockchain operations are contained within the subnet. Thus, frequent use of the local blockchain may not saturate subnets that connect to the local subnet.

As shown in FIG. 23, a local IoT network (R1) 2308, such as in a room or local environment, may have an associated blockchain 2310. Actions that are taken in R1 2308, or incorporated into transactions 2312 that may be committed to the blockchain 2310 to record activities, such as identities, group composition, security, operations tracking, and the like. A transaction 2312 may be stored in a block in the blockchain 2310. An associated hash code may be calculated for the block and saved to a Merkle tree 2306. In the Merkle tree 2306, a triangle represents a parent node, at the top, and two child nodes, below. In this example, an R1 Merkle tree 2314 and an R2 Merkle tree 2316 may be associated with different blocks in the blockchain 2310.

The local IoT network, R1 2308, may be coupled to a higher level IoT network, such as a home network (H1) 2318 through a bridge or router 2320. H1 2318 may include a blockchain 2322 to record transactions 2324 from H1 2318. Periodically, such as every second, minute, or at other repeating time periods, a checkpoint transaction 2326 may be created in the blockchain 2322 belonging to the parent network, H1 2318. The checkpoint transaction 2326 may include the hash values for the R1 Merkle trees 2314 or 2316, among other Merkle trees, or a sample of blocks committed to the lower level blockchain 2310.

The highest vertices 2328 for the Merkle trees R1 2314 and R2 2316 are linked by network references 2330 to the lowest level 2332 of the H1 Merkle trees 2334. Similarly, H1 2318 may be coupled to a next higher network, such as an IoT network cloud (C1) 2336 through another bridge or router 2338. Consolidated checkpoint transactions 2340 may be created in the public or private blockchain 2342 associated with C1 2336. Further C1 2336 may save transactions 2344 to the blockchain 2342. The lowest level 2346 of the C1 Merkle tree 2348 may include network references 2350 that are created from the hash code of the highest level vertices 2352 of the next lower level of Merkle trees, such as the H1 Merkle trees 2334.

Although shown as a simple set of cascading blockchains and associated Merkle trees through three levels, the process may include a cascade up to a root blockchain for a large number of participants and levels. The periodic checkpoints allow much of the local traffic to be isolated from the parent blockchains, thereby permitting scalability of IoT networks while continuing to protect the integrity using blockchains. With the prolific use of blockchains it may be useful to have a defined method for instantiating and permissioning new blockchains.

Figure 24:
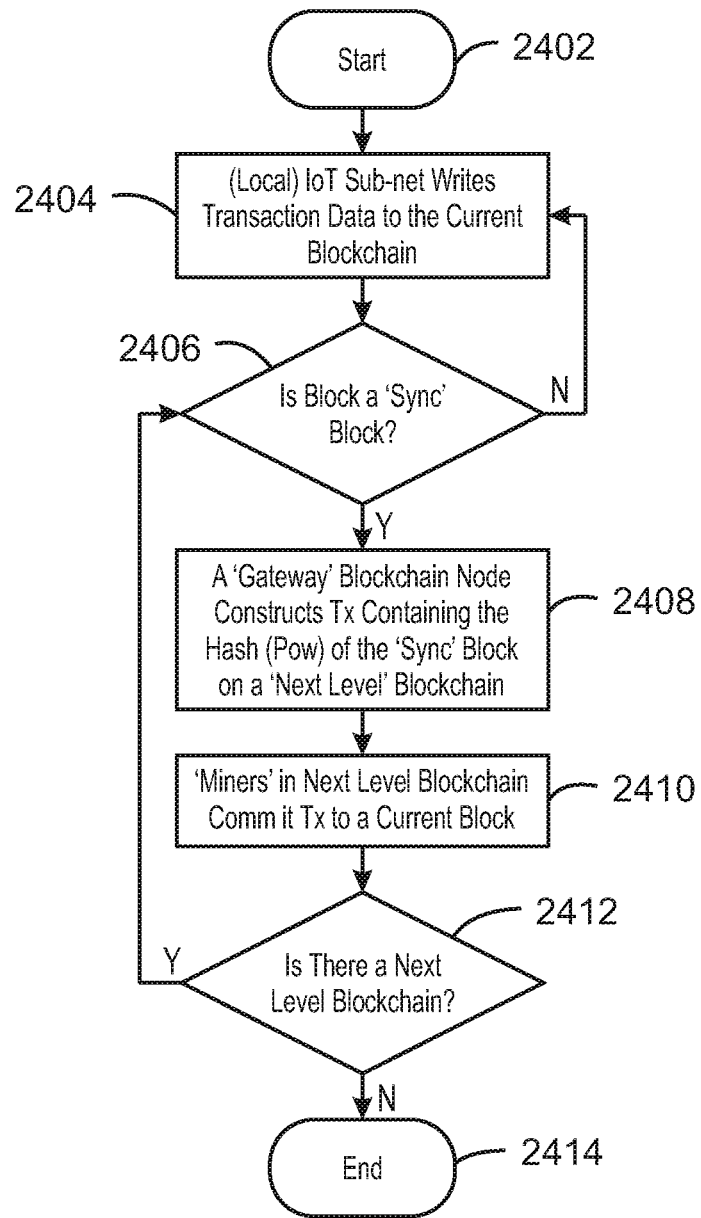
FIG. 24 is a process flow diagram of an example method for constructing a blockchain hierarchy in accordance with some embodiments.

FIG. 24 is a process flow diagram of an example method 2400 for constructing a blockchain hierarchy in accordance with some embodiments. The method 2400 of FIG. 24 may be implemented by the IoT device 24200 described with respect to FIG. 242. The method 2400 may begin at block 2402, for example, when an IoT device is powered up or joins a local network.

At block 2404 a device in the current, or local, IoT subnet writes transactional data to the current blockchain. As described herein, the transactional data may be IoT operational events, trusted computing measurements, device or group identity information, and the like.

At block 2406, a determination may be made whether the blockchain block is a 'sync' block. If not, process flow returns to block 2404. If the block is a sync block as determined at block 2406, then at block 2408, a gateway blockchain node constructs a message containing the hash code of the sync block. The message is transmitted to a blockchain on the next level.

At block 2410, miners in the next level blockchain commit the message to a current block, along with a network reference pointing to the lower blockchain. At block 2412, a determination is made as to whether there is a next level blockchain. If so, process flow returns to block 2406 to determine if the block is a sync block. If not, the method 2400 ends at block 2414, when the IoT devices return to normal operations to wait another periodic blockchain write.

Figure 25:
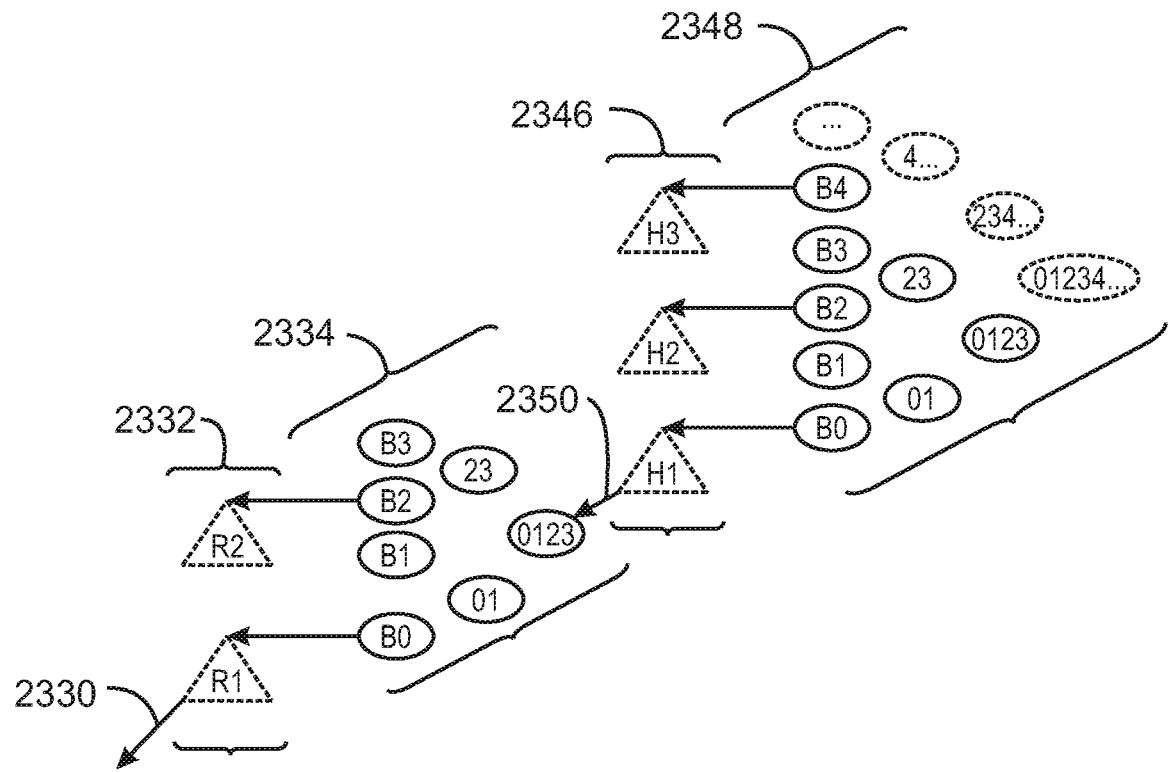
FIG. 25 is expanded view of the Merkle trees described with respect to FIG. 23 in accordance with some embodiments.

FIG. 25 is expanded view of the Merkle trees described with respect to FIG. 23 in accordance with some embodiments. As described, many IoT use cases using blockchains call for the retrieval of information that is integrity verified using the blockchain blocks. However, due to the nature of blockchain transactions, important measurements may not be proximate to one another in the chain. Thus, efficient indexing for the blockchain is needed. This may be performed by the use of Merkle trees to index the chain. As described with respect to FIG. 23, blockchains that cross network hierarchies may use Merkle trees, along with network references, to index the transactions. A blockchain may have its own Merkle tree or index. The checkpoint transactions require a context switch to the child blockchain that originally generated the checkpoint. A search engine seeking to obtain insight regarding the check pointed blocks may need to traverse the network, for example, by following network references 2330 or 2350, among others, to search the Merkle tree indexes for lower levels in the blockchain hierarchy.

Figure 26:
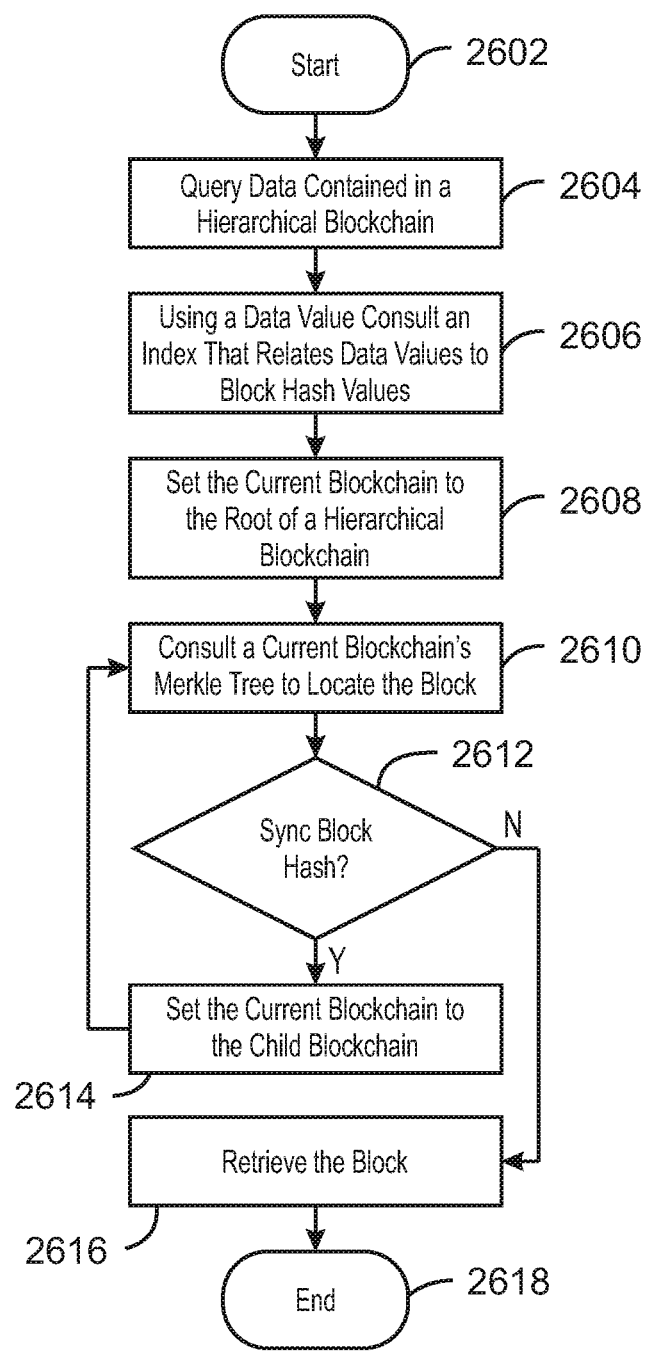
FIG. 26 is a process flow diagram of an example method for searching a blockchain hierarchy using Merkle tree indexes in accordance with some embodiments.

FIG. 26 is a process flow diagram of an example method 2600 for searching a blockchain hierarchy using Merkle tree indexes in accordance with some embodiments. The method 2600 of FIG. 26 may be implemented by the IoT device 3200 described with respect to FIG. 32. The method may begin at block 2602, for example, when a query is received to locate data. At block 2604, the query data may be located in a hierarchical blockchain. At block 2606, a data value may be used to consult an index or lookup table that associates data values with block hash values. At block 2608, the current blockchain is set to point to the root of a hierarchical blockchain. At block 2610, the block hash value is used to consult a Merkle tree for a current blockchain to determine location of a target block in a chain of blocks in the blockchain.

At block 2612, a determination is made as to whether the target block contains a sync block hash from a child blockchain. If so, at block 2614 the current blockchain is set to point to the child blockchain to search the child blockchain. Process flow then returns to block 2610, to resume the search in the child blockchain.

If the target block does not contain a sync block hash, at block 2616 the target block is retrieved and provided to the searching entity. The method then ends at block 2618, for example, when normal operations are resumed.

Searching the Merkle tree indexes into lower levels of the blockchain hierarchy, using the network references, may result in increased network latency. Caching Merkle tree indexes for the child node blockchains may be a way to decrease the overhead of the index searches, by keeping searches to the root blockchain. Further, cloud servers may have sufficient processing resources to maintain the Merkle trees for all child blockchains in an IoT network.

Figure 27:
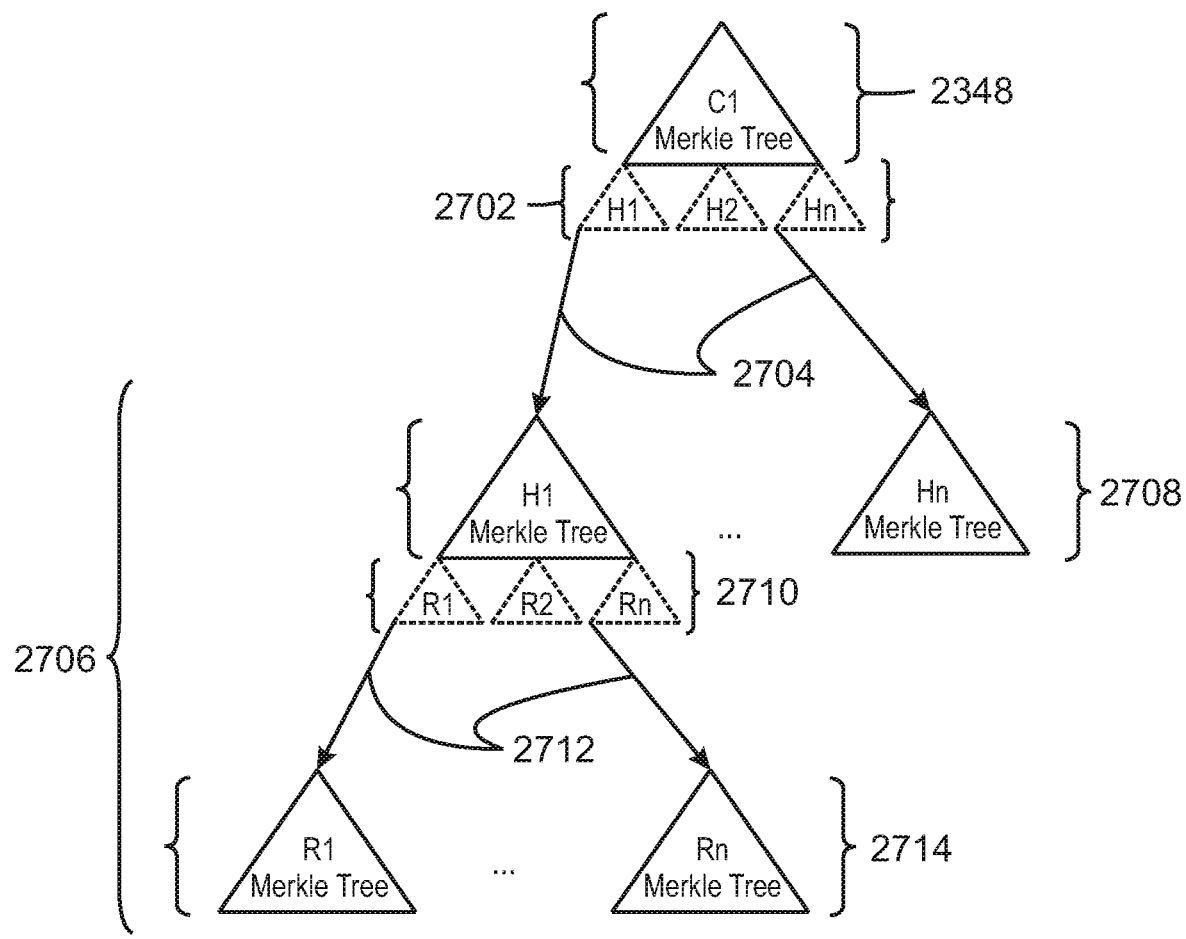
FIG. 27 is a schematic diagram of a cached Merkle tree stored in a cloud server in accordance with some embodiments.

FIG. 27 is a schematic diagram of a cached Merkle tree stored in a cloud server in accordance with some embodiments. Like numbered items are as described with respect to FIG. 23. In this example, the C1 Merkle tree 2348 is the same as in the hierarchical Merkle trees of FIG. 23. However, the lowest level 2702 in the C1 Merkle tree 2348 does not include network references, but instead includes cache references 2704 to cached Merkle trees 2706 for lower level IoT networks.

For example, the cached Merkle trees 2706 may include an H1 Merkle tree copy 2708 of the H1 Merkle tree 2334 described with respect to FIG. 23. In the H1 Merkle tree copy 2708, the lowest level 2710 may include references 2712 to copies 2714 of still lower level Merkle trees.

Figure 28:
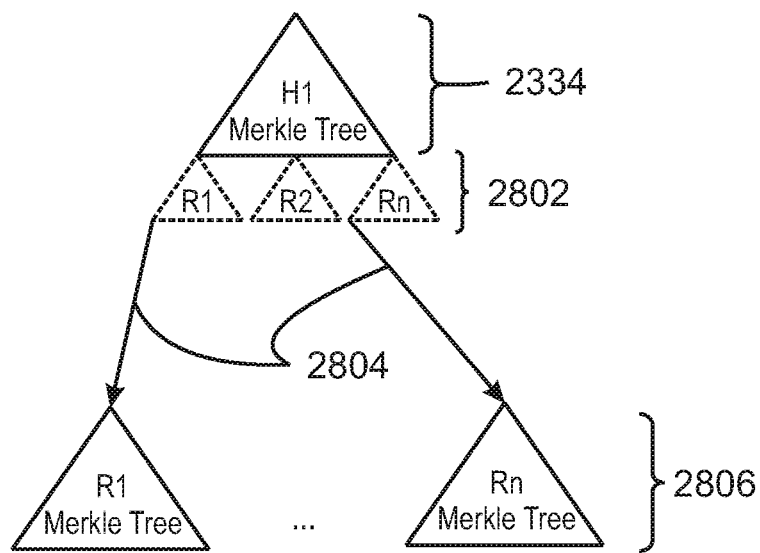
FIG. 28 shows a schematic diagram of a distributed Merkle tree cache at the IoT network level H1, as described with respect to FIG. 23, in accordance with some embodiments.

Similarly, intermediate blockchains may maintain a subtree cache to allow more efficient regional searches to be conducted. For example, FIG. 28 shows a schematic diagram of a distributed Merkle tree cache 2800 at the IoT network level H1 2318, as described with respect to FIG. 23. The H1 Merkle tree 2334 may be the same as described with respect to FIG. 23. However, the lowest level 2802 may include cache references 2804 to copies of the Rn Merkle trees 2806, rather than network references.

Figure 29:
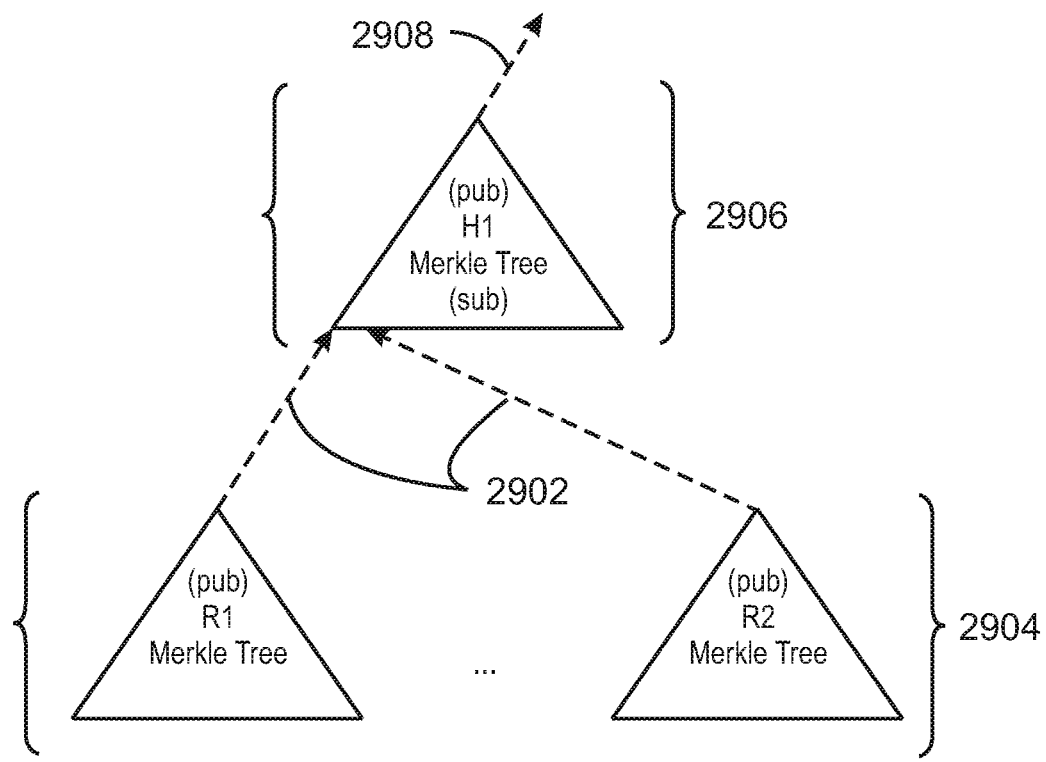
FIG. 29 is a schematic diagram of a technique for maintaining a distributed cache with coherency in accordance with some embodiments.

FIG. 29 is a schematic diagram of a technique for maintaining a distributed cache 2900 with coherency in accordance with some embodiments. As the caches are not directly saved with the blockchains they refer to, it may be useful to implement a method to maintain cache coherency for child blockchain Merkle trees. IoT frameworks may be used to efficiently implement publish-subscribe signaling. Child blockchains may publish 2902 lower level Merkle trees 2904 to a parent blockchain holding a higher level Merkle tree 2906. Similarly, the parent blockchain may publish 2908 the higher level Merkle tree 2906 to a root blockchain, such as to the C1 Merkle tree 2348, discussed with respect to FIG. 23.

Figure 30:
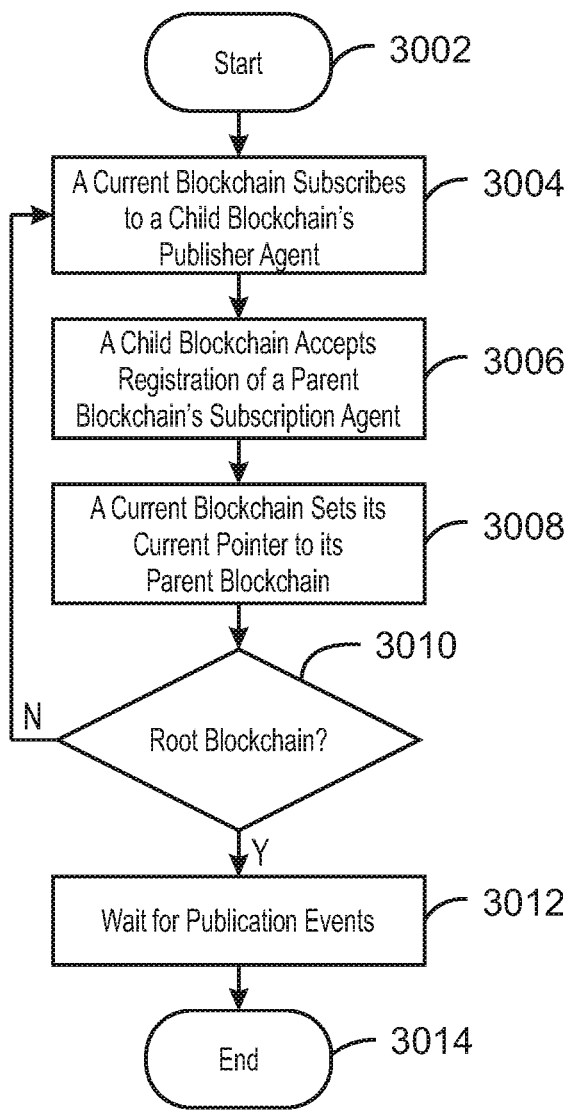
FIG. 30 is a process flow diagram of an example method to construct a coherent cache for a hierarchy of blockchains in accordance with some embodiments.

FIG. 30 is a process flow diagram of an example method 3000 to construct a coherent cache for a hierarchy of blockchains in accordance with some embodiments. The method 3000 may be implemented, for example, by IoT or cloud devices at any level of the hierarchy. For example, the method 3000 of FIG. 30 may be implemented by the IoT device 3200 described with respect to FIG. 32. The method may begin at block 3002, for example, when an IoT network is first started, or when an IoT device joins the IoT network.

At block 3004, a current blockchain subscribes to a child blockchain's publisher agent. At block 3006, the child blockchain accepts registration of the parent blockchain's subscription agent. The publication and subscription (Pub-Sub) may include only the indexes, or Merkle trees, to maintain the coherent cache. In some examples, the Pub-Sub may include the complete blockchain from the child blockchain.

At block 3008, the current blockchain sets its current pointer to its parent blockchain. At block 3010, a determination is made as to whether the current blockchain is the root blockchain. If so, at block 3012, the coherent cache links are set up, and the system waits for publication events to take place, for example, as described with respect to FIG. 31. If the current blockchain is not the root blockchain, process flow returns to block 3004 to build the Pub-Sub links for the next level in the hierarchy.

Figure 31:
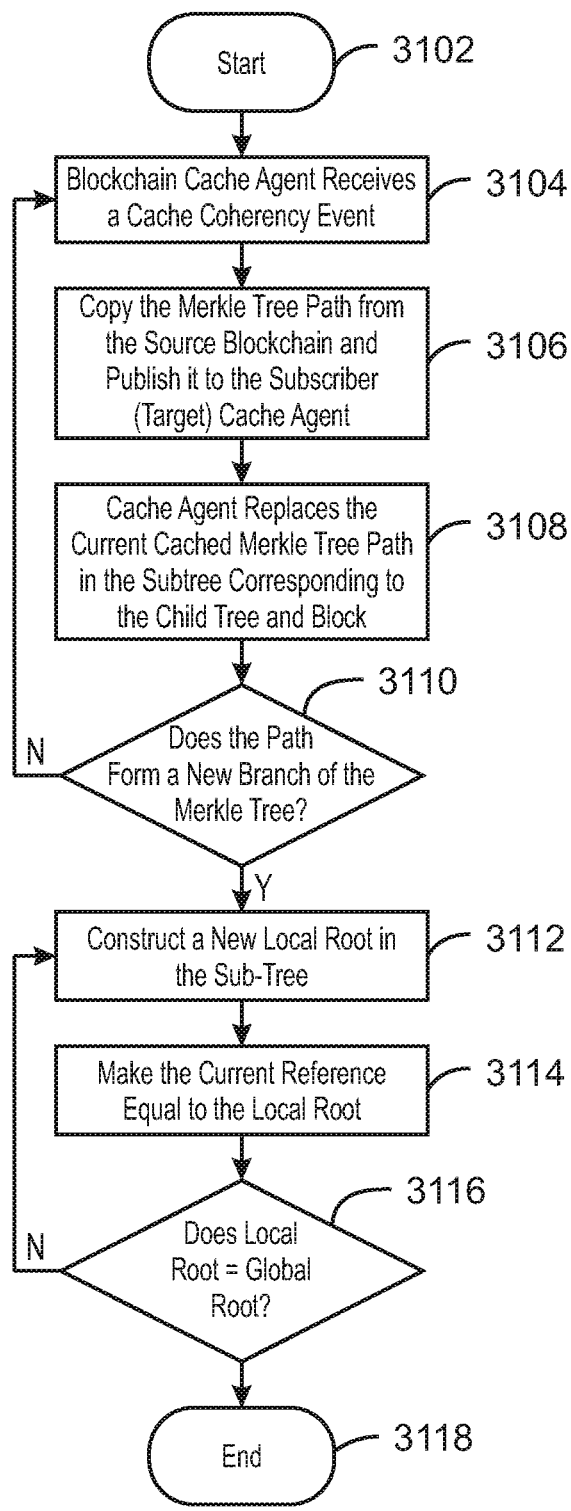
FIG. 31 is a process flow diagram of an example method to maintain a coherent cache for a hierarchy of blockchains in accordance with some embodiments.

FIG. 31 is a process flow diagram of an example method 3100 to maintain a coherent cache for a hierarchy of blockchains in accordance with some embodiments. The method 3100 may, for example, be implemented by IoT or cloud devices at any level of the hierarchy. For example, the method 3100 of FIG. 31 may be implemented by the IoT device 3200 described with respect to FIG. 32. The method may begin at block 3102, after the coherent cache has been constructed, for example, following the techniques of FIG. 30.

At block 3104, the blockchain cash agent receives a cache coherency event. The cache coherency event may, for example, be a publication of a change that has taken place in the Merkle tree for a lower level blockchain. In some examples, a periodic refresh may be used to confirm that the information in the higher level Merkle tree is correct.

At block 3106, the Merkle tree path from the source blockchain is copied and published to the subscriber cache agent. At block 3108, the cache agent in the subscriber blockchain replaces the current cached Merkle tree path in the subtree corresponding to the child tree and block. At block 3110, a determination is made as to whether the path forms a new branch of the Merkle tree. If not, process flow returns to block 3104, to continue with normal updates to maintain cache coherency.

If, at block 3110, the path does form a new branch of the Merkle tree, at block 3112, a new local root in the subtree is constructed. At block 3114, the current reference is made equal to the local root. At block 3116 a determination is made as to whether the local root is the global root. If not, process flow returns to block 3112, to construct a new local root in the next subtree.

If at block 3116, the local root is equal to the global root, the method 3100 ends at block 3118. At this point, the process may restart at block 3102.

Figure 32:
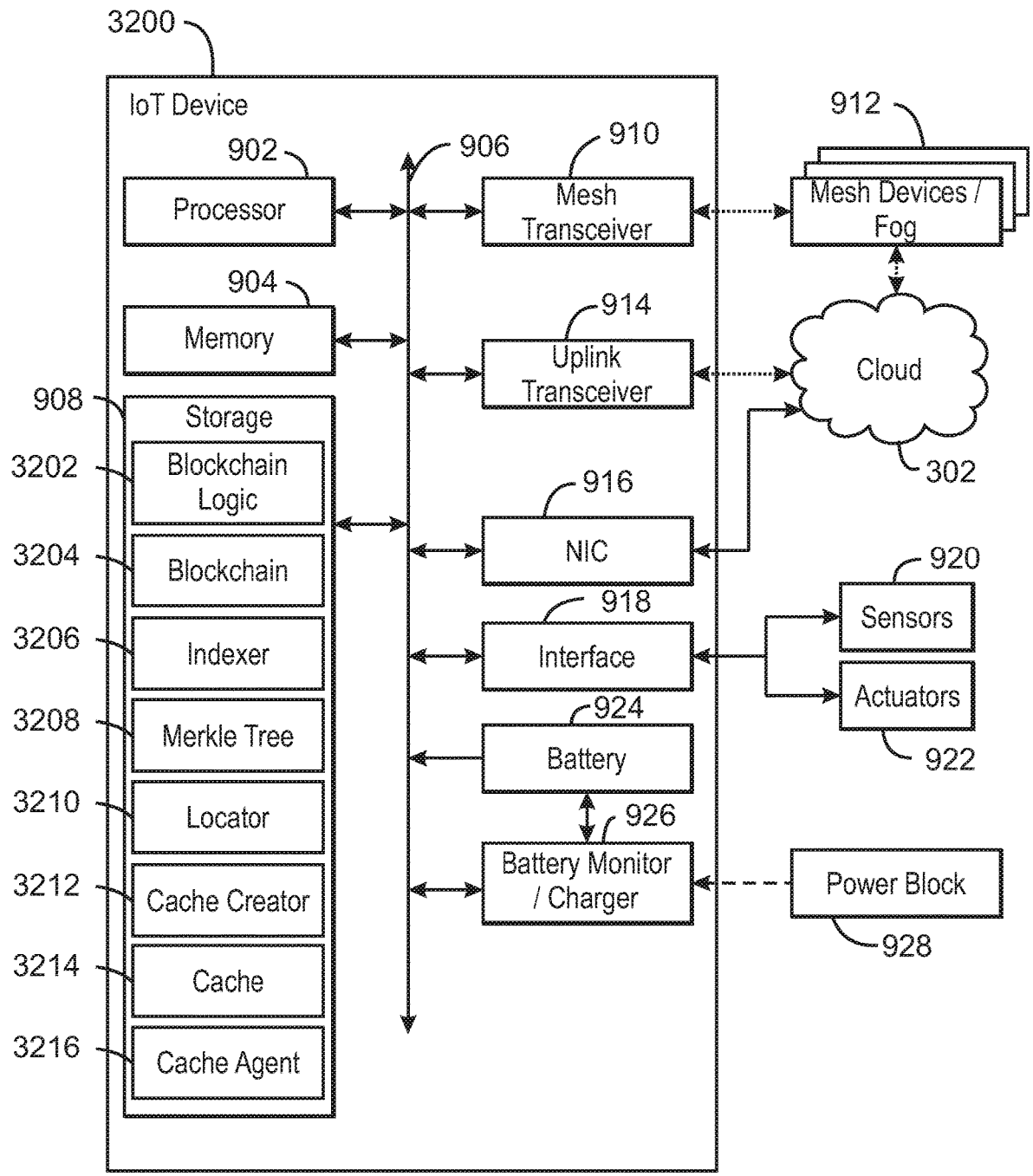
FIG. 32 is a block diagram of an example of components that may be present in an IoT device for implementing hierarchical blockchains with associated indexes in accordance with some embodiments.

FIG. 32 is a block diagram of an example of components that may be present in an IoT device 3200 for implementing hierarchical blockchains with associated indexes in accordance with some embodiments. Like numbered items are as described with respect to FIGS. 3 and 9. It can be noted that different components may be selected and used for the IoT device 3200 than for those selected for the IoT device 900 discussed with respect to FIG. 9, and other IoT devices discussed herein.

The IoT device 3200 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. A measurement may refer to a hash code calculated on a code or data segment stored in the storage 908 or memory 904. Starting from a measurement of a boot code segment, the measurements may be used to establish a trusted execution environment (TEE), by creating a chain-of-trust from the initial booting. The SM may provide secure storage.

The TPM may be used to establish a TEE, or secure enclave, for running programs. The TPM may also be used for any number of other functions, including providing cryptographic support for secure communications and keys for identification. The TPM may not be present in more constrained devices, such as sensors at the very edge of the IoT networks. In these devices, security may be provided by a blockchain itself, by upstream devices, by virtual TPM, and the like.

The mass storage 908 may include a number of modules to implement the key management functions described herein. Although shown as code blocks in the mass storage 908, it may be understood that any of the modules may be fully or partially replaced with hardwired circuits, for example, built into an application specific integrated circuit (ASIC).

The mass storage 908 may include blockchain logic 3202 may be included to maintain a blockchain 3204 that holds services, attributes, identities of devices, contracts, coin balances, and the like. The blockchain logic 3202 may be used to propagate the block chain transactions to other IoT devices. Further, the blockchain logic 3202 may be used to establish network references to blockchains at lower or higher levels of a network hierarchy. For example, the network references may include a link through a Gateway or router to a lower level IoT network.

An indexer 3206 may be used to generate a Merkle tree 3208 comprising hash codes of blocks in the blockchain 322. The lowest levels of the Merkle tree 3208 may include network references to Merkle trees in IoT devices in a lower level IoT network that are generated by the blockchain logic 3202.

A locator 3210 may be included to search a blockchain hierarchy. The locator 3210 may perform this function as described with respect to FIG. 26, wherein the locator 3210 searches relevant Merkle trees for hash code of the target data, which may be used find the block in the blockchains.

A cache creator 3212 may be used to construct a cache 3214 of Merkle trees in IoT networks that are at a lower level in the hierarchy. For example, the cache creator 3212 may perform the method 3000 described with respect to FIG. 30. The locator 3210 may then perform the search of the blockchain hierarchy in the cache 3214, decreasing the load on the IoT networks.

The coherency of the cache 3214 may be maintained by a cache agent 3216. The cache agent 3216 may perform the method 3100 described with respect to FIG. 31. Further, the cache agent 3216 may subscribe to cache agents in lower level IoT devices to receive notification of cache coherency events from those cache agents. The cache agent 3216 may also publish cache coherency events for the current IoT device 3200 to higher level IoT devices that have subscribed to the cache agent 3216 to receive change notifications.

Figure 33:
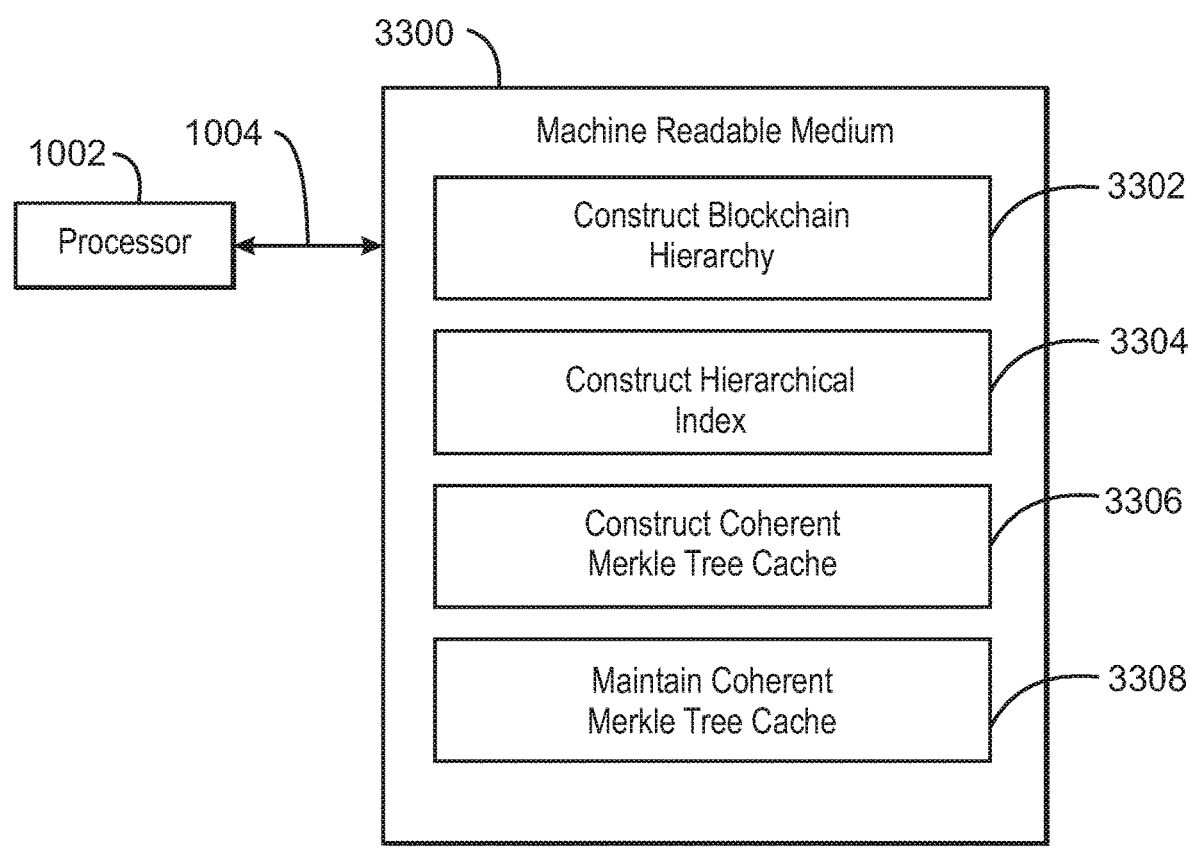
FIG. 33 is a block diagram of a non-transitory, machine readable medium including code to direct a processor to manage keys for secure communications in accordance with some embodiments.

FIG. 33 is a block diagram of a non-transitory, machine readable medium 3300 including code to direct a processor 1002 to manage keys for secure communications in accordance with some embodiments. The processor 1002 may access the non-transitory, machine readable medium 3300 over a bus 1004. The processor 1002 and bus 1004 may be implemented in a manner similar to the processor 1002 and bus 1004 described with respect to FIG. 10. The non-transitory, machine readable medium 3300 may include devices described for the mass storage 908 of FIG. 9 or may include optical disks, thumb drives, or any number of other hardware devices.

The non-transitory, machine readable medium 3300 may include code 3302 to direct the processor 1002 to construct a blockchain hierarchy across a hierarchical IoT network, for example, extending from lowest level devices, such as sensors in a room, to a broader IoT network, such as a house or plant network, and onto still broader IoT networks, such as in the cloud. The code 3302 may perform this function according to the method described with respect to FIG. 33.

Code 3304 may be included to direct the processor 1002 to construct a hierarchical index of the blockchains. The hierarchical index may be a Merkle tree, based on hash code values of the contents of the blocks in the blockchains.

Code 3306 may be included to direct the processor 1002 to construct a coherent cache of Merkle trees at the present IoT network level, wherein the coherent cache includes the Merkle trees of lower levels in the IoT network. The code 3306 may perform the construction of the coherent cache using the method described with respect to FIG. 30.

Code 3308 may be included to direct the processor 1002 to maintain the coherency of the cache. The code 3308 may perform this function using the method described with respect to FIG. 31.

Any number of other code blocks may be included in the machine readable medium 3300 to implement functions of the IoT devices. These code blocks may include a communicator to build and transmit packets between IoT devices, a secure booter/measurer to perform measurements for securely running code, a key generator, or any number of other code blocks as described herein.

Publish-subscribe (Pub-Sub) is a subset of Content-Centric Networking (CCN), in which a network routing function is applied to the efficient routing of content, as compared to routing by sending packets or frames to a specific network address. The focus of Pub-Sub is on efficiently routing a single published content to multiple subscribers, multiple publications to a single subscriber, or both. In addition to being used for a specific content item, the Pub-Sub may be relative to a topic, which may be a logical title or subject line under which multiple content items may be exchanged.

The Pub-Sub model allows for a topic to be defined to which network devices may subscribe, publish, or both. Publishers may publish to multiple topics and subscribers may subscribe to multiple topics. Thus, a scalability concern may arise when routing the topic traffic. Topics may be expressed in a variety of data formats including strings, numbers, network (multicast) addresses, UUIDs and Object ID hierarchies. However, routing efficiency may be affected by how topics are expressed and formatted.

As described herein, bloom filters may provide an efficient method for representing Pub-Sub topics for routing. The bloom filter indicates a match if all of the set bits of the target value, for example, bits with a value of one, match set bits in the bloom filter. Bits that have not been set, for example, have a value of zero, are ignored. Thus, if a bit is set in the bloom filter, but has a value of zero in the target value, there may still be match, so long as all of the set bits in the target value are set in the bloom filter. Other techniques may be used for tracking the topics for the Pub-Sub distribution, such as storing bit patterns for the topics in distributed hash tags (DHTs), or storing a topic and associated status in a blockchain, among others.

Figure 34:
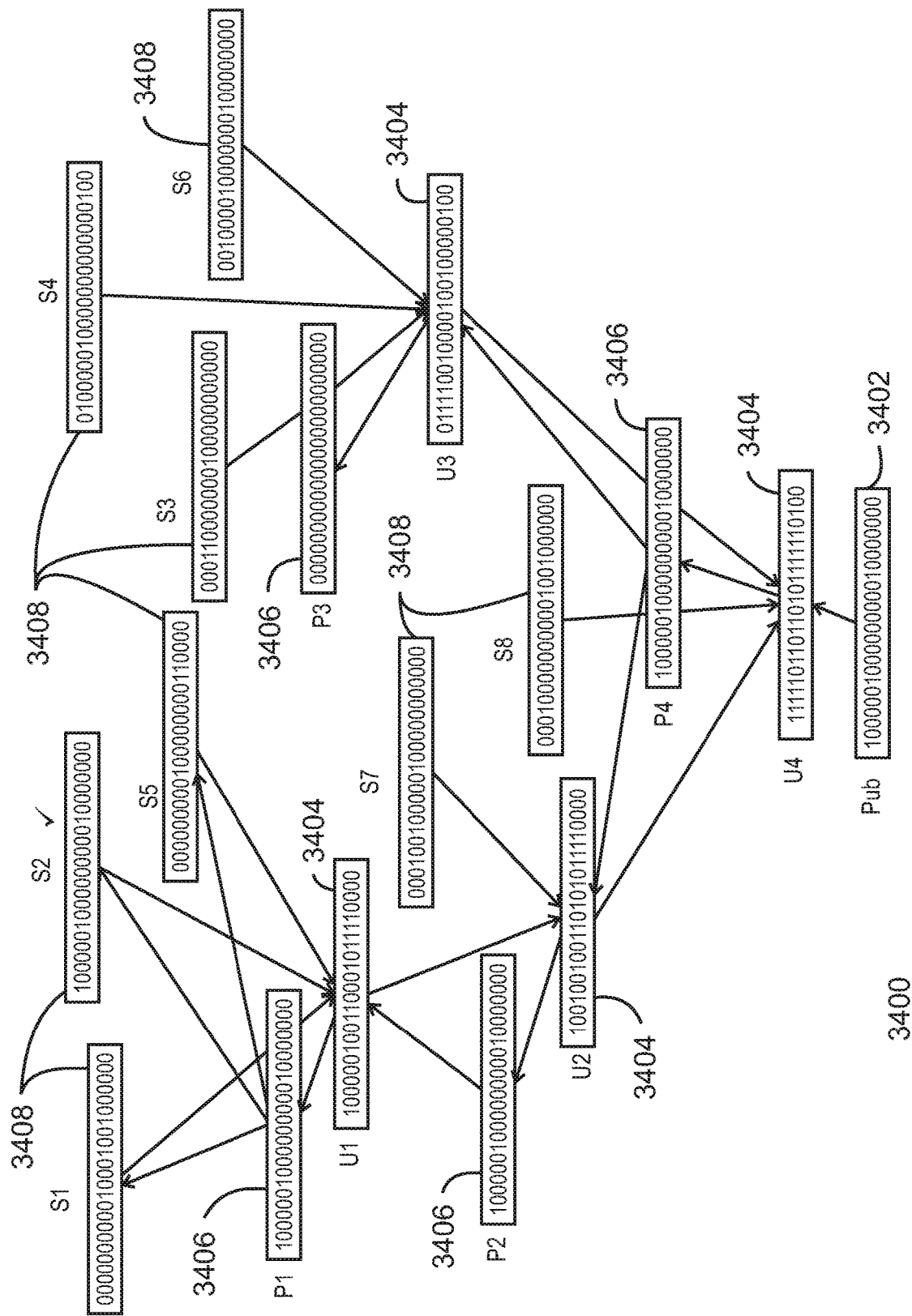
FIG. 34 is a schematic diagram of using Pub-Sub routing based on bloom filters in accordance with some embodiments.

FIG. 34 is a schematic diagram of using Pub-Sub routing based on bloom filters in accordance with some embodiments. The apparatus constructs a bloom filter where a topic is hashed then overwritten onto the bit space for the bloom filter, such as by an XOR function. Multiple topic formats may use the same bloom filter since each would hash differently. The length of the bit space used for the bloom filter may be determined based on information theory. For example, a longer bloom filter, including a higher number of bit values, may provide for more topics to be included while decreasing the chances that bits may overlap, leading to the possibility of incorrect retrieval of topics.

As shown in FIG. 34, a content publisher 3402 may generate a hash code for a topic. The publisher may then send the content through a router 3404 (U2) that includes all of the set bits of the hash code for the content. The router 3404 may then publish the bloom filter to a local publisher 3406 (P4). Other routers 3404, such U2 and U3, may subscribe to the first router U2, for example, presenting a bit map that includes hash codes for target topics.

If a router 3404, such as U3 does not include all of the set bits in the bloom filter, the hash code for the topic is not sent through that tree. This may indicate that no subscriber 3408 in the tree maintained by the router to 3404 U3 has subscribed that topic. From the router 3404 U2, the hash code may be provided to other publishers 3406, such as P2. Further, the hash code for the topic may move through other routers 3404, such as U1, so long as all of the set bits in the bloom filter in U1 match. Subscribers 3408, such as S1, S2, and S5, may receive content from a publisher 3406, such as P1, or from a router 3404, such as U1. In this example, a subscriber 3408, S2, has a hash code for a target topic that matches the hash code from the content publisher 3402.

In this approach, a subscriber 3408 may construct a bloom filter containing overwritten hash codes for all of the topics to which it wishes to subscribe. The subscriber 3408 may then register the bloom filter with the router fabric. A publisher 3406 may also supply a bloom filter containing overlapping hash codes for all of the topics for which it can provide content. As an example, if there are multiple formatting methods corresponding to the same semantic topic, the bloom filter may match one or more satisfying the routing requirements.

Given a routing scheme that uses publish-subscribe model, it is possible that a security policy may wish to impose restriction over the set of topics that may be exposed to a sub-network, device or gateway to a foreign network. A bloom filter mask may be added to a routing node where the mask represents a whitelist expression of topics that may be routed. A mask may also be used to represent a blacklist of topics that are filtered.

Figure 35:
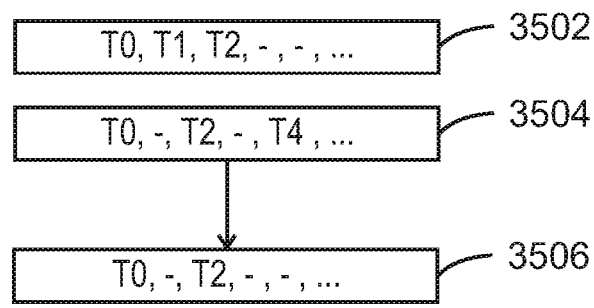
FIG. 35 is a schematic diagram of using a whitelist bloom filter for allowing the distribution of content in accordance with some embodiments.

FIG. 35 is a schematic diagram of using a whitelist bloom filter for allowing the distribution of content in accordance with some embodiments. In FIG. 35, an intersection is calculated for a topic bloom filter 3502 and a white list bloom filter 3504, for example, by performing an AND function. If the ending bloom filter 3506 is zero, then the topic bloom filter 3502 is in the white list bloom filter 3504, and the content is allowed to proceed to the consumer.

Figure 36:
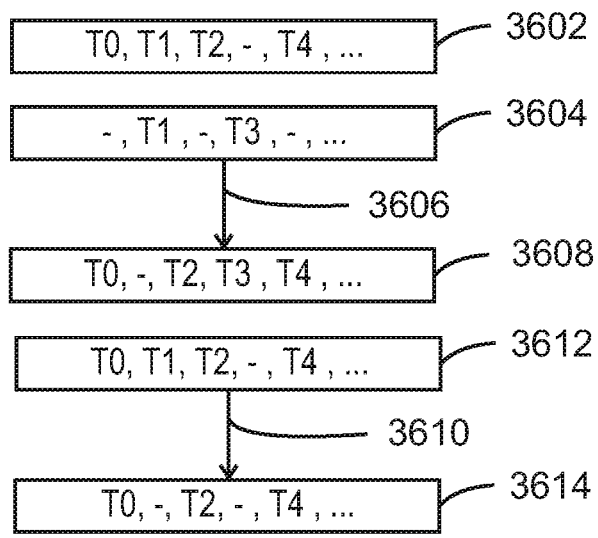
FIG. 36 is a schematic diagram of using a blacklist bloom filter for preventing the distribution of content in accordance with some embodiments.

FIG. 36 is a schematic diagram of using a blacklist bloom filter for preventing the distribution of content in accordance with some embodiments. In FIG. 36, an intersection is calculated for a topic bloom filter 3602 and a black list bloom filter 3604, for example, by performing a NAND function to generate an intermediate bloom filter 3608. The intermediate bloom filter 3608 may then be intersected with the topic bloom filter 3602, for example, using an AND function 3610. If the ending bloom filter 3612 is not zero, then the topic bloom filter 3602 is in the black list bloom filter 3604, and the content is prevented from proceeding to the consumer.

Figure 37:
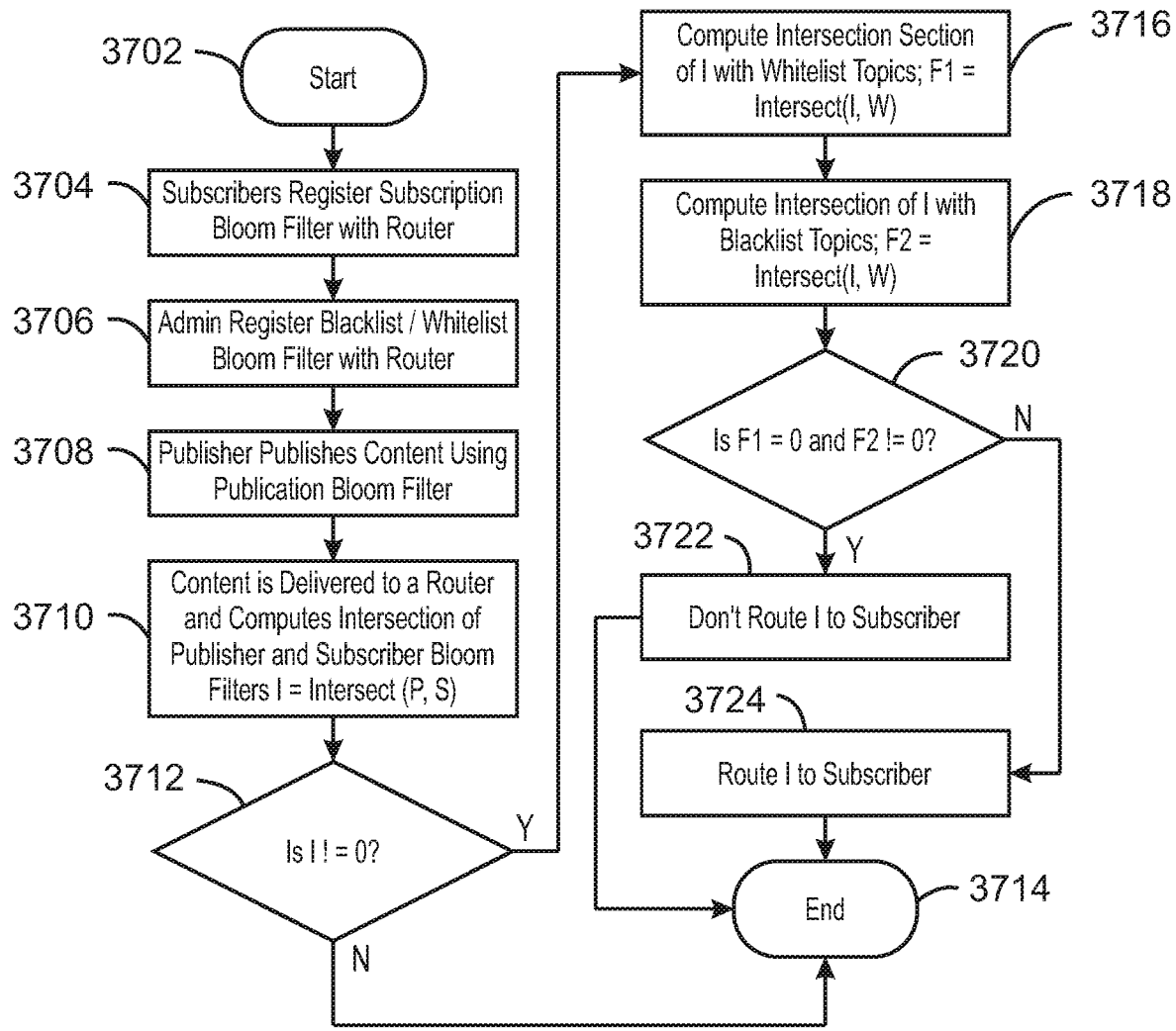
FIG. 37 is a process flow diagram of an example method for implementing Pub-Sub with blacklist or white list bloom filters for content control in accordance with some embodiments.

FIG. 37 is a process flow diagram of an example method 3700 for implementing Pub-Sub with blacklist or white list bloom filters for content control in accordance with some embodiments. The method 3700 of FIG. 37 may be implemented by the IoT device 3800 described with respect to FIG. 38. The method 3700 may start at block 3702, for example, when a subscriber calculates a bloom filter including hash codes for a number of topics.

At block 3706, an administrator registers the blacklist bloom filter, white list bloom filter, or both with routers in the system. At block 3708, a publisher publishes content using a publication bloom filter. The publication bloom filter may be a direct hash code of the topic or publication, with a bit length that matches the length of the bloom filters to be used for distribution.

At block 3710, the content is delivered to a router. The router then computes a Pub-Sub intersection for the publisher and subscriber bloom filters. At block 3712, a determination is made as to whether the Pub-Sub intersection is equal to zero. If the Pub-Sub intersection is equal to zero, indicating no overlap of the publisher and subscriber bloom filters, the method 3700 ends at block 3714.

If at block 3712, it is determined that the Pub-Sub intersection is not equal to zero, at block 3716, a white list intersection of the Pub-Sub intersection with the bloom filter for the white list topics is calculated. At block 3718, a black list intersection of the Pub-Sub intersection with the bloom filter for the black list topics is calculated.

At block 3720, a determination is made as to whether both the white list intersection is equal to zero and the blacklist intersection is not equal to zero. If both conditions are true, then at block 3722, the content is not routed to the subscriber. If either condition is not true, then at block 373, the content is routed to the subscriber. The method 3700 then ends at block 3714.

Figure 38:
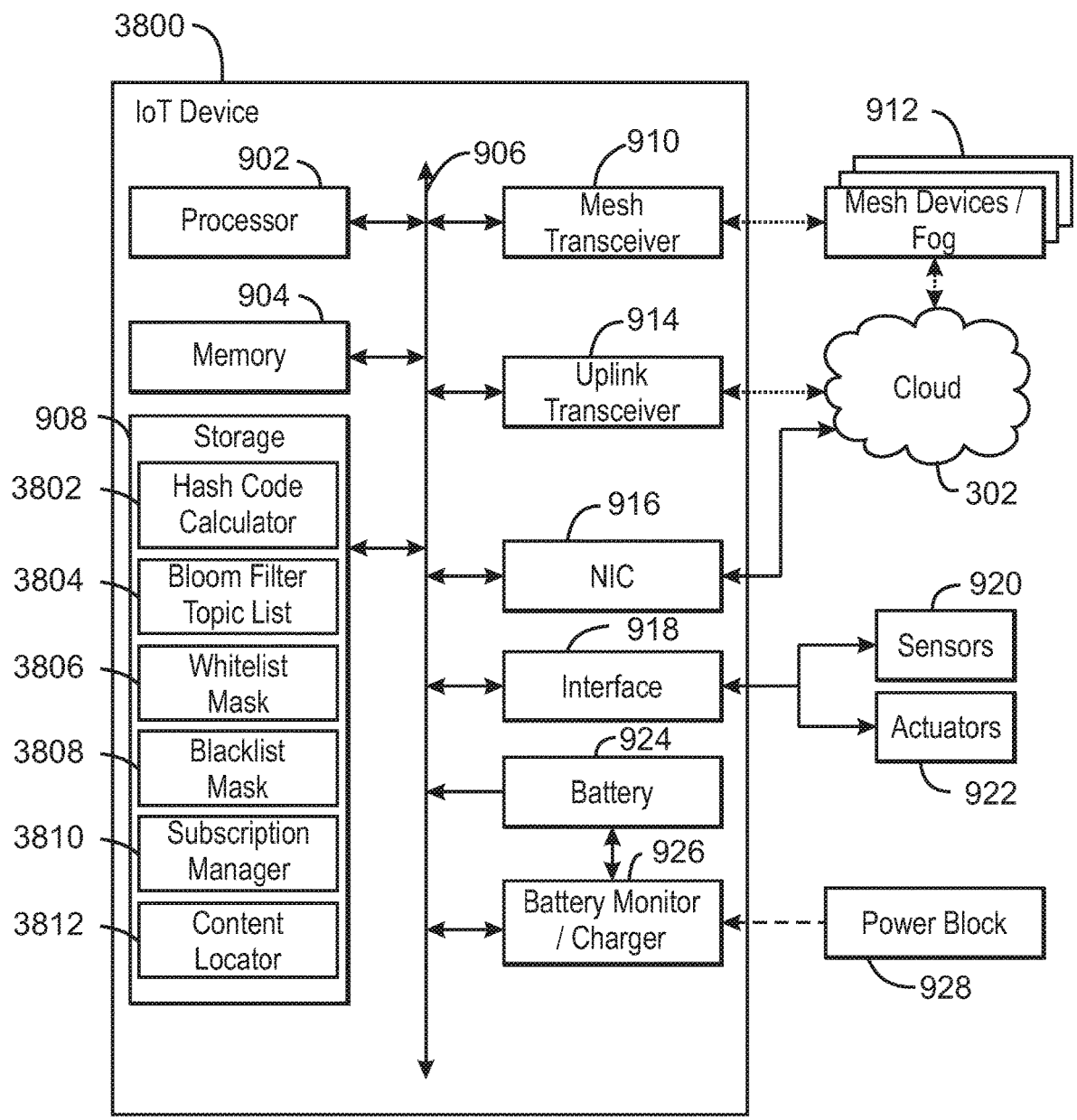
FIG. 38 is a block diagram of an example of components that may be present in an IoT device for implementing a Pub-Sub content distribution system using bloom filters in accordance with some embodiments.

FIG. 38 is a block diagram of an example of components that may be present in an IoT device 3800 for implementing a Pub-Sub content distribution system using bloom filters in accordance with some embodiments. Like numbered items are as described with respect to FIGS. 3 and 9. It can be noted that different components may be selected and used for the IoT device 3800 than for those selected for the IoT device 900 discussed with respect to FIG. 9, and other IoT devices discussed herein.

The IoT device 3800 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. As used herein, a measurement is a hash code calculated on a code or data segment stored in the storage 908 or memory 904. Starting from a measurement of a boot code segment, the measurements may be used to establish a trusted execution environment (TEE), by creating a chain-of-trust from the initial booting. The SM may provide secure storage.

The TPM may be used to establish a TEE, or secure enclave, for running programs. The TPM may also be used for any number of other functions, including providing cryptographic support for secure communications and keys for identification. The TPM may not be present in more constrained devices, such as sensors at the very edge of the IoT networks. In these devices, security may be provided by a blockchain itself, by upstream devices, by virtual TPM, and the like.

The mass storage 908 may include a number of modules to implement the Pub-Sub functions described herein. Although shown as code blocks in the mass storage 908, it may be understood that any of the modules may be fully or partially replaced with hardwired circuits, for example, built into an application specific integrated circuit (ASIC).

The mass storage 908 may include a hash code calculator 3802 that may generate hash codes for topics. The hash code calculator 3802 may write the hash codes into a bloom filter, for example, using an XOR function. This may create a bloom filter topic list 3804. In some examples, the IoT device 3800 may function as a publisher or router. In these examples, the bloom filter topic list 3804 may be obtained from other publishers or routers, for example, in the fog 912 or in the cloud 302.

A white list mask 3806 may be included to store topics identified as acceptable for redistribution by an administrator. A black list mask 3808 may be included to store topics identified as not acceptable for redistribution.

A subscription manager 3810 may be included to register the bloom filter topic list 3804 with routers and other devices in the fog 912 or cloud 302. If the IoT device 3800 is functioning as a router or publisher, the subscription manager 3810 may determine if topics in the bloom filter topic list 3804 are in the white list mask 3806 or in the blacklist mask 3808, to determine whether or not the content should be passed on, as described with respect to FIG. 37.

A content locator 3812 may be included to locate and provide content associated with the topic. For example, content may be provided by other publishers or routers and saved by the content locator 3812 to allow a determination as to whether the content is in the white list 3806 or the blacklist 3808 prior to providing the content to other devices in the fog 912 or the cloud 302.

Figure 39:
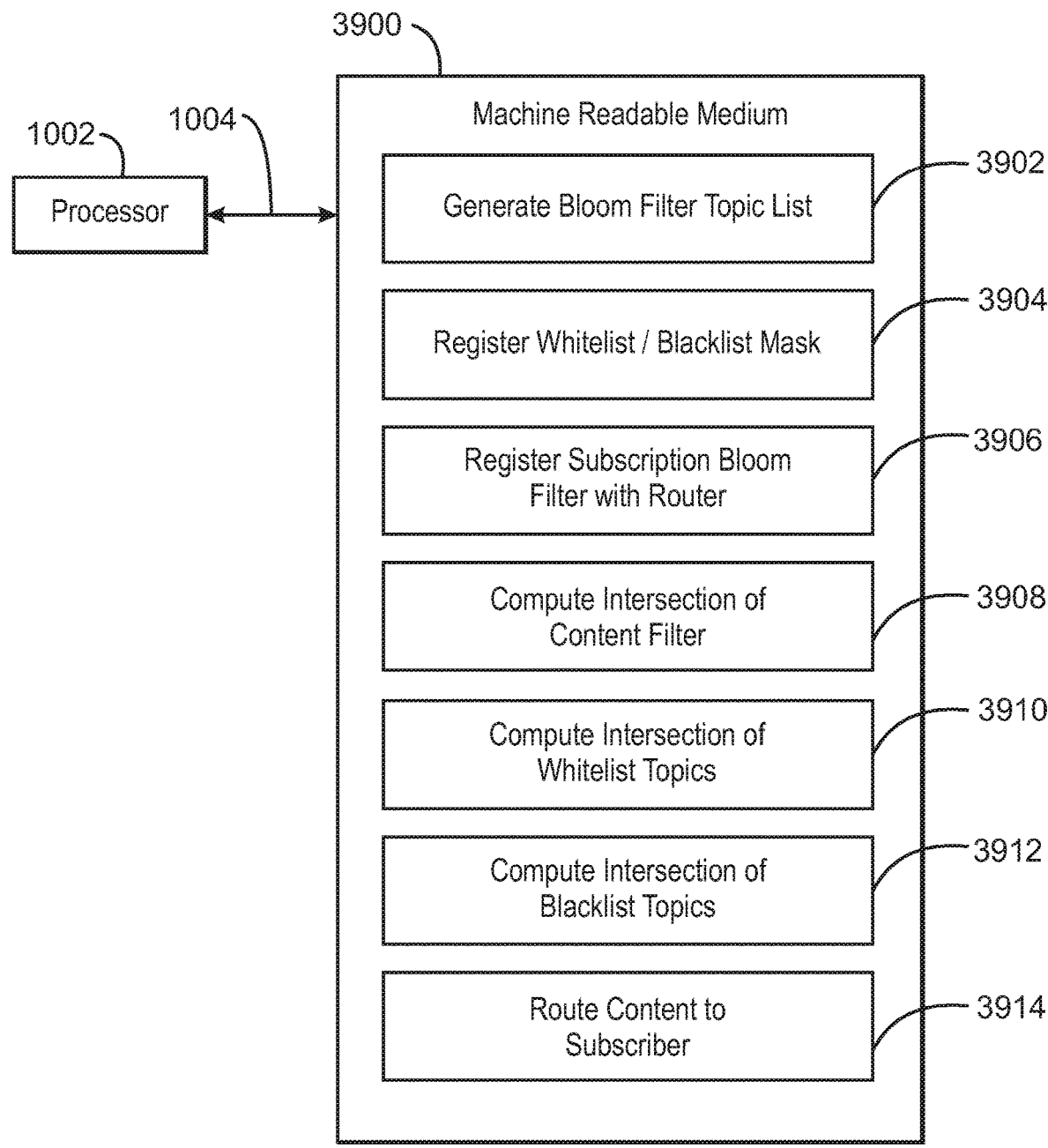
FIG. 39 is a block diagram of a non-transitory, machine readable medium including code to direct a processor to manage a Pub-Sub system using bloom filters for content distribution in accordance with some embodiments.

FIG. 39 is a block diagram of a non-transitory, machine readable medium 3900 including code to direct a processor 1002 to manage a Pub-Sub system using bloom filters for content distribution in accordance with some embodiments. The processor 1002 may access the non-transitory, machine readable medium 3900 over a bus 1004. The processor 1002 and bus 1004 may be implemented in a manner similar to the processor 1002 and bus 1004 described with respect to FIG. 10. The non-transitory, machine readable medium 3900 may include devices described for the mass storage 908 of FIG. 9 or may include optical disks, thumb drives, or any number of other hardware devices.

The non-transitory, machine readable medium 3900 may include code 3902 to direct the processor 1002 to generate a bloom filter topic list, for example, by calculating a hash code of each of the number of topics, and then overwriting the hash codes onto a bloom filter.

Code 3904 may be included to direct the processor 1002 to register a white list mask, a blacklist mask, or both, with routers in an IoT network. In some examples, the code 3904 may accept the white list mask, blacklist mask, or both from another device for use by the processor in determining whether to forward content.

Code 3906 may be included to direct the processor 1002 to register a subscription bloom filter with the router. The code 3906 may direct the processor 1002 to accept a subscription bloom filter from another device, for example, if the machine readable medium 3900 is part of a router.

Code 3908 may be included to direct the processor 1002 to compute a content intersection of the content filter with the subscription bloom filter to determine if the content is accessible on the network. Code 3910 may be included to direct the processor 1002 to compute the intersection of the content intersection with a white list mask to determine if the content is permitted. Code 3912 may be included to direct the processor 1002 to compute the intersection of the content intersection with a blacklist mask to determine if the content is prohibited.

Code 3914 may be included to direct the processor 1002 to route content to a subscriber, for example, if the content is authorized by the white list mask, and not prohibited by the blacklist mask. If either of these conditions is true, the code 3914 may delete the content.

Any number of other code blocks may be included in the machine readable medium 3900 to implement functions of the IoT devices. These code blocks may include a communicator to build and transmit packets between IoT devices, a secure booter/measurer to perform measurements for securely running code, a key generator, or any number of other code blocks as described herein.

Given a Pub-Sub network consisting of a set of publisher, subscriber and routing nodes, publishers may wish to include confidential content with the topic notification message. The content may be encrypted with a topic encryption key that may be a group or shared key. A challenge for this use case is that subscribers need to obtain the content encryption key before they can consume the content subsequent to receiving the topic notification.

The Pub-Sub network may be used to deliver key management notification messages that scale with network dynamics, because the routing nodes may function as key management nodes. Key management topics may be automatically created and delivered, for example, when an original topic contains encrypted content, which signals the need for a key. Upon receipt of an encrypted content, subscribers will issue a key management GET request to obtain the encryption key. The routing node anticipates this and subscribes to the key management topic that pre-fetches the encryption key.

Figure 40:
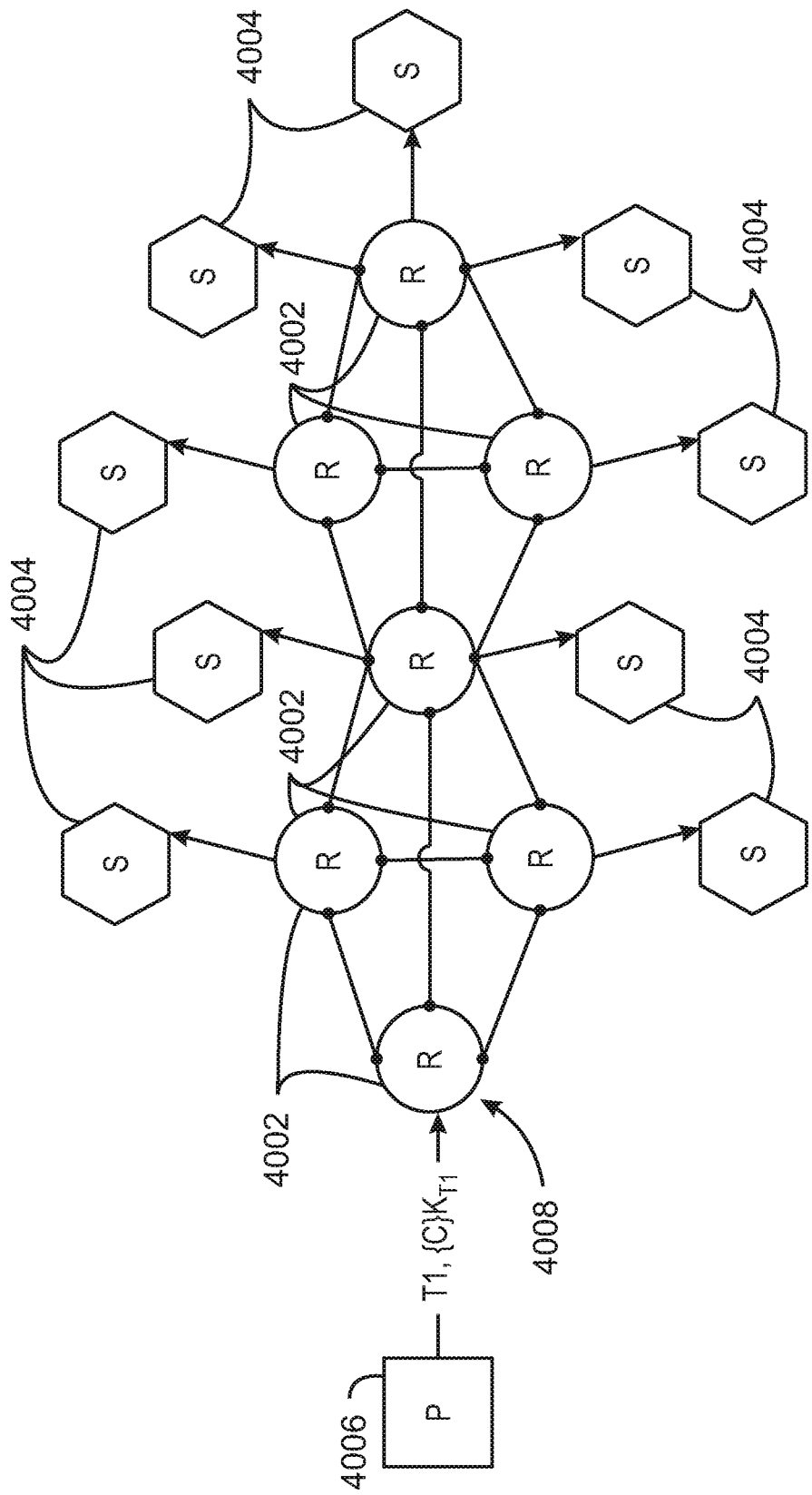
FIG. 40 is a schematic diagram of topic notification with encrypted content in accordance with some embodiments.

FIG. 40 is a schematic diagram of topic notification with encrypted content in accordance with some embodiments. In FIG. 40, routing nodes 4002 may cache topic keys, such as $K_{T1}$, so that they are available locally to a community of subscribers 4004 serviced by the routing nodes 4002. The key management topic notifies routing nodes 4002 acting as subscribers to the key management topics.

Figure 41:
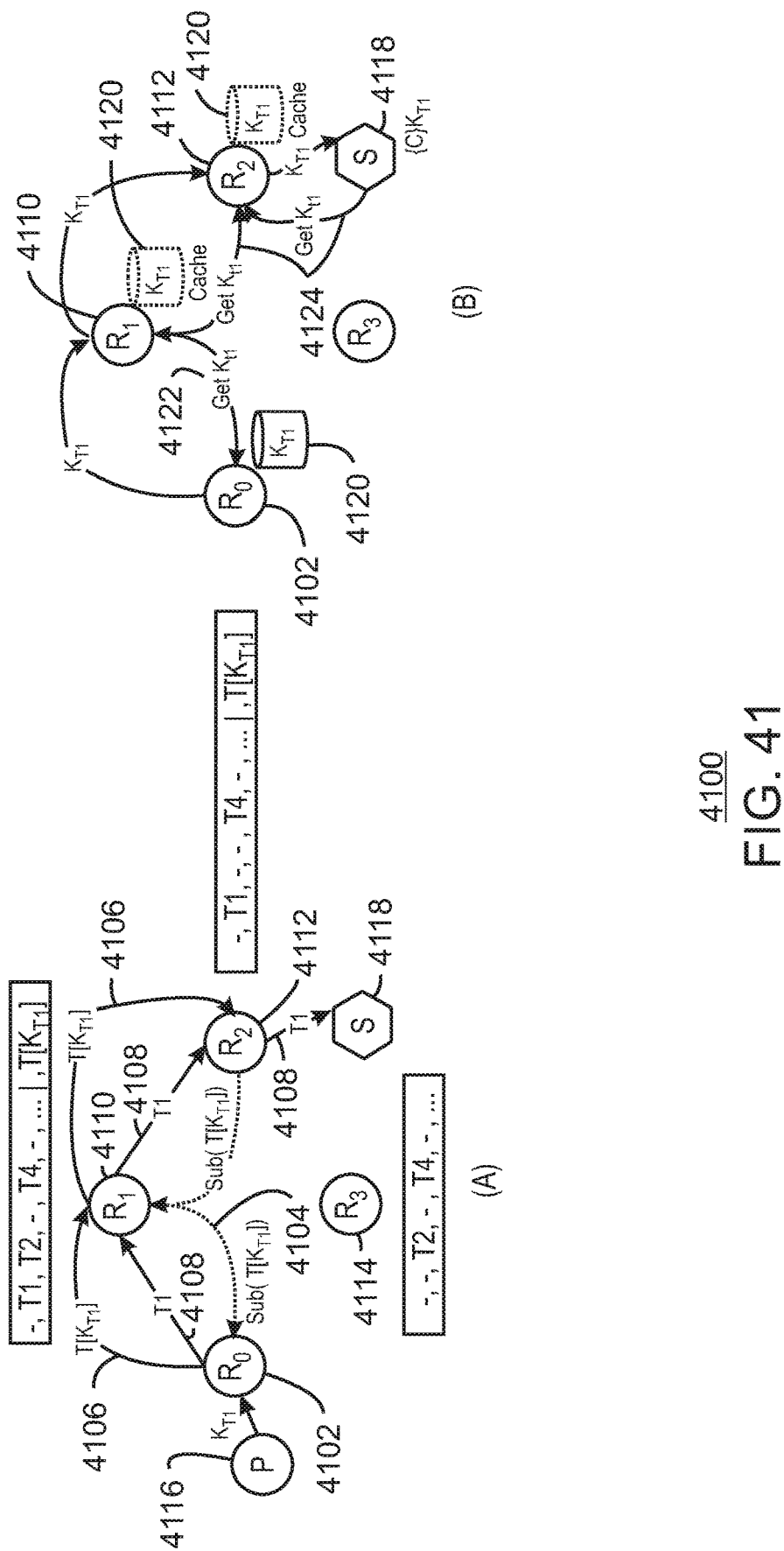
FIG. 41(A) is a schematic diagram of a group of routers receiving notifications of a topic that includes encrypted content in accordance with some embodiments.
FIG. 41(B) is a schematic diagram of a group of routers warming their caches in anticipation of a subscriber requesting an encrypted topic in accordance with some embodiments.

FIG. 41(A) is a schematic diagram of a group of routers receiving notifications of a topic that includes encrypted content in accordance with some embodiments. A routing node 4102 having the key, $K_{T1}$ contained in its cache may respond to a subscription 4104 by publishing the key management topic $T[K_{T1}]$ 4106 for the topic T1 4108. A topic notification T1 4108 may include the encrypted content C, where the content encryption key is $K_{T1}$. Receiving the topic notification T1 4108 may cause a router 4102, 4110, 4112, or 4114 to define the topic $T[K_{T1}]$ 4106.

The router 4110 that subscribes 4104 to the topic T[T1] may wait receipt of a key management event for that topic. The publisher P 4116 of topic T1 4108 may supply the key $K_{T1}$ to router 4102, which may function as a key cache manager for other routers in the system. Upon receipt of the key, the routing node 4102 notifies its subscribers of availability of the key $K_{T1}$.

FIG. 41(B) is a schematic diagram of a group of routers warming their caches in anticipation of subscribers requesting an encrypted topic in accordance with some embodiments. The subscribers to the routing node 4102, such as routing node 4110, may warm their cache 4120, for example, preemptively obtaining the key $K_{T1}$ using a key GET request 4122. This may be performed in anticipation of downstream routers, such as routing node 4112, and subscriber nodes, such as subscribing node 4118, responding to the T1 notification 4108 by issuing a key GET request 4124. It may be noted that content encryption keys may be further encrypted by a site specific key or by a VPN session that protects the topic key across hops between routing nodes and subscriber nodes.

Figure 42:
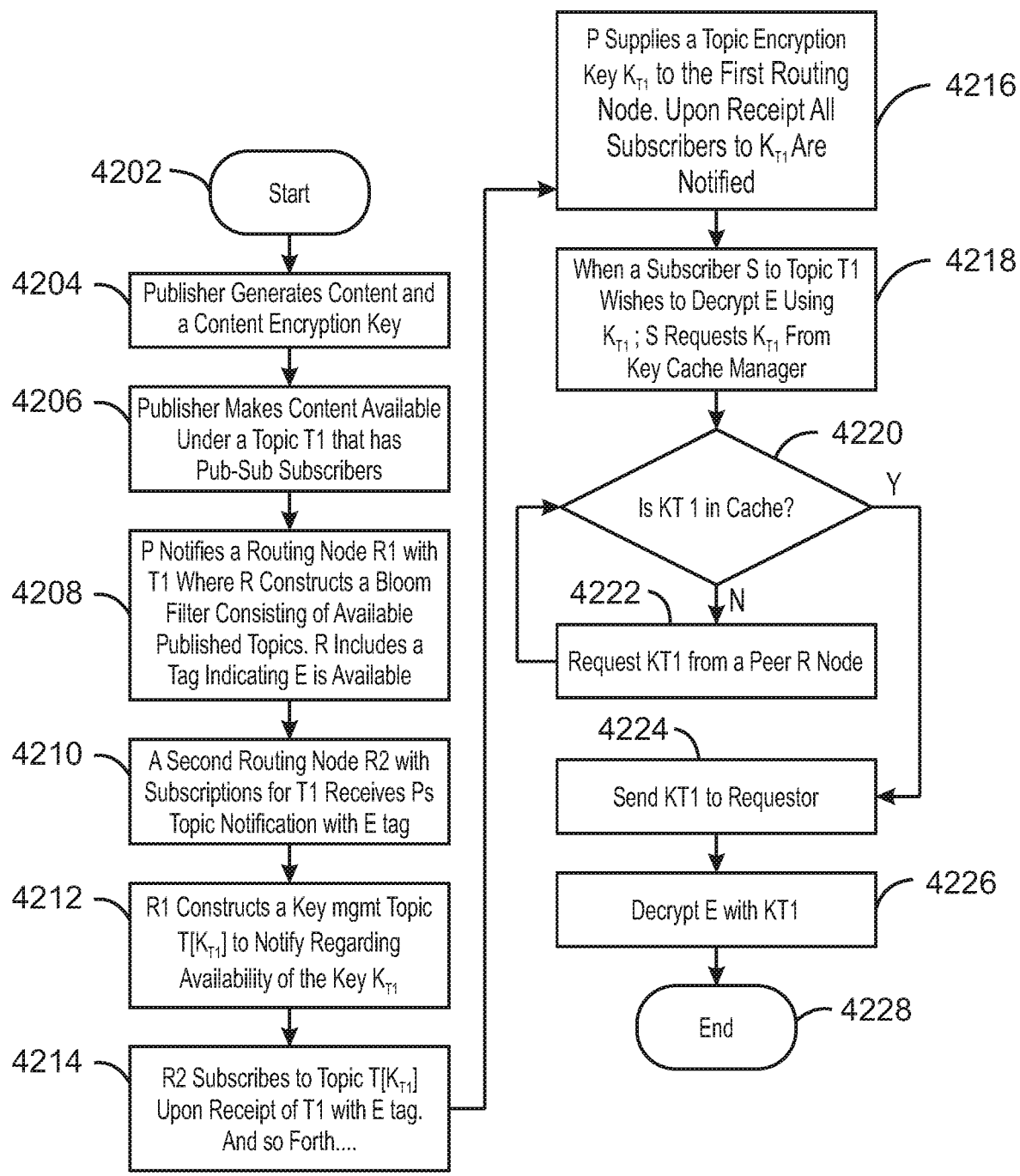
FIG. 42 is a process flow diagram of an example method for using key management notification and warm Key caching in accordance with some embodiments.

FIG. 42 is a process flow diagram of an example method 4200 for using key management notification and warm key caching in accordance with some embodiments. The method 4200 of FIG. 42 may be implemented by the IoT device 4300 described with respect to FIG. 43. The method may begin at block 4202, for example, when an IoT device joins a routing network for content distribution, which may use bloom filters for content distribution. At block 4204, a publisher generates content (C) and a content encryption key ($K_{T1}$). The encrypted content, $E=\{C\}K_{T1}$, may then be available for download from a public repository.

At block 4206, the publisher may make the content available under a topic T1 that has Pub-Sub subscribers. At block 4208, the publisher may notify a first routing node (R1) of T1. The routing node (R1) may construct a bloom filter including available published topics. The routing node (R1) includes a tag indicating the encrypted content (E) is available.

At block 4210, a second routing node (R2), having subscriptions for T1, receives the topic notification from the first routing node (R1), including the E tag. At block 4212, the first routing node (R1) constructs a key management topic $T[K_{T1}]$ to notify the second routing node (R2) of the availability of the key, $K_{T1}$.

At block 4214, upon receipt of the T1 notification with the E tag, the second routing node (R2) subscribes to the key management topic, $T[K_{T1}]$. Further, the T1 notification and the key management topic may be propagated on through successive routers in the chain.

At block 4216, the publisher supplies the topic encryption key, $K_{T1}$, to the first routing node. Upon receipt of the topic encryption key, all subscribers to T1 are notified.

At block 4218, when a subscriber (S) to topic T1 wishes to decrypt E using the topic encryption key, $K_{T1}$, the subscriber requests $K_{T1}$ from a router functioning as a key cache manager. The key cache manager for the subscriber may be the nearest router in communication with the subscriber or may be an initial router providing the key cache management services for the entire group of routers.

At block 4220, a determination is made as to whether the topic encryption key is in the cache. If not, at block 4222, the router functioning as the key cache manager requests the topic encryption key from a peer node. Process flow then returns to block 4220 to determine if the topic encryption key is now in the cache. If the topic encryption key is determined to be in the cache at block 4220, process flow proceeds to block 4224, at which the topic encryption key is sent to the requester, such as the subscriber in this example.

At block 4226, the encrypted content, E, is decrypted using the topic encryption key, $K_{T1}$. The method 4200 then ends at block 4228.

Figure 43:
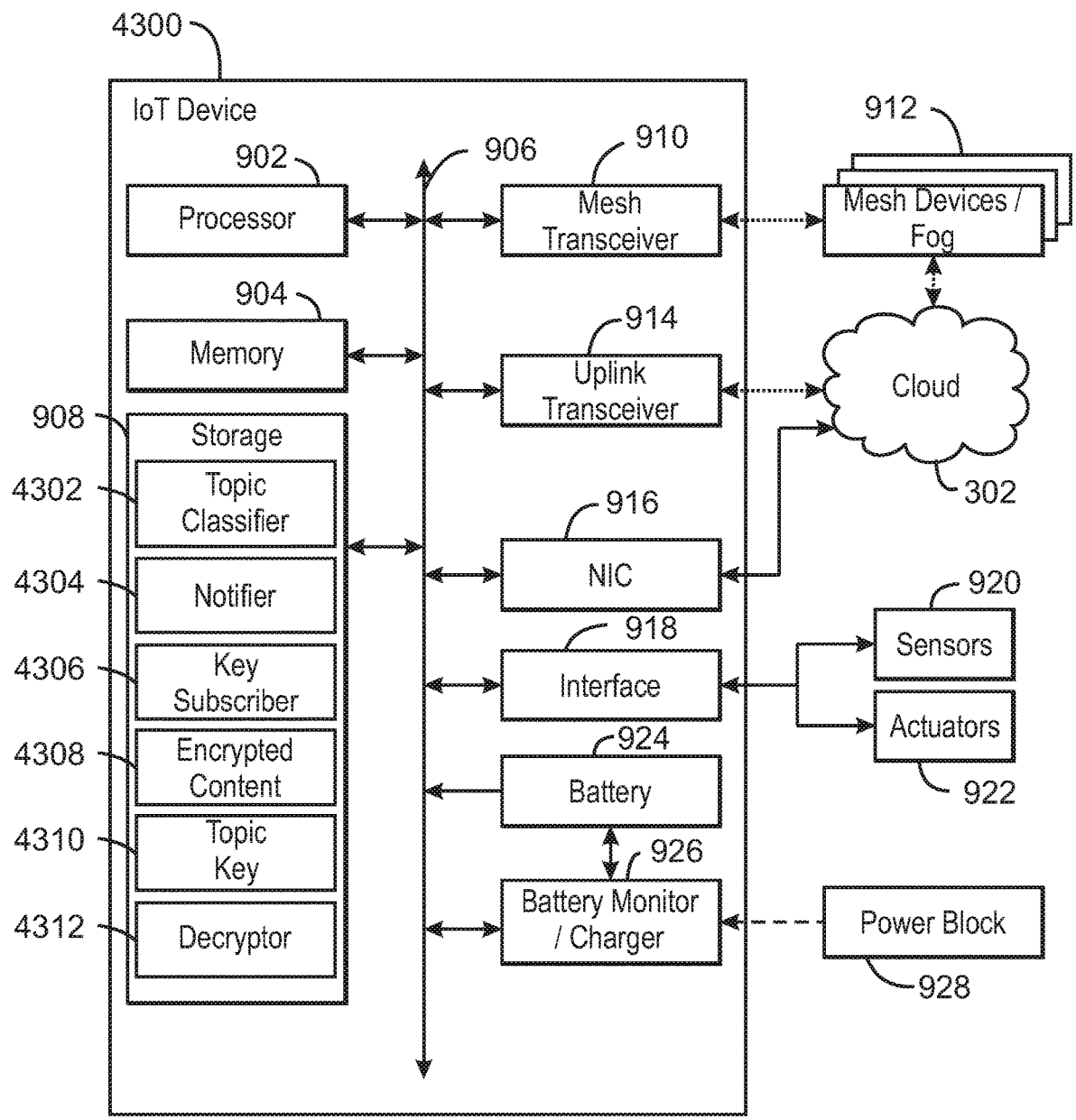
FIG. 43 is a block diagram of an example of components that may be present in an IoT device for managing topic notification with encrypted content in accordance with some embodiments.

FIG. 43 is a block diagram of an example of components that may be present in an IoT device 4300 for managing topic notification with encrypted content in accordance with some embodiments. Like numbered items are as described with respect to FIGS. 3 and 9. It can be noted that different components may be selected and used for the IoT device 4300 than for those selected for the IoT device 900 discussed with respect to FIG. 9, and other IoT devices discussed herein.

The IoT device 4300 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. As used herein, a measurement is a hash code calculated on a code or data segment stored in the storage 908 or memory 904. Starting from a measurement of a boot code segment, the measurements may be used to establish a trusted execution environment (TEE), by creating a chain-of-trust from the initial booting. The SM may provide secure storage.

The TPM may be used to establish a TEE, or secure enclave, for running programs. The TPM may also be used for any number of other functions, including providing cryptographic support for secure communications and keys for identification. The TPM may not be present in more constrained devices, such as sensors at the very edge of the IoT networks. In these devices, security may be provided by a blockchain itself, by upstream devices, by virtual TPM, and the like.

The mass storage 908 may include a number of modules to implement the encrypted content distribution functions described herein. Although shown as code blocks in the mass storage 908, it may be understood that any of the modules may be fully or partially replaced with hardwired circuits, for example, built into an application specific integrated circuit (ASIC).

The mass storage 908 may include a topic classifier 4302 that may identify topics that include encrypted content. The topic classifier 4302 may write create a bloom filter topic list for available topics, including topics that contain encrypted content and unencrypted content.

A notifier 4304 may notify other devices in the fog 912 of the topic that includes encrypted content. A key subscriber 4306 may be included to subscribe to a topic including a topic key 4308 for encrypted content 4310. The key subscriber 4306 may pull or receive the encrypted content 4310 from devices in the fog 912, such as publishers or routers, and may provide the encrypted content 4310 to other devices in the fog 912, such as routers or subscribers. A decryptor 4312 may be included to decrypt encrypted content, for example, using the topic key 4308.

Figure 44:
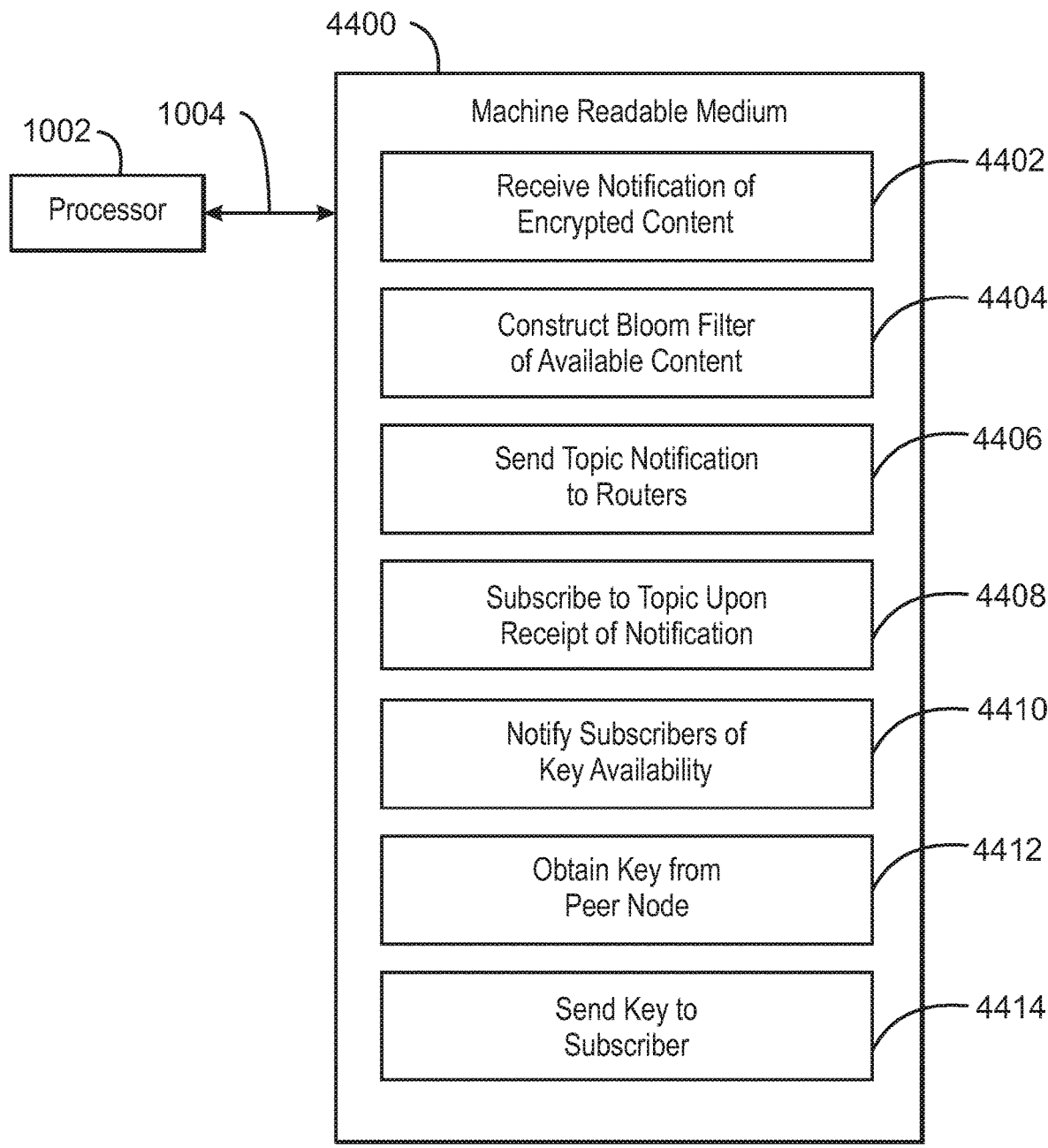
FIG. 44 is a block diagram of a non-transitory, machine readable medium including code to direct a processor to manage topic notification with encrypted content in accordance with some embodiments.

FIG. 44 is a block diagram of a non-transitory, machine readable medium 4400 including code to direct a processor 1002 to manage topic notification with encrypted content in accordance with some embodiments. The processor 1002 may access the non-transitory, machine readable medium 4400 over a bus 1004. The processor 1002 and bus 1004 may be implemented in a manner similar to the processor 1002 and bus 1004 described with respect to FIG. 10. The non-transitory, machine readable medium 4400 may include devices described for the mass storage 908 of FIG. 9 or may include optical disks, thumb drives, or any number of other hardware devices.

The non-transitory, machine readable medium 4400 may include code 4402 to direct the processor 1002 to receive a notification of encrypted content. The notification may be sent by the publisher, a prime router in contact with the publisher, or other routers in contact with the prime router. Code 4404 may be included to direct the processor 1002 to construct a bloom filter of available content. The bloom filter may include hash codes for topics that include encrypted content as well as hash codes for topics that do not include encrypted content.

Code 4406 may be included to direct the processor 1002 to send the topic notification to routers. The topic notification may include the information that the topic has encrypted content.

Code 4408 may be included to direct the processor 1002 to subscribe to a topic upon receipt of the topic notification, including, for example, a key management topic. Code 4410 may be included to direct the processor 1002 to notify subscribers of the availability of a key for the encrypted content.

Code 4412 may be included to direct the processor 1002 to obtain the key from a peer node, for example, if the subscriber is a router. The code 4412 may direct the processor 1002 to obtain the key from a router in communication with a subscriber.

Code 4414 may be included to direct the processor 1002 to send a key to a subscriber, wherein the subscriber may include a router or an end consumer of the content. The code 4414 may direct the processor to decrypt the content, for example, if the subscriber is a consumer of the content.

Any number of other code blocks may be included in the machine readable medium 4400 to implement functions of the IoT devices. These code blocks may include a communicator to build and transmit packets between IoT devices, a secure booter/measurer to perform measurements for securely running code, a key generator, or any number of other code blocks as described herein.

In addition to topic level encryption to protect contact, topics may be privacy sensitive within a group of publishers and subscribers. To achieve the added level of protection a group key may be used to encrypt topics. The group key may double as a content encryption key or may be a second group key. Distribution of the group key may follow the method 4200 described with respect to FIG. 42, among other techniques.

Figure 45:
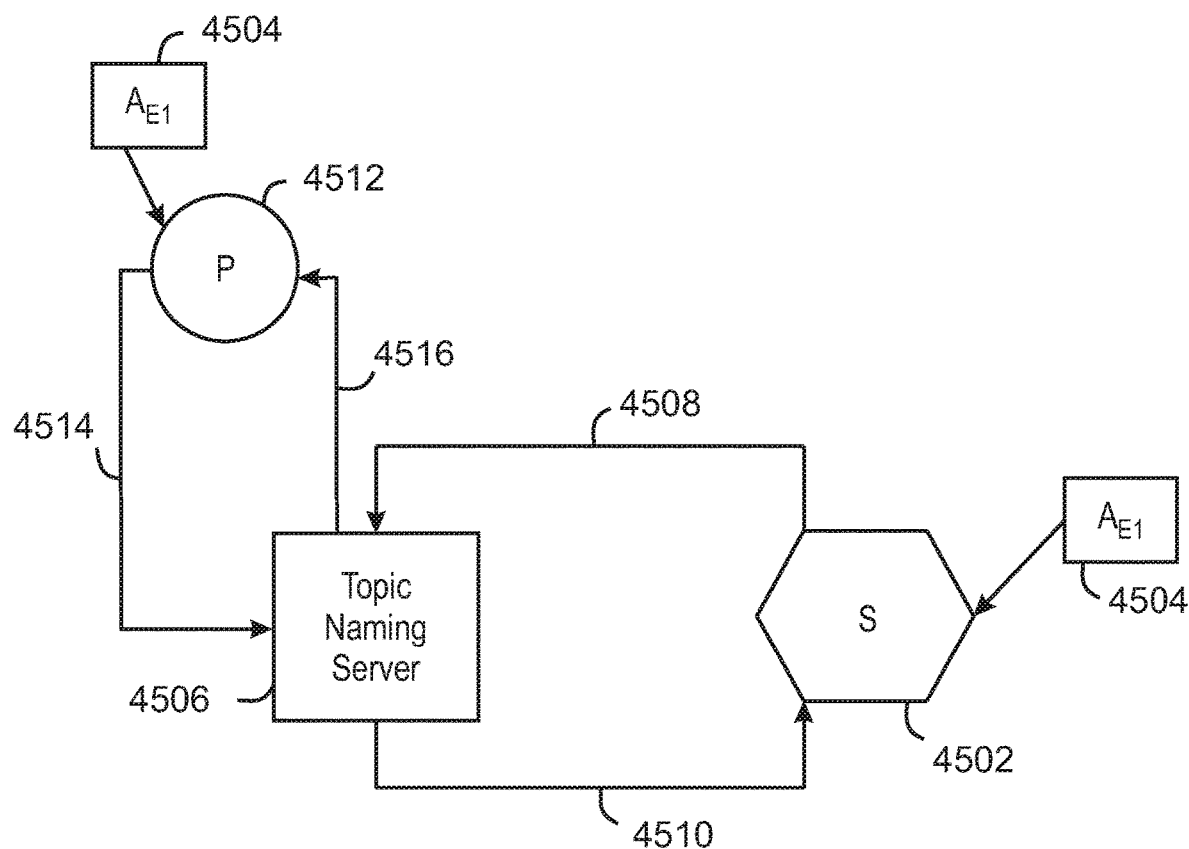
FIG. 45 is a schematic diagram of a subscriber obtaining a topic group key in accordance with some embodiments.

FIG. 45 is a schematic diagram of a subscriber 4502 obtaining a topic group key 4504 in accordance with some embodiments. The topic group key 4504 may be obtained by first enrolling the subscriber 4502 into a topic group managed by a topic naming server 4506, for example, by having the subscriber 4502 send a join request 4508 to the topic naming server 4506 to join or create a topic. The topic naming server 4506 may then issue a message 4510 including a group membership credential. Similarly, publishers 4512 may join the group by sending a join request 4514, and receiving a message 4516 from the topic naming server 4516 that includes the group membership credentials, such as the topic group key 4504.

The publisher 4512 and the subscriber 4502 may then authenticate as group members. Once the authentication is successful, the topic naming server 4506 may initiate a secure session to distribute the topic group key 4504 to the members.

Figure 46:
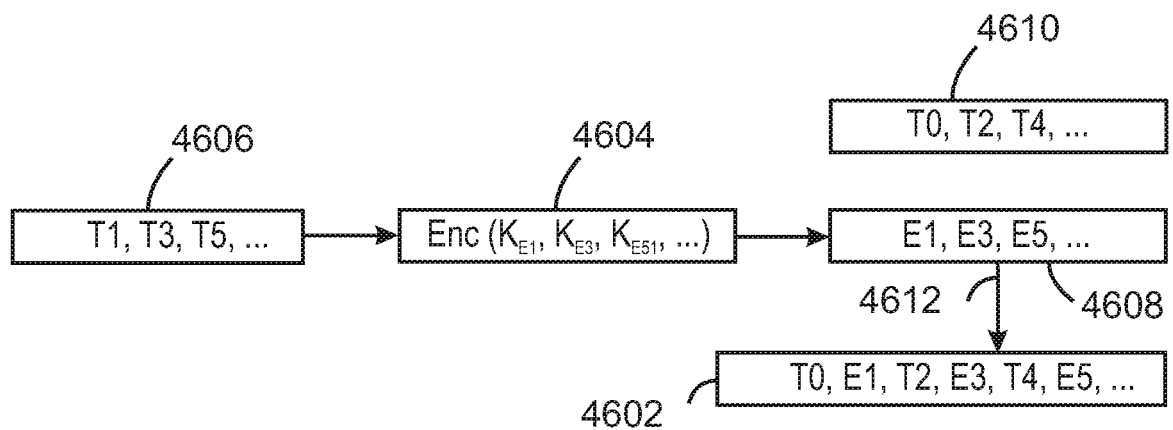
FIG. 46 is a schematic diagram of a publisher generating a subscription bloom filter for notification of subscribers of available topics in accordance with some embodiments.

FIG. 46 is a schematic diagram of a publisher generating a subscription bloom filter 4602 for notification of subscribers of available topics in accordance with some embodiments. The bloom filter notification system may function as described with respect to FIG. 34. Once the publishers and subscribers possess topic group keys 4604 for encrypting topics 4606, the topics 4606 may be encrypted to form encrypted topics 4608 by the publisher. Non-private topics 4610 may be combined in a hash function 4612 with the encrypted topics 4608 to form the notification bloom filter 4602. Similarly, subscribers may compute a subscription bloom filter by encrypting a topic of interest then using the encrypted value as input to the bloom filter.

Figure 47:
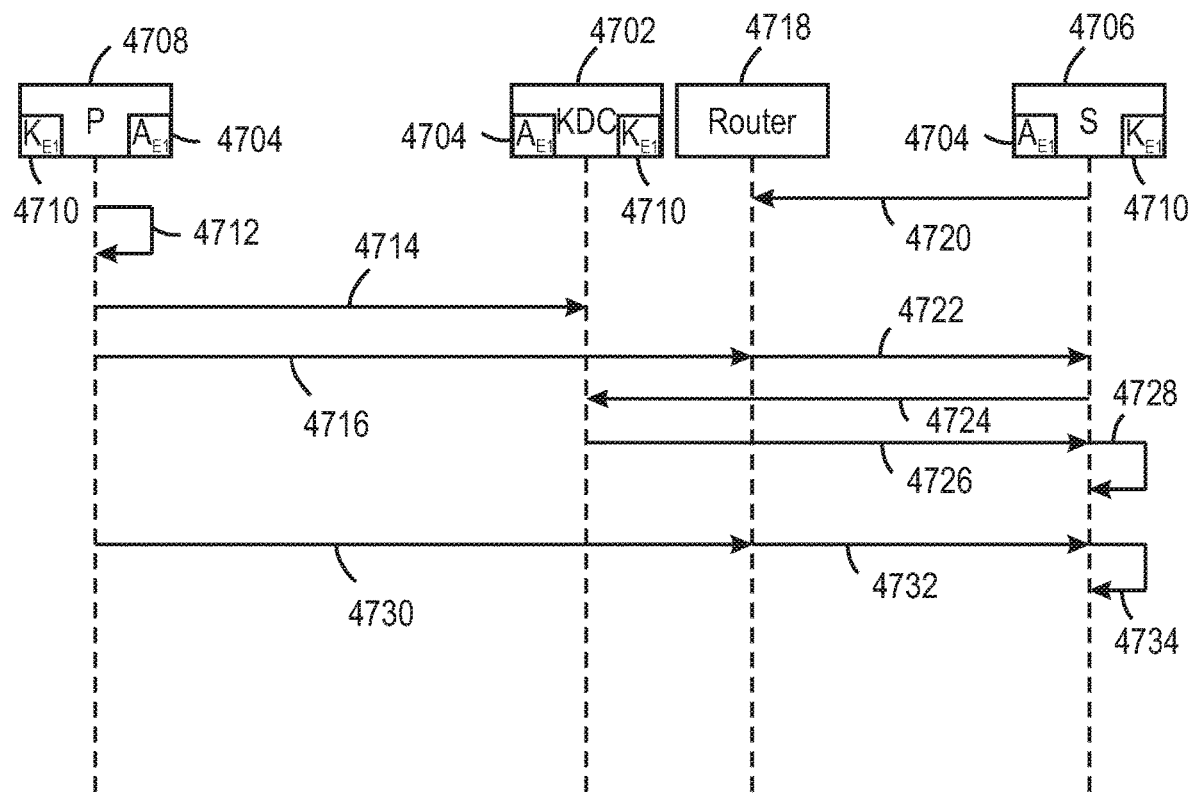
FIG. 47 is a ladder diagram of an example method for topic encryption in accordance with some embodiments.

FIG. 47 is a ladder diagram of an example method 4700 for topic encryption in accordance with some embodiments. The method 4700 of FIG. 47 may be implemented by the IoT device 5000 described with respect to FIG. 50. The topic encryption keys may be managed by a key distribution center (KDC) 4702 that receives a list of known topics from a topic naming service (TNS), for example, as described with respect to FIG. 45. The KDC 4702 may use a certificate, or attestation key 4704 issued by the TNS to verify subscribers, such as subscriber 4706, and publishers, such as publisher 4708, are members of the topic group before providing the topic group key 4710.

The TNS may use an Enhanced Privacy ID (EPID) key as the topic group key 4710 and an EPID Join protocol for enrolling members. The KDC 4702 may use a signed Diffie-Hellman protocol to establish a secure channel to the subscriber 4704 or publisher 4706 when distributing the topic group key 4704. The topic group key 4704 may be a symmetric key.

The method 4700 may begin when the publisher 4708 generates 4712 the topic encryption key 4710. The publisher 4708 then encrypts the topic encryption key 4710 with a key provided by the KDC 4702, and pushes the topic encryption key 4710 to the KDC 4702 in an attestation message 4714.

The publisher 4708 may then publish 4716 the topic to a router 4718, along with the content that is encrypted using the topic encryption key 4710. The subscriber 4706 may send a subscription message 4720 to the router 4718, for example, including a bloom filter that includes hash codes of topics the subscriber 4706 wishes to receive.

Upon receipt of the published topic message 4716, the router 4718 may determine that the content has been requested by the subscriber 4706. The router 4718 may then send a notification message 4722 to the subscriber 4706 that includes the encrypted content. The subscriber 4706 may then send an attestation message 4724 to the KDC 4702 with a request to get the topic encryption key 4710.

The KDC 4702 may then send a message 4726 that includes the topic encryption key 4710, for example, encrypted with a communications key. The subscriber 4706 may then decrypt 4728 the content for use.

Additional content may be provided for the topic using the same topic encryption key 4710. For example, the publisher 4708 may send a message 4730 to the router 4718 that includes the additional encrypted content. The router 4718 may then send a notification message 4732 to the subscriber 4706 that includes the additional encrypted content. The subscriber 4706 may then decrypt 4734 the additional content for use.

IoT networks are often partitioned according to a classification of security, privacy, integrity or safety. A multilevel security label may be used to disambiguate the classification. There may be a set of topics, or categories, pertaining to each level. A bloom filter mechanism, for example, as described with respect to FIG. 34, can be used to deliver notifications including the security label. The security label may then be followed by routing nodes and other subscribers and publishers. The multi-level security labels may be based on a number of different models, including, for example, the Biba Integrity Model, and the Bella-LaPadula security mode, among others.

Figure 48:
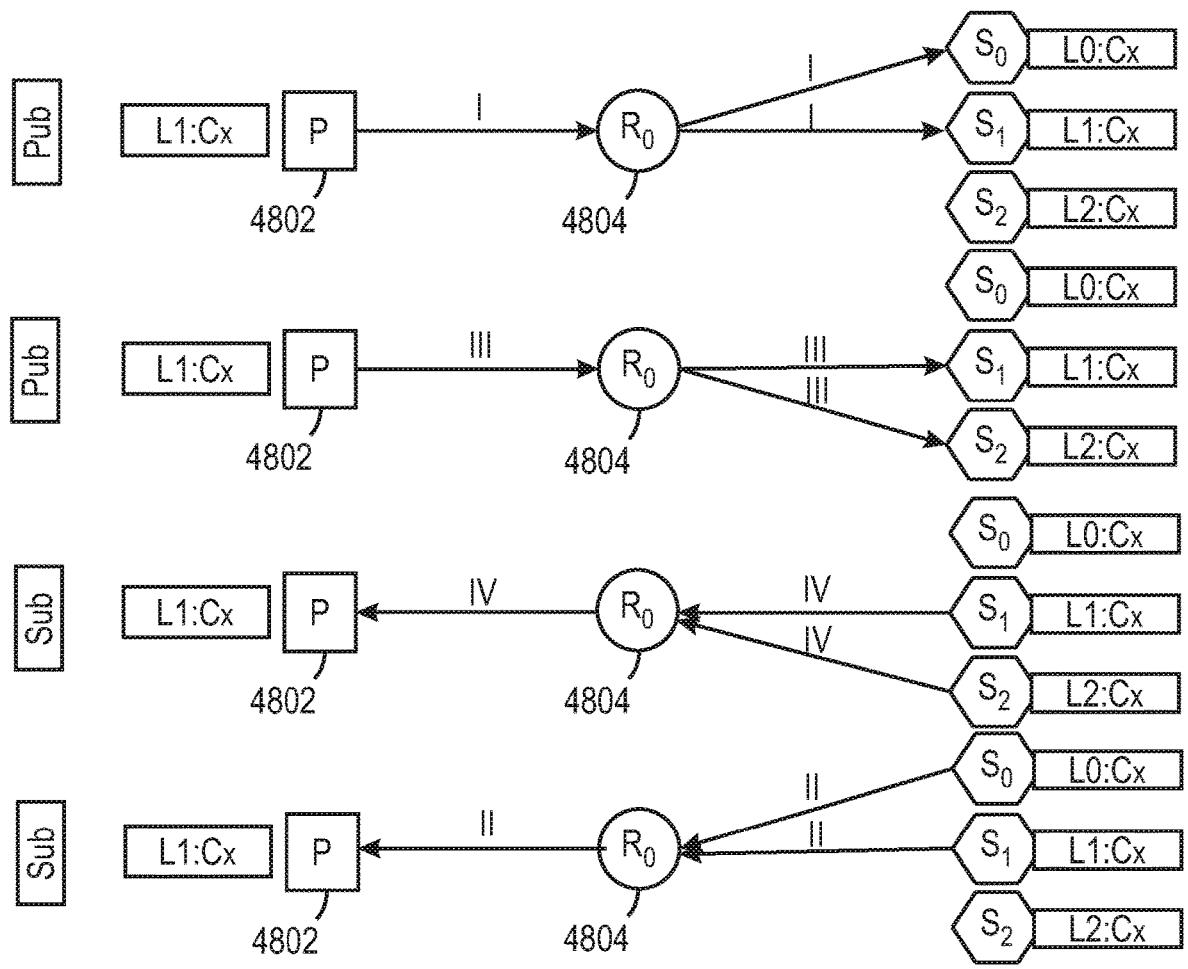
FIG. 48 is a schematic diagram of the use of multilevel security labels in a publication-subscribe environment in accordance with some embodiments.

FIG. 48 is a schematic diagram of the use of multilevel security labels in a publication-subscribe environment in accordance with some embodiments. The figure illustrates the use of a Biba integrity model and a Bell-LaPodula confidentiality model. In a Biba integrity model, there are generally no permitted writes up (constraint I) to a higher level, such as from L1 to L2, and no permitted reads down (constraint II) from a lower level, such as from L0 to L1. In a Bell-LaPadula confidentiality model, there are generally no permitted writes down (constraint III) to a lower level, such as from L1 to L0, and no permitted reads up (constraint IV) to a higher level, such as from L0 to L1.

A publisher 4802 may encode the security label as a bloom filter by mapping label categories to bloom topics, $C_x$. The label level may, itself, be a topic that is present when any of the label categories are supplied. It may be appropriate to encode the level topic with each of the category topics to ensure a category of a different level is not confused with the category of a first level. The encoding may be achieved, for example, by cryptographic hash of the two values or by applying some function f( ) such that the output value doesn't collide with any of the input values. For example, a bit pattern representing a level may be processed with the bit pattern for a topic by performing an XOR of the bit patterns. the resulting bit pattern may then be used in the bloom filter.

Routing nodes 4804 apply the security policy semantics by recognizing the security level topic then applying the appropriate security model behavior constraint. For example, if constraint I is followed, then a router may allow a subscriber S0 authorized to operate at a level L0 to receive a notification from a publisher authorized to operate at a level L1. Similarly, if a subscriber S2 is authorized to operate at level L2 the notification from the L1 publisher would be blocked.

The multi-level security policies illustrated in FIG. 48 are not exclusive. Other multi-level security policies may be used. Further, it can be noted that although the examples used herein describe the application of the multilevel security policies to multiple levels in a network, the security levels may be defined as different security levels in a single network level, among other definitions.

Figure 49:
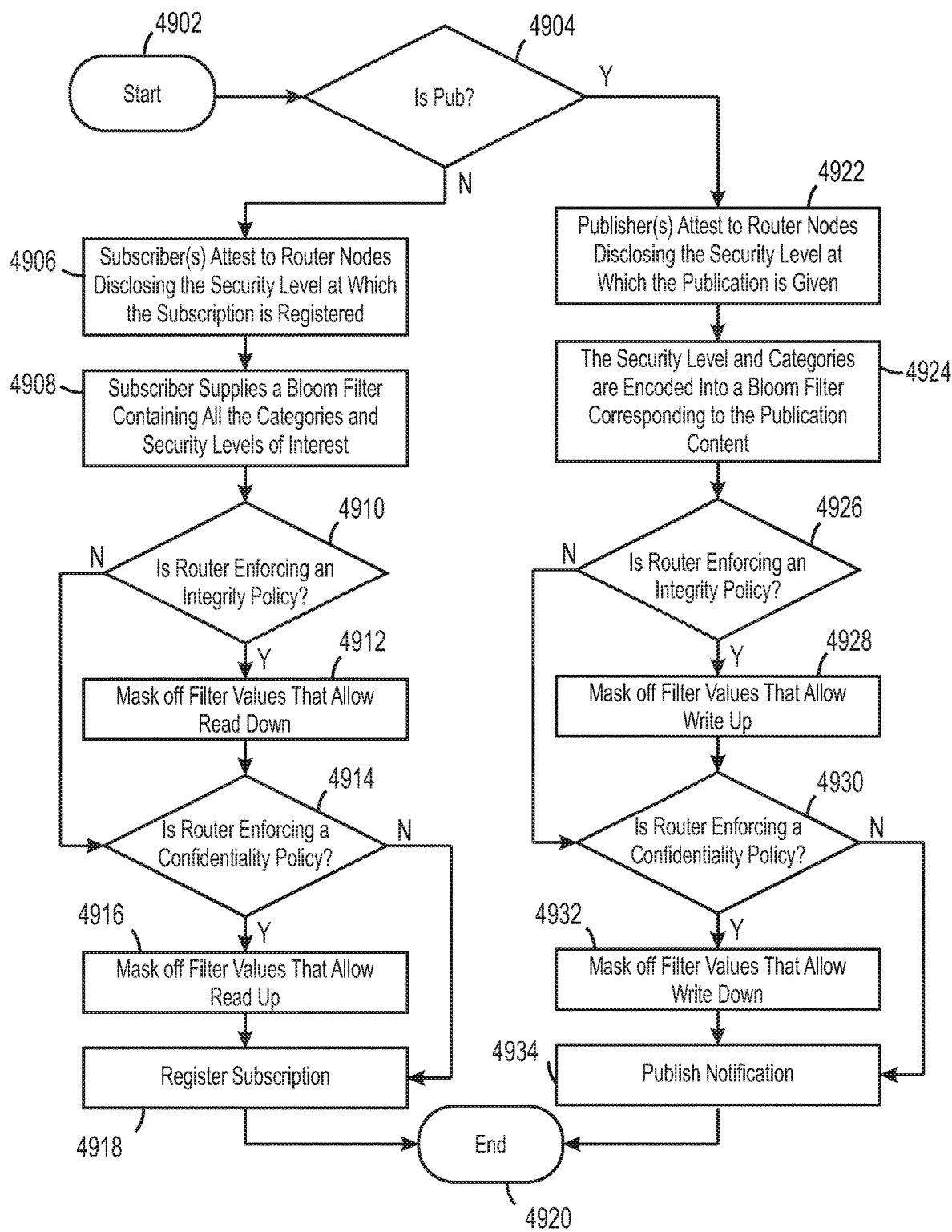
FIG. 49 is a process flow diagram of an example method for implementing bloom filters to apply multi-level security policies to notification messages in accordance with some embodiments.

FIG. 49 is a process flow diagram of an example method 4900 for implementing bloom filters to apply multi-level security policies to notification messages in accordance with some embodiments. The method 4900 of FIG. 49 may be implemented by the IoT device 5000 described with respect to FIG. 50. The method 4900 may begin at block 4902, for example, when a subscriber is requesting content where a publisher has content to share. At block 4904, a determination is made as to whether this is a publication. If not, the activity may be the registration of a subscription and process flow proceeds to block 4906.

At block 4906, a subscriber attests to its identity to router nodes, and discloses the security level at which the subscription is registered. At block 4908, the subscriber supplies a bloom filter, including the content of interest. As disclosed herein, the bloom filter may include overwritten bit hash codes for topics of interest, categories, and security levels, among others.

At block 4910, a determination is made as to whether the router is enforcing an integrity policy. If so, at block 4912, the router may mask off filter values that allowed reads down to lower network levels. At block 4914, a determination is made as to whether the router is enforcing a confidentiality policy. If so, at block 4916, the router may mask off filter values that allow reads up to higher network levels. At block 4918, the subscription is registered at the router. The method 4900 then ends at block 4920.

If, at block 4904, it is determined that the activity is a publication, process flow proceeds to block 4922. At block 4922, the publisher attests to router node the security level at which the publication is given. At block 4924, the security level in categories are encoded into a bloom filter corresponding to the publication content. As described herein, the bloom filter may, for example, include public topics, private topics, key management topics, security level topics, and others, in addition to the current publication.

At block 4926, a determination is made as to whether the router is enforcing an integrity policy. If so, at block 4928, the router may mask off filter values that allow writes up to higher network levels. At block 4930, a determination is made as to whether the router is enforcing a confidentiality policy. If so, at block 4932, the router may mask off filter values that allow writes down to lower network levels. At block 4934, the published notification is sent to the router, subscriber, or both. The method 4900 then ends at block 4920.

Figure 50:
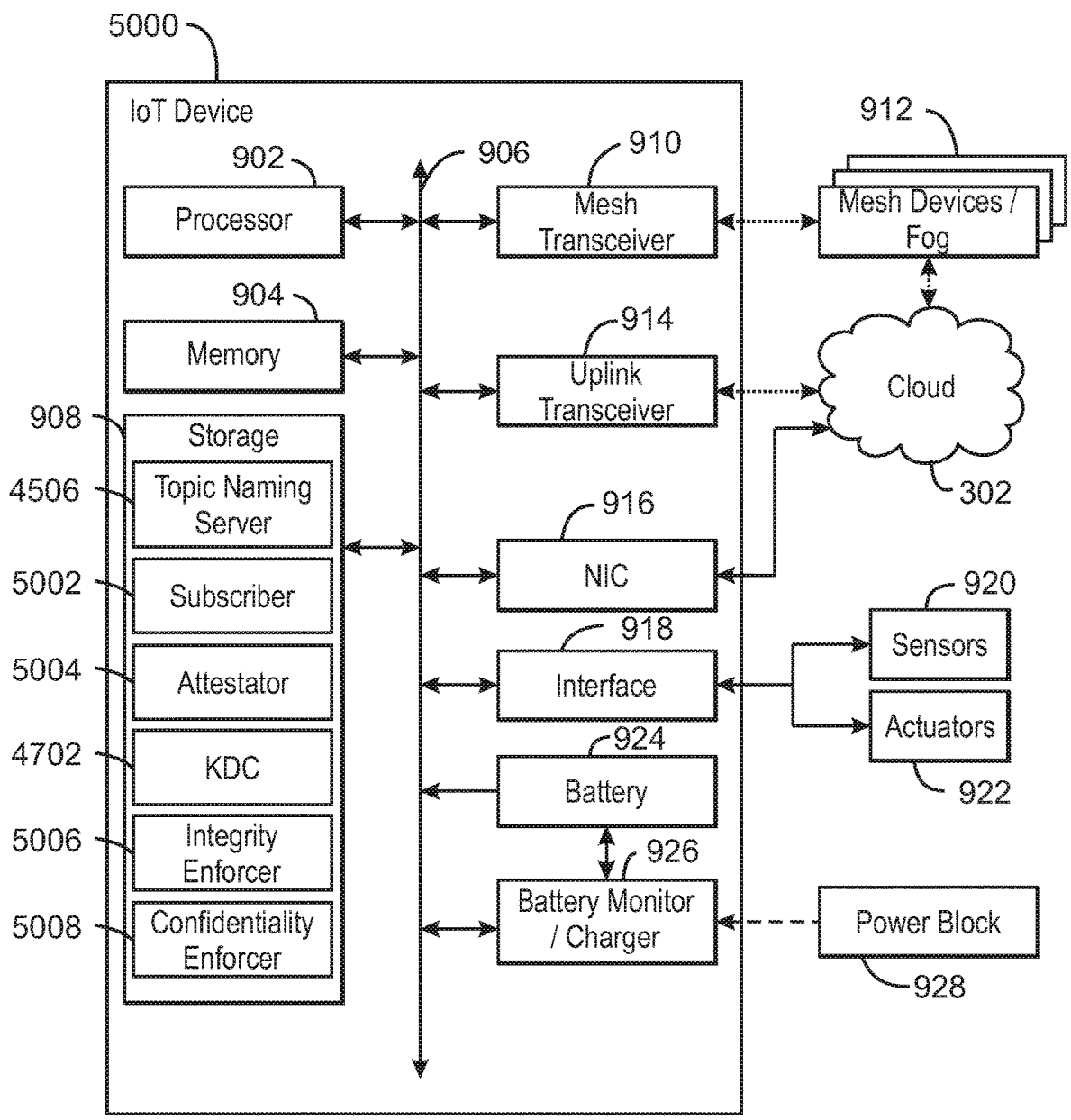
FIG. 50 is a block diagram of an example of components that may be present in an IoT device for managing topic notification with encrypted content in accordance with some embodiments.

FIG. 50 is a block diagram of an example of components that may be present in an IoT device 5000 for managing topic notification with encrypted content in accordance with some embodiments. The IoT device 5000 may function as a publisher, a router, or a subscriber in an IoT network, such as the fog 912. Like numbered items are as described with respect to FIGS. 3, 9, 45 and 47. It can be noted that different components may be selected and used for the IoT device 5000 than for those selected for the IoT device 900 discussed with respect to FIG. 9, and other IoT devices discussed herein.

The IoT device 5000 may include a trusted platform module (TPM), for example, compliant with the specification promulgated by the Trusted Computing Group as ISO/IEC 11889 in 2009. The TPM may include a cryptographic processor (CP), non-volatile memory (NVM), and secure memory (SM). The CP may provide a random number generator, an RSA hash generator, a SHA-1 hash generator, and an encryption-decryption engine, among others. The NVM may include keys programmed at the time of manufacture that include, for example, an RSA key, among others. The SM may hold measurements taken on software in platform configuration registers. As used herein, a measurement is a hash code calculated on a code or data segment stored in the storage 908 or memory 904. Starting from a measurement of a boot code segment, the measurements may be used to establish a trusted execution environment (TEE), by creating a chain-of-trust from the initial booting. The SM may provide secure storage.

The TPM may be used to establish a TEE, or secure enclave, for running programs. The TPM may also be used for any number of other functions, including providing cryptographic support for secure communications and keys for identification.

The mass storage 908 may include a number of modules to implement the encrypted content distribution functions described herein. Although shown as code blocks in the mass storage 908, it may be understood that any of the modules may be fully or partially replaced with hardwired circuits, for example, built into an application specific integrated circuit (ASIC).

The mass storage 908 may include a topic naming server 4506, as described with respect to FIG. 45. As described, the topic naming server 4506 may manage topics such as creating topic groups and issuing keys for topic groups, security levels, and the like. The topic naming server 4506 may use any number of techniques to generate the key, including techniques described herein, such as assembling circular fractional keys, EPID key generation, blockchain key generation, and the like.

A subscriber 5002 may supply a bloom filter containing categories, topics, and security levels of interest, among other items to routers and other devices, such as publishers. An attestator 5004 may attest to the identification of the publisher or subscriber, for example, to a key distribution center 4702, as described with respect to FIG. 47. The key distribution center 4702 may be located in another device such as in the fog 912 or the cloud 302. The key distribution center 4702 may confirm the identities of devices in the fog 912 or the cloud 302, and provide topic keys, level keys, or both, to other devices. The subscriber 5002 may receive notification of content of interest, and use the keys received from the key distribution center 4702 to decrypt the content of interest.

An integrity enforcer 5006 may mask off filter values that allow read operations down to lower security or network levels, write operations up to higher security or network levels, or both. A confidentiality enforcer 5008 may mask off filter values that allow read operations up to higher security or network levels, write operations down to lower security or network levels, or both.

Figure 51:
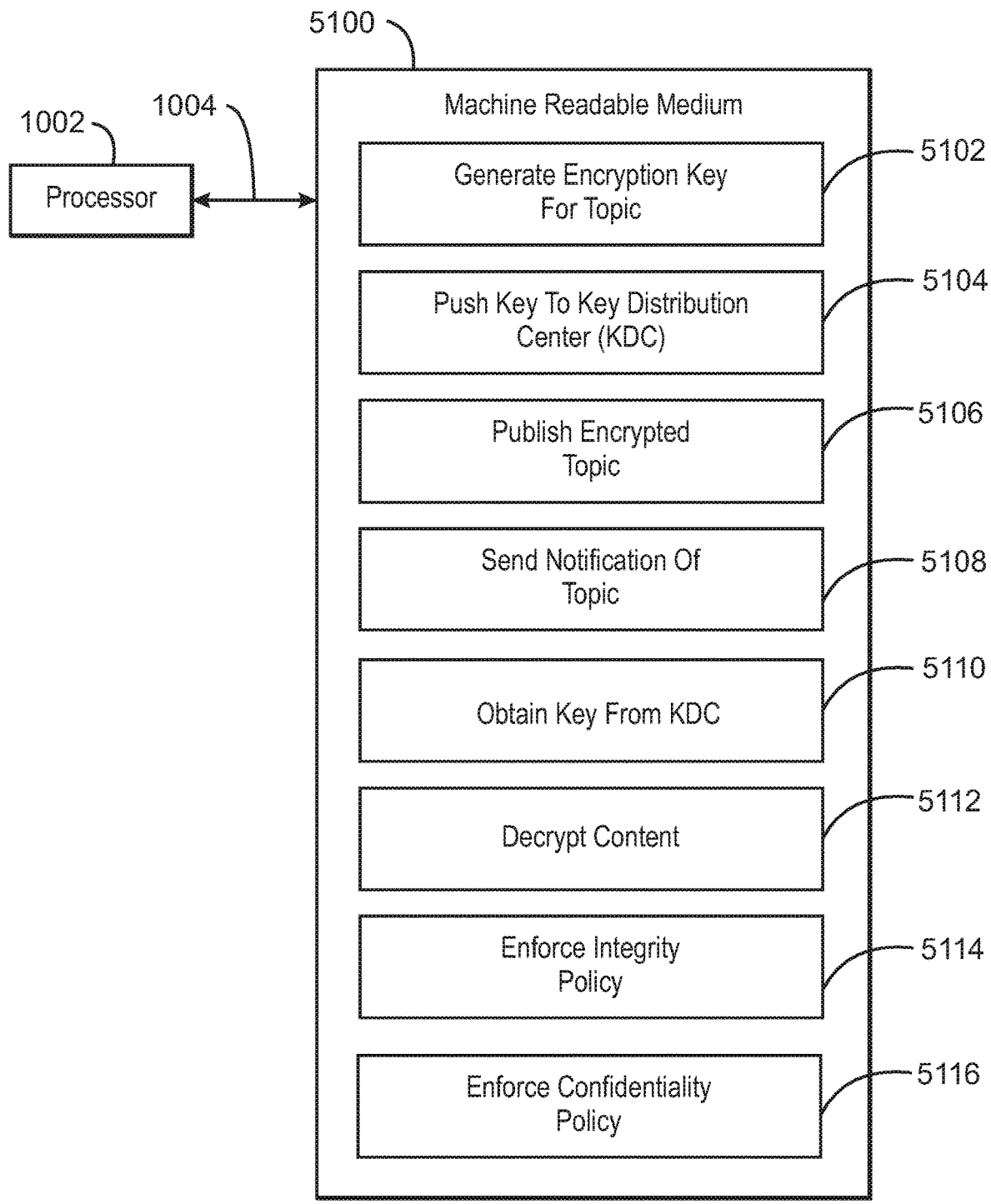
FIG. 51 is a block diagram of a non-transitory, machine readable medium including code to direct a processor to manage topic notification with encrypted content in accordance with some embodiments.

FIG. 51 is a block diagram of a non-transitory, machine readable medium 5100 including code to direct a processor 1002 to manage topic notification with encrypted content in accordance with some embodiments. The processor 1002 may access the non-transitory, machine readable medium 5100 over a bus 1004. The processor 1002 and bus 1004 may be implemented in a manner similar to the processor 1002 and bus 1004 described with respect to FIG. 10. The non-transitory, machine readable medium 5100 may include devices described for the mass storage 908 of FIG. 9 or may include optical disks, thumb drives, or any number of other hardware devices.

The non-transitory, machine readable medium 5100 may include code 5102 to direct the processor 1002 to generate an encryption key for a topic, a security level, or both. Code 5104 may be included to direct the processor 1002 to push the encryption key to a key distribution center. The key distribution center may then provide the key to devices that provide an attestation to the key distribution center to confirm identification. The devices may include publishers, routers, and subscribers, among others.

Code 5106 may be included to direct the processor 1002 to publish an encrypted topic, for example, to a router. Code 5108 may be included to direct the processor 1002 to send a notification of the topic to other devices, such as routers, subscribers, or both. The topic notification may include the information that the topic has encrypted content.

Code 5110 may be included to direct the processor 1002 to obtain the encryption key from the key distribution center, for example, by sending an attestation message that requests the encryption key. Code 5112 may be included to direct the processor 1002 to decrypt content using the encryption key.

Code 5114 may be included to direct the processor 1002 to enforce an integrity policy, for example, masking off filter values that allow a read down to a lower security or network level or write up to a higher security or network level. Code 5116 may be included to direct the processor 1002 to enforce a confidentiality policy, for example, masking off filter values that allow a read down to a lower security or network level or write up to a higher security or network level.

Any number of other code blocks may be included in the machine readable medium 5100 to implement functions of the IoT devices. These code blocks may include a communicator to build and transmit packets between IoT devices, a secure booter/measurer to perform measurements for securely running code, a key generator, or any number of other code blocks as described herein. The techniques described herein may be used to implement any number of IoT networks for various purposes. Additional applications may be implemented.

Example 1 includes an apparatus. The apparatus includes an Internet-of-Things (IoT) network, wherein the IoT network includes an IoT device. The IoT device includes a data manager to manage data on the IoT device, a data classifier to classify each fragment of data passing through the IoT device as inbound, outbound, or cache, and a data mapper to map the classified data to a physical location on the IoT device.

Example 2 includes the subject matter of example 1. In example 2, the IoT device includes a data historian to track data moving in and out of the IoT device.

Example 3 includes the subject matter of any of examples 1 to 2. In example 3, the IoT device includes a protocol manager to manage protocols used for frames for communication channels.

Example 4 includes the subject matter of any of examples 1 to 3. In example 4, the IoT device includes a network manager to manage network communications on a plurality of communication channels.

Example 5 includes the subject matter of any of examples 1 to 4. In example 5, the IoT device includes a communications manager to manage a mesh transceiver, an uplink transceiver, an Ethernet connection, or any combinations thereof.

Example 6 includes the subject matter of any of examples 1 to 5. In example 6, the IoT device includes an inbox to store inbound data for the IoT device itself.

Example 7 includes the subject matter of any of examples 1 to 6. In example 7, the IoT device includes an outbox to store outbound data to be sent to another mesh device.

Example 8 includes the subject matter of any of examples 1 to 7. In example 8, the IoT device includes a cache to store data requests.

Example 9 includes the subject matter of any of examples 1 to 9. In example 9, the IoT device includes a plurality of mesh devices in communication with each other to store and distribute data.

Example 10 includes the subject matter of any of examples 1 to 10. In example 10, the data is distributed in a stateless fashion.

Example 11 includes a method for dispersed content distribution. The method for dispersed content distribution includes classifying a data fragment as inbound data, outbound data, or cache data, and mapping the data fragment to a physical location in a data store.

Example 12 includes the subject matter of example 11. In example 12, the method includes calculating a hash key for an inbound data fragment, and determining if the hash key is in the data store, and if not, storing the data fragment.

Example 13 includes the subject matter of either of examples 11 or 12. In example 13, the method includes, if the data fragment is determined to be outbound data, calculating a time-to-live (TTL) for the data.

Example 14 includes the subject matter of any of examples 11 to 13. In example 14, the TTL is calculated as a number of hops the data fragment can be transmitted before deletion.

Example 15 includes the subject matter of any of examples 11 to 14. In example 15, the TTL is calculated as a time period before deletion.

Example 16 includes the subject matter of any of examples 11 to 15. In example 16, the TTL is calculated as a combination of a number of hops the data fragment can be transmitted and a time period.

Example 17 includes the subject matter of any of examples 11 to 16. In example 17, the method includes tracking inbound data request, outbound data requests, or both, in a data historian.

Example 18 includes the subject matter of any of examples 11 to 17. In example 18, the method includes adjusting a size of a cache based, at least in part, on a frequency of data accesses to the cache.

Example 19 includes the subject matter of any of examples 11 to 18. In example 19, the method includes selecting a storage type selected will, at least in part, on a frequency of data accesses to the cash Example 20 includes a non-transitory, machine readable medium. The non-transitory, machine readable medium includes instructions that, when executed, direct a processor to classify a data fragment that passes through an internet-of-things (IoT) device as inbound data, outbound data, or cache data, and map the classified data fragment to a physical location on the IoT device.

Example 21 includes the subject matter of example 20. In example 21, the non-transitory, machine readable medium includes instructions that, when executed, direct the processor to calculate a hash key for a data fragment of inbound data, and determine if the hash key is in a local store, and, if not, save the data fragment to the local store.

Example 22 includes the subject matter of either of examples 20 or 21. In example 22, the non-transitory, machine readable medium includes instructions that, when executed, direct the processor to update a data fragment that is in a local store.

Example 23 includes the subject matter of any of examples 20 to 22. In example 23, the non-transitory, machine readable medium includes instructions that, when executed, direct the processor to calculate a time-to-live for a data fragment.

Example 24 includes an apparatus. The apparatus includes an Internet-of-Things (IoT) network, wherein the IoT network includes an IoT device. The IoT device includes a bloom filter to store information on items in a K bucket, blockchain logic to create entries in a blockchain including values from the bloom filter, a content creator to create hash codes for the bloom filter, and a search manager to search a bloom filter to determine a probability that a search target is present.

Example 25 includes the subject matter of example 24. In example 25, the bloom filter includes a storage structure that includes a bit sequence.

Example 26 includes the subject matter of either of examples 24 or 25. In example 26, the bit sequence includes overwritten hash values calculated for each of the items.

Example 27 includes the subject matter of any of examples 24 to 26. In example 27, the K bucket includes a group of nodes associated with the IoT device.

Example 28 includes the subject matter of any of examples 26 to 27. In example 28, the items include resources, services, contracts, or IoT device identities, or any combinations thereof.

Example 29 includes the subject matter of any of examples 24 to 28, including a distributed hash tag (DHT) database to 29. In example 29, the DHT database includes an individual entry for each item in the K bucket.

Example 30 includes the subject matter of any of examples 24 to 29. In example 30, the apparatus includes a content locator to search the DHT database to determine if an item is present.

Example 31 includes the subject matter of any of examples 24 to 30. In example 31, the content creator is to create content including a universal resource identifier (URI), metadata, or hash codes, or any combinations thereof.

Example 32 includes the subject matter of any of examples 24 to 31. In example 32, the search manager is to pay tolls for further hops in a search.

Example 33 includes a method for resource discovery. The method for resource discovery includes calculating a hash code for a search target, comparing bits of the hash code to bits set in a bloom filter, and performing a search of a distributed hash table (DHT) for the hash code of the search target if the bits of the hash code match bits set in the bloom filter.

Example 34 includes the subject matter of example 33. In example 34, the method includes broadcasting the hash code of the search target to nodes within a local K bucket, and performing a search of the DHT on any of the nodes within the local K bucket for which the bits of the hash code match the bits set in the bloom filter.

Example 35 includes the subject matter of either of examples 33 or 34. In example 35, the method includes determining that the search in a local K bucket was unsuccessful, determining a toll cost for sending the hash code for the search target to a remote K bucket, paying the toll cost, and sending the hash code for the search target to the remote K bucket to continue the search.

Example 36 includes the subject matter of any of examples 33 to 35. In example 36, the method includes determining that the search in a local K bucket was unsuccessful, determining a toll cost for sending the hash code for the search target to a remote K bucket, and terminating the search if the toll cost passes a predetermined limit.

Example 37 includes the subject matter of any of examples 33 to 36. In example 37, the method includes initializing the DHT, creating a blockchain database, creating a genesis block in the blockchain database, and copying the blockchain database and the DHT to each of a plurality of participants.

Example 38 includes the subject matter of any of examples 33 to 37. In example 38, the method includes saving the bloom filter to the blockchain database as a transaction.

Example 39 includes the subject matter of any of examples 33 to 38. In example 39, the method includes saving a pointer to the blockchain database as a transaction, where the pointer includes a location of the DHT.

Example 40 includes the subject matter of any of examples 33 to 39. In example 40, the method includes creating content for the blockchain database, the DHT, or both, including creating an item hash code, saving the item hash code to the DHT, creating a universal resource identifier (URI) for data saved to the DHT, and saving the URI and the item hash code to the blockchain database.

Example 41 includes the subject matter of any of examples 33 to 40. In example 41, the method includes saving metadata for the URI and the item hash code to the blockchain database, wherein the metadata controls actions for content creators.

Example 42 includes a non-transitory, machine readable medium. The non-transitory, machine readable medium includes instructions that, when executed, direct a processor to lookup content to locate resources by calculating a hash code for a search target, and comparing bits of the hash code to bits set in a bloom filter.

Example 43 includes the subject matter of example 42. In example 43, the non-transitory, machine readable medium includes instructions that, when executed, direct the processor to determine that the bits of the hash code match bits set in the bloom filter, and search a DHT to determine if the hash code is in the DHT.

Example 44 includes the subject matter of either of examples 42 or 43. In example 44, the non-transitory, machine readable medium includes instructions that, when executed, direct the processor to create a blockchain database.

Example 45 includes the subject matter of any of examples 42 to 44. In example 45, the non-transitory, machine readable medium includes instructions that, when executed, direct the processor to create content for the blockchain database, including calculating an item hash code for each of a plurality of items.

Example 46 includes the subject matter of any of examples 42 to 45. In example 46, the non-transitory, machine readable medium includes instructions that, when executed, direct the processor to store each item hash code in the blockchain database.

Example 47 includes the subject matter of any of examples 42 to 46. In example 47, the non-transitory, machine readable medium includes instructions that, when executed, direct the processor to pay a toll to send a search to other nodes, if the search was unsuccessful in local notes.

Example 48 includes an apparatus for use in an Internet-of-Things (IoT) network. The apparatus for use in an Internet-of-Things (IoT) network includes a device connector to connect a device to a network of a decentralized database, a namespace discoverer to discover a namespace of a node of the decentralized database, a partition creator to create a shared database partition in response to being accepted by the node, a service advertiser to advertise a service to the decentralized database, and a data router to route data received and generated during the execution of a service between a private database partition and a shared database partition.

Example 49 includes the subject matter of examples 48. In example 49, the shared database partition is at least one of permissioned and encrypted.

Example 50 includes the subject matter of either of examples 48 or 49. In example 50, copies of data stored in a shared database partition is replicated to a second node in response to the second node presenting privileges indicating the authority of the second node to copy the data.

Example 51 includes the subject matter of any of examples 48 to 50. In example 51, the device installs decentralized database software in response to connecting to the network of a decentralized database.

Example 52 includes the subject matter of any of examples 48 to 51. In example 52, the device creates a shared database partition in response to connecting to the network of a decentralized database.

Example 53 includes the subject matter of any of examples 48 to 52. In example 53, the device requests to join the decentralized database in response to discovering the namespace of the node of the decentralized database.

Example 54 includes the subject matter of any of examples 48 to 53. In example 54, the device replicates a shared node partition for storage in the shared database partition, in response to creating the shared database partition.

Example 55 includes the subject matter of any of examples 48 to 54. In example 55, the data in the shared partition is replicated for storage in a shared node partition in response to data being routed to the shared database partition.

Example 56 includes the subject matter of any of examples 48 to 55. In example 56, the device receives acceptance to the decentralized database in response to the node voting on acceptance of the device.

Example 57 includes the subject matter of any of examples 48 to 56. In example 57, the device is accepted to the decentralized database in response to discovering the namespace of the node of the decentralized database.

Example 58 includes a method for joining a decentralized database. The method for joining a decentralized database includes connecting a device to a network of a decentralized database, discovering a namespace of a node of the decentralized database, creating a shared database partition in response to being accepted by the node, advertising a service to the decentralized database, and routing data received and generated during the execution of a service between a private database partition and a shared database partition.

Example 59 includes the subject matter of example 58. In example 59, the shared database partition is at least one of permissioned and encrypted.

Example 60 includes the subject matter of either of examples 58 or 59. In example 60, copies of data stored in a shared database partition is replicated to a second node in response to the second node presenting privileges indicating the authority of the second node to copy the data.

Example 61 includes the subject matter of any of examples 58 to 60. In example 61, the device installs decentralized database software in response to connecting to the network of a decentralized database.

Example 62 includes the subject matter of any of examples 58 to 61. In example 62, the device creates a shared database partition in response to connecting to the network of a decentralized database.

Example 63 includes the subject matter of any of examples 58 to 62. In example 63, the device requests to join the decentralized database in response to discovering the namespace of the node of the decentralized database.

Example 64 includes the subject matter of any of examples 58 to 63. In example 64, the device replicates a shared node partition for storage in the shared database partition, in response to creating the shared database partition.

Example 65 includes the subject matter of any of examples 58 to 64. In example 65, the data in the shared partition is be replicated for storage in a shared node partition in response to data being routed to the shared database partition.

Example 66 includes the subject matter of any of examples 58 to 65. In example 66, the device receives acceptance to the decentralized database in response to the node voting on acceptance of the device.

Example 67 includes the subject matter of any of examples 58 to 66. In example 67, the device is accepted to the decentralized database in response to discovering the namespace of the node of the decentralized database.

Example 68 includes a non-transitory, machine readable medium. The non-transitory, machine readable medium includes instructions that, when executed, direct a processor to connect a device to a network of a decentralized database, discover a namespace of a node of the decentralized database, create a shared database partition in response to being accepted by the node, advertise a service to the decentralized database, and route data received and generated in response to execution of a service between a private database partition and a shared database partition.

Example 69 includes the subject matter of example 68. In example 69, the shared database partition is at least one of permissioned and encrypted.

Example 70 includes the subject matter of either of examples 68 or 69. In example 70, copies of data stored in a shared database partition is replicated to a second node in response to the second node presenting privileges indicating the authority of the second node to copy the data.

Example 71 includes the subject matter of any of examples 68 to 70. In example 71, the device installs decentralized database software in response to connecting to the network of a decentralized database.

Example 72 includes the subject matter of any of examples 68 to 71. In example 72, the device creates a shared database partition in response to connecting to the network of a decentralized database.

Example 73 includes the subject matter of any of examples 68 to 53. In example 73, the device requests to join the decentralized database in response to discovering the namespace of the node of the decentralized database.

Example 74 includes the subject matter of any of examples 68 to 73. In example 74, the device replicates a shared node partition for storage in the shared database partition, in response to creating the shared database partition.

Example 75 includes the subject matter of any of examples 68 to 74. In example 75, the data in the shared partition is replicated for storage in a shared node partition in response to data being routed to the shared database partition.

Example 76 includes the subject matter of any of examples 68 to 75. In example 76, the device receives acceptance to the decentralized database in response to the node voting on acceptance of the device.

Example 77 includes the subject matter of any of examples 68 to 76. In example 77, the device is accepted to the decentralized database in response to discovering the namespace of the node of the decentralized database.

Example 78 includes an apparatus. The apparatus includes an Internet-of-Things (IoT) network, wherein the IoT network includes an IoT device. The IoT device includes an IoT network topology identifier to identify an IoT network topology showing connections between a plurality of IoT nodes in an IoT network, an IoT node resource identifier to identify IoT node resources of each IoT node identified in the IoT network topology, a neural network topology identifier to identify a neural network topology of node distances and node locations, a mapping optimizer to optimize a mapping based on the IoT node resources, the node distances, and the node locations, and a decomposable task processor to process a decomposable task in the plurality of IoT nodes based on an overlay of the neural network topology on the IoT network.

Example 79 includes the subject matter of example 78. In example 79, the neural network is an artificial neural network.

Example 80 includes the subject matter of either of examples 78 or 79. In example 80, the optimized mapping preserves a location of processing the decomposable task across the IoT network by using the node locations of the plurality of nodes to identify a node or the plurality of nodes located in a same physical location.

Example 81 includes the subject matter of any of examples 78 to 80. In example 81, the IoT network topology shows node characteristics including at least one of inter-node distances, clustering, dispersal information, received signal strengths, and signal to noise ratios.

Example 82 includes the subject matter of any of examples 78 to 81. In example 82, identifying the IoT network topology includes determining proximity of the plurality of nodes to each other, current power levels of the plurality of nodes, and a signal measurement for the plurality of nodes.

Example 83 includes the subject matter of any of examples 78 to 82. In example 83, retrieving the signal measurement of the plurality of nodes can be through retrieval of at least a received signal strength indicator or broadcasting power.

Example 84 includes the subject matter of any of examples 78 to 83. In example 84, the IoT node resources include at least one of a power level, an available storage space, a current processing load, networking capabilities, uptime, or node reliability information.

Example 85 includes the subject matter of any of examples 78 to 84. In example 85, the processing of a decomposable task in the plurality of IoT nodes includes dispatching portions of the decomposable task to the plurality of IoT nodes based on if the IoT nodes have identified being located in a physical location on a same network.

Example 86 includes the subject matter of any of examples 78 to 85. In example 86, the overlay of the neural network topology includes three layers including at least an input layer, a hidden layer, and an output layer.

Example 87 includes the subject matter of any of examples 78 to 86. In example 87, the optimizing a mapping includes a transmission time for transmission of information from input nodes to output nodes.

Example 88 includes a method for using an internet-of-things (IoT) device for distributed neural network mapping and resource management. The method for using an internet-of-things (IoT) device for distributed neural network mapping and resource management includes identifying an IoT network topology showing connections between a plurality of IoT nodes in an IoT network, identifying IoT node resources of each IoT node identified in the IoT network topology, identifying a neural network topology of node distances and node locations, optimizing a mapping based on the IoT node resources, the node distances, and the node locations, and processing an decomposable task in the plurality of IoT nodes based on an overlay of the neural network topology on the IoT network.

Example 89 includes the subject matter of example 88. In example 89, the neural network is an artificial neural network.

Example 90 includes the subject matter of either of examples 88 or 89. In example 9, the optimized mapping preserves a location of processing the decomposable task across the IoT network by using the node locations of the plurality of nodes to identify a node or the plurality of nodes located in a same physical location Example 91 includes the subject matter of any of examples 88 to 90. In example 91, the IoT network topology shows node characteristics including at least one of inter-node distances, clustering, dispersal information, received signal strengths, and signal to noise ratios.

Example 92 includes the subject matter of any of examples 88 to 91. In example 92, identifying the IoT network topology includes determining proximity of the plurality of nodes to each other, current power levels of the plurality of nodes, and a signal measurement for the plurality of nodes.

Example 93 includes the subject matter of any of examples 88 to 92. In example 93, retrieving the signal measurement of the plurality of nodes can be through retrieval of at least a received signal strength indicator or broadcasting power.

Example 94 includes the subject matter of any of examples 88 to 93. In example 94, the IoT node resources include at least one of a power level, an available storage space, a current processing load, networking capabilities, uptime, or node reliability information.

Example 95 includes the subject matter of any of examples 88 to 94. In example 95, the processing of a decomposable task in the plurality of IoT nodes includes dispatching portions of the decomposable task to the plurality of IoT nodes based on if the IoT nodes have identified being located in a physical location on a same network.

Example 96 includes the subject matter of any of examples 88 to 95. In example 96, the overlay of the neural network topology includes three layers including at least an input layer, a hidden layer, and an output layer.

Example 97 includes the subject matter of any of examples 88 to 96. In example 97, the optimizing a mapping includes a transmission time for transmission of information from input nodes to output nodes.

Example 98 includes a non-transitory, machine readable medium including instructions that, when executed, direct a processor to identify an IoT network topology showing connections between a plurality of IoT nodes in an IoT network, identify IoT node resources of each IoT node identified in the IoT network topology, identify a neural network topology of node distances and node locations, optimize a mapping based on the IoT node resources, the node distances, and the node locations, and process a decomposable task in the plurality of IoT nodes based on an overlay of the neural network topology on the IoT network.

Example 99 includes the subject matter of example 98. In example 99, the neural network is an artificial neural network.

Example 100 includes the subject matter of either of examples 98 or 99. In example 100, optimized mapping preserves a location of processing the decomposable task across the IoT network by using the node locations of the plurality of nodes to identify a node or the plurality of nodes located in a same physical location Example 101 includes the subject matter of any of examples 98 to 100. In example 101, the IoT network topology shows node characteristics including at least one of inter-node distances, clustering, dispersal information, received signal strengths, and signal to noise ratios.

Example 102 includes the subject matter of any of examples 98 to 101. In example 102, identifying the IoT network topology includes determining the proximity of plurality of nodes to each other, current power levels of the plurality of nodes, and a signal measurement for the plurality of nodes.

Example 103 includes the subject matter of any of examples 98 to 102. In example 103, retrieving the signal measurement of the plurality of nodes can be through retrieval of at least a received signal strength indicator or broadcasting power.

Example 104 includes the subject matter of any of examples 98 to 103. In example 104, the IoT node resources include at least one of a power level, an available storage space, a current processing load, networking capabilities, uptime, or node reliability information.

Example 105 includes the subject matter of any of examples 98 to 104. In example 105, the processing of a decomposable task in the plurality of IoT nodes includes dispatching portions of the decomposable task to the plurality of IoT nodes based on if the IoT nodes have identified being located in a physical location on a same network.

Example 106 includes the subject matter of any of examples 98 to 105. In example 106, the overlay of the neural network topology includes three layers including at least an input layer, a hidden layer, and an output layer.

Example 107 includes the subject matter of any of examples 98 to 106. In example 107, optimizing a mapping includes a transmission time for transmission of information from input nodes to output nodes.

Example 108. includes an apparatus including an Internet-of-Things (IoT) device. The apparatus including an Internet-of-Things (IoT) device. The IoT device includes blockchain logic to maintain a blockchain in the IoT device and propagate the blockchain across other IoT devices, a Merkle tree including hash code entries associated with each block in the blockchain, wherein an entry in the Merkle tree includes a reference to a lower level Merkle tree associated with a lower level blockchain for a lower level network, and a locator to search the Merkle tree for a target hash code to locate a target block in the blockchain, wherein if the locator encounters the reference to the lower level Merkle tree, the locator is to search the lower level Merkle tree for the target block.

Example 109 includes the subject matter of example 108. In example 109, the reference includes a network reference including a link to the lower level Merkle tree in the lower level network.

Example 110 includes the subject matter of either of examples 108 or 109. In example 110, the reference includes a link to a copy of the lower level Merkle tree in the IoT device.

Example 111 includes the subject matter of any of examples 108 to 110. In example 111, the apparatus includes an indexer to build the Merkle tree for the blockchain.

Example 112 includes the subject matter of any of examples 108 to 111. In example 112, the apparatus includes a cache creator to build a coherent cache in the IoT device, wherein the coherent cache includes a copy of the lower level Merkle tree.

Example 113 includes the subject matter of any of examples 108 to 112. In example 113, the apparatus includes a cache agent to maintain a coherent cache in the IoT device, wherein the cache agent subscribes to notifications from a device in the lower level network to inform the cache agent of cache coherency events.

Example 114 includes the subject matter of any of examples 108 to 113. In example 114, the cache agent is to publish cache coherency events to a higher level cache agent in a higher level network.

Example 115 includes a method for locating a block in a hierarchical blockchain. The method for locating a block in a hierarchical blockchain includes obtaining a hash value for the block, setting a current blockchain to a root of a hierarchical blockchain at a current network level, comparing the block hash value to values in a Merkle tree for the current blockchain, determining if the hash value maps to a sync block for a child blockchain and, if so, setting the current blockchain to the child blockchain, locating the block in the current blockchain, and retrieving the block.

Example 116 includes the subject matter of example 115. In example 116, obtaining the hash value includes looking up the hash value in a table.

Example 117 includes the subject matter of either of examples 115 or 116. In example 117, obtaining the hash value includes calculating the hash value.

Example 118 includes the subject matter of any of examples 115 to 117. In example 118, setting the current blockchain to the child blockchain includes setting a network reference to a lower level blockchain and continuing a search in the lower level blockchain.

Example 119 includes the subject matter of any of examples 115 to 118. In example 119, setting the current blockchain to the child blockchain includes setting a value for a pointer to a copy of the lower level blockchain in a coherent cache.

Example 120 includes the subject matter of any of examples 115 to 119. In example 120, locating the block in the current blockchain includes determining that the block hash value matches a value in a Merkle tree for the current blockchain, and obtaining a pointer to the block from the Merkle tree.

Example 121 includes the subject matter of any of examples 115 to 120. In example 121, the method includes constructing the hierarchical blockchain, including writing transactional data to a current blockchain for a local IoT network, determining if a block is a sync block, and if so constructing a transmission containing the hash of the sync block, sending the hash of the sync block to a next higher level IoT network, and committing the transmission to a current block in the next higher level network.

Example 122 includes the subject matter of any of examples 115 to 121. In example 122, the method includes constructing a coherent cache of the hierarchical blockchain, including subscribing the current blockchain to a publishing cache agent in a child blockchain, accepting registration of the current blockchain in the child blockchain, and waiting for publication events.

Example 123 includes the subject matter of any of examples 115 to 122. In example 123, the method includes maintaining a coherent cache of the hierarchical blockchain, including receiving a notification of a cache coherency event in a child blockchain, copying a Merkle tree path from the child blockchain and publishing it to a cache agent at a subscriber blockchain, and replacing a current cached Merkle tree path corresponding to the child blockchain.

Example 124 includes the subject matter of any of examples 115 to 123. In example 124, the method includes determining if the path forms a new branch of the Merkle tree path, and if so constructing a new local root in the current blockchain, making the current blockchain equal to the local root, and repeating the construction of the new local root until the local root is the same as a global root.

Example 125 includes a non-transitory, machine readable medium that includes instructions that, when executed, direct a processor to construct a hierarchical blockchain, and constructing a hierarchical index of the hierarchical blockchain.

Example 126 includes the subject matter of example 125. In example 126, the non-transitory, machine readable medium includes instructions that, when executed, direct the processor to insert a reference to a lower level blockchain in the hierarchical index.

Example 127 includes the subject matter of either of examples 125 or 126. In example 127, the non-transitory, machine readable medium includes instructions that, when executed, direct the processor to construct a coherent cache of Merkle trees at lower levels in an internet-of-things (IoT) network.

Example 128 includes the subject matter of any of examples 125 to 127. In example 128, the non-transitory, machine readable medium includes instructions that, when executed, direct the processor to copy Merkle trees from lower levels in an internet-of-things (IoT) to a current level in the IoT network.

Example 129 includes the subject matter of any of examples 125 to 128. In example 129, the non-transitory, machine readable medium includes instructions that, when executed, direct the processor to maintain a coherency of a cache of Merkle trees from lower levels in an IoT network.

Example 130 includes an apparatus. The apparatus includes an Internet-of-Things (IoT) network, wherein the IoT network includes an IoT device. The IoT device includes a bloom filter topic list including a hash code of a topic, a subscription manager to compare the bloom filter topic list to a list of available content, and a content locator to provide content associated with a hash code.

Example 131 includes the subject matter of example 130. In example 131, the IoT device includes a white list mask including hash codes of allowed content.

Example 132 includes the subject matter of either of examples 130 or 131. In example 132, the IoT device includes a blacklist mask including hash codes of prohibited content.

Example 133, includes the subject matter of any of examples 130 to 132. In example 133, the IoT device includes including a hash code calculator to obtain a hash code for a topic.

Example 134 includes the subject matter of any of examples 130 to 133. In example 134, the IoT device includes including a trusted platform module to establish a trusted execute environment.

Example 135 includes the subject matter of any of examples 130 to 134. In example 135, the IoT device includes a subscriber that is provided content from another device.

Example 136 includes the subject matter of any of examples 130 to 135. In example 136, the IoT device includes a publisher that provides content to another device.

Example 137 includes the subject matter of any of examples 130 to 136. In example 137, the IoT device includes a router that provides content to a plurality of devices.

Example 138 includes the subject matter of any of examples 130 to 137. In example 138, the plurality of devices includes subscribers, publishers, or routers, or any combinations thereof.

Example 139 includes a method for implementing a publish subscribe content distribution model using bloom filters. The method for implementing a publish subscribe content distribution model using bloom filters includes receiving a registration of a subscriber bloom filter including a hash code of a topic, calculating a content intercept of the subscriber bloom filter with a publisher bloom filter including a plurality of hash codes of topics, and providing content to a subscriber for the hash code if the content intercept indicates a bit match between set bits in the subscriber bloom filter and set bits in the publisher bloom filter.

Example 140 includes the subject matter of example 139. In example 140, the method includes calculating a white list intercept of the subscriber bloom filter with a white list mask including a plurality of hash codes of allowed topics.

Example 141 includes the subject matter of either of examples 139 or 140. In example 141, the method includes calculating the white list intercept by performing an AND function between the subscriber bloom filter and the white list mask.

Example 142 includes the subject matter of any of examples 139 to 141. In example 142, the method includes calculating a blacklist intercept of the subscriber bloom filter with a blacklist mask including a plurality of hash codes of prohibited topics.

Example 143 includes the subject matter of any of examples 139 to 142. In example 143, the method includes calculating the backlist intercept by calculating an intermediate bloom filter as a NAND function between the subscriber bloom filter and the blacklist mask, and calculating the blacklist intercept as an AND function between the intermediate bloom filter and the subscriber bloom filter.

Example 144 includes the subject matter of any of examples 139 to 143. In example 144, the method includes providing the content to the subscriber if a white list intercept indicates a bit match between set bits in the subscriber bloom filter and set bits in a white list mask, and a blacklist intercept indicates no bit match between set bits in the subscriber bloom filter and set bits in a blacklist mask.

Example 145 includes the subject matter of any of examples 139 to 144. In example 145, the method includes generating a bloom filter topic list by calculating a hash code of each of a plurality of topics and overwriting the hash code for each of the plurality of topics onto a bloom filter.

Example 146 includes a non-transitory, machine readable medium that includes instructions that, when executed, direct a processor to register a subscription bloom filter, compute an intersection of the subscription bloom filter with a content filter, and if the intersection is not zero provide content associated with the subscription bloom filter.

Example 147 includes the subject matter of example 146. In example 147, the non-transitory, machine readable medium includes instructions that, when executed, direct the processor to register a white list mask that indicates permitted content, and register a blacklist mask that indicates prohibited content.

Example 148 includes the subject matter of either of examples 146 or 147. In example 148, the non-transitory, machine readable medium includes instructions that, when executed, direct the processor to determine that a hash code of the subscription bloom filter has a nonzero intercept with the white list mask, and, if so, provide the content.

Example 149 includes the subject matter of any of examples 146 to 148. In example 149, the non-transitory, machine readable medium includes instructions that, when executed, direct the processor to determine that a hash code of the subscription bloom filter has a nonzero intercept with the blacklist mask, and, if so, block the content from being provided.

Example 150 includes the subject matter of any of examples 146 to 149. In example 150, the non-transitory, machine readable medium includes instructions that, when executed, direct the processor to determine a hash code for a topic, and write the hash code to the subscription bloom filter.

Example 151 includes the subject matter of any of examples 146 to 150. In example 151, the non-transitory, machine readable medium includes instructions that, when executed, direct the processor to determine a hash code for a topic, perform an XOR on the hash code and the subscription bloom filter to generate a new bloom filter, and replace the subscription bloom filter with the new bloom filter.

Example 152 includes an apparatus. The apparatus includes an Internet-of-Things (IoT) network, wherein the IoT network includes an IoT device. The IoT device includes a topic classifier to determine that a topic includes encrypted content, a notifier to send a notification to other devices that the topic includes encrypted content, and a key subscriber to subscribe to the topic including a topic key for the encrypted content.

Example 153 includes the subject matter of example 152. In example 153, the IoT network includes a publisher to provide the topic including the encrypted content.

Example 154 includes the subject matter of either of examples 152 or 153. In example 154, the IoT network includes a router in communication with a publisher to obtain the encrypted content for the topic.

Example 155 includes the subject matter of any of examples 152 to 154. In example 155, the router is to obtain the topic key from the publisher for the encrypted content.

Example 156 includes the subject matter of any of examples 152 to 155. In example 156, the IoT network includes a router in communication through a chain of routers to a publisher.

Example 157 includes the subject matter of any of examples 152 to 156. In example 157, the key subscriber of the router is to obtain the topic key from a peer node in the chain of routers.

Example 158 includes the subject matter of any of examples 152 to 157. In example 158, the router includes a cache for the topic key, wherein the key subscriber preemptively obtains the topic key from a peer node in the chain of routers to warm the cache.

Example 159 includes the subject matter of any of examples 152 to 158. In example 159, the IoT network includes a subscriber in communication with a router, wherein the subscriber includes a consumer of the encrypted content.

Example 160 includes the subject matter of any of examples 152 to 159. In example 160, the key subscriber of the subscriber is to obtain the topic key from the router.

Example 161 includes the subject matter of any of examples 152 to 160. In example 161, the subscriber includes a decryptor to decrypt the encrypted content using the topic key.

Example 162 includes a method for managing encryption keys in a publication-subscription content distribution environment. The method for managing encryption keys in a publication-subscription content distribution environment includes receiving a topic notification that a topic including encrypted content is available, subscribing to a key management topic for a topic key, receiving a notification that the topic key is available, and requesting the topic key to preemptively warm a cache.

Example 163 includes the subject matter of example 162. In example 163, the method includes receiving a request from a subscriber for the topic key, and providing the topic key from the cache.

Example 164 includes the subject matter of either of examples 162 or 163. In example 164, the method includes constructing the key management topic to notify devices regarding availability of the topic key.

Example 165 includes the subject matter of any of examples 162 to 164. In example 165, the method includes determining if the topic key is in the cache, and, if not, requesting the topic key from a peer node.

Example 166 includes the subject matter of any of examples 162 to 165. In example 166, the method includes constructing a bloom filter including hash codes of available published topics.

Example 167 includes the subject matter of any of examples 162 to 166. In example 167, requesting the topic key includes issuing a GET command to obtain the topic key.

Example 168 includes the subject matter of any of examples 162 to 167. In example 168, the method includes encrypting the topic key using a site specific key to protect the topic key from interception during transfers between routing nodes and subscriber nodes.

Example 169 includes the subject matter of any of examples 162 to 168. In example 169, the method includes downloading the encrypted content from a public repository.

Example 170 includes the subject matter of any of examples 162 to 169. In example 170, the method includes decrypting the encrypted content using the topic key.

Example 171 includes a non-transitory, machine readable medium that includes instructions that, when executed, direct a processor to receive a topic notification of encrypted content, subscribe to key management topic upon receipt of the topic notification, and obtain the topic key from a peer node upon receipt of a key notification that the topic key is available.

Example 172 includes the subject matter of example 171. In example 172, the non-transitory, machine readable medium includes instructions that, when executed, direct the processor to construct a bloom filter including hash codes of available content.

Example 173 includes the subject matter of either of examples 171 or 172. In example 173, the non-transitory, machine readable medium includes instructions that, when executed, direct the processor to send the topic notification to a peer router.

Example 174 includes the subject matter of any of examples 171 or 173. In example 174, the non-transitory, machine readable medium includes instructions that, when executed, direct the processor to notify subscribers of the topic including encrypted content.

Example 175 includes the subject matter of any of examples 174 to 174. In example 175, the non-transitory, machine readable medium includes instructions that, when executed, direct the processor to send the topic key to a subscriber upon receiving a request for the topic key from the subscriber.

Example 176 includes an apparatus. The apparatus includes an Internet-of-Things (IoT) network, wherein the IoT network includes an IoT device. This also includes an attestator to provide a group membership credential for the IoT device to a key distribution center, and a subscriber to supply a bloom filter including a hash code of a topic of interest, and receive a key from the key distribution center to decrypt content of interest.

Example 177 includes the subject matter of example 176. In example 177, the topic of interest includes a public topic, a private topic, a key management topic, or a security level topic, or any combinations thereof.

Example 178 includes the subject matter of either of examples 176 or 177. In example 178, the apparatus includes a topic naming server to enroll a device in a topic and issue the group membership credential to the IoT device.

Example 179 includes the subject matter of any of examples 176 to 178. In example 179, the apparatus includes the key distribution center to verify an identity of the IoT device and provide a topic group key to the IoT device.

Example 180 includes the subject matter of any of examples 176 to 178. In example 180, the apparatus includes an integrity enforcer to block read operations to a lower level, write operations to a higher level, or both.

Example 181 includes the subject matter of any of examples 176 to 180. In example 181, a level may be a security level, a network level, or both.

Example 182 includes the subject matter of any of examples 176 to 181. In example 182, the apparatus includes a confidentiality enforcer to block read operations to a higher level, write operations to a lower level, or both.

Example 183 includes the subject matter of any of examples 176 to 182. In example 183, a level may be a security level, a network level, or both.

Example 184 includes a method for managing topic encryption in a publication-subscription environment. The method for managing topic encryption in a publication-subscription environment includes subscribing to an encrypted topic at a router, receiving a notification of the encrypted topic including encrypted content, sending a subscriber attestation message to a key distribution center (KDC), receiving a topic encryption key from the KDC, and decrypting the encrypted content using the topic encryption key.

Example 185 includes the subject matter of example 184. In example 185, the method includes receiving a notification for the encrypted topic including further encrypted content, and decrypting the further encrypted content using the topic encryption key.

Example 186 includes the subject matter of either of examples 184 or 185. In example 186, the method includes generating the topic encryption key, pushing the topic encryption key to the KDC in a publisher attestation message, and publishing encrypted content to a router.

Example 187 includes the subject matter of any of examples 184 to 186. In example 187, the method includes receiving a subscription for the encrypted topic from a subscriber, receiving a publication of the encrypted topic from a publisher, and providing a notification of the publication with the encrypted content to the subscriber.

Example 188 includes the subject matter of any of examples 184 to 187. In example 188, the method includes enforcing an integrity policy by preventing reads down to a lower level, writes up to a higher level, or both.

Example 189 includes the subject matter of any of examples 184 to 188. In example 189, a level is a security level, a network level, or both.

Example 190 includes the subject matter of any of examples 184 to 189. In example 190, the method includes enforcing a confidentiality policy by preventing reads up to a higher level, writes down to a lower level, or both.

Example 191 includes the subject matter of any of examples 184 to 190. In example 191, a level is a security level, a network level, or both.

Example 192 includes a non-transitory, machine readable medium that includes instructions that, when executed, direct a processor to generate a topic encryption key, push the topic encryption key to a key distribution center (KDC), and publish content encrypted using the topic encryption key to a router.

Example 193 includes the subject matter of example 192. In example 193, the non-transitory, machine readable medium includes instructions that, when executed, direct the processor to send encrypted content to a subscriber.

Example 194 includes the subject matter of either of examples 192 or 193. In example 194, the non-transitory, machine readable medium includes instructions that, when executed, direct the processor to obtain the topic encryption key from the key distribution center.

Example 195 includes the subject matter of any of examples 192 to 194. In example 195, the non-transitory, machine readable medium includes instructions that, when executed, direct the processor to decrypt content using the topic encryption key.

Example 196 includes the subject matter of any of examples 192 to 195. In example 196, the non-transitory, machine readable medium includes instructions that, when executed, direct the processor to attest to an identity using a certificate provided by a topic naming server.

Example 197 includes the subject matter of any of examples 192 to 196. In example 197, the non-transitory, machine readable medium includes instructions that, when executed, direct the processor to enforce an integrity policy.

Example 198 includes the subject matter of any of examples 192 to 197. In example 198, the non-transitory, machine readable medium includes instructions that, when executed, direct the processor to enforce a confidentiality policy.

Example 199 includes an apparatus including means to perform a method as in any other Example.

Example 200 includes machine-readable storage including machine-readable instructions, when executed, to implement a method or realize an apparatus as in any other Example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An IoT device comprising:
    a cache to store incoming data;
    a data classifier to classify the incoming data obtained at the IoT device as inbound data, outbound data, or cache data; and
    a data mapper to generate a hash key of a fragment of the inbound data;
    a data manager to process the fragment of the inbound data by:
        when the hash key is in a data store, ignoring the fragment of the inbound data; and
        when the hash key is not in the data store, storing the fragment of the inbound data in the data store;
    a resource manager to process a fragment of the outbound data by calculating a maximum number of hops for the fragment of the outbound data based on resources of the IoT device, the maximum number of hops identifying when the fragment of the outbound data will be invalidated; and
    a communicator to transmit the fragment of the outbound data to a target node, the IoT device and the target node included in an IoT network including a plurality of mesh devices in communication with each other to store and distribute data in a stateless fashion.

2. The IoT device of claim 1, further including a data historian to track data moving in and out of the IoT device.

3. The IoT device of claim 1, further including a protocol manager is to manage protocols used for frames for communication channels.

4. The IoT device of claim 1, further including a network manager to manage network communications on a plurality of communication channels.

5. The IoT device of claim 1, wherein the communicator is to manage a mesh transceiver, an uplink transceiver, an Ethernet connection, or any combinations thereof.

6. The IoT device of claim 1, further including an outbox to store outbound data to be sent to another mesh device.

7. The IoT device of claim 1, wherein the resource manager is to calculate the maximum number of hops based on at least one of power of the IoT device or a network node count.

8. A method for dispersed content distribution, the method comprising:
    tracking at least one of inbound data or outbound data in a data historian;
    classifying, by executing an instruction with a processor of an IoT device, an obtained data fragment as inbound data, outbound data, or cache data; when the data fragment is inbound data:
        generating, by executing an instruction with the processor of the IoT device, a hash key of the data fragment;
        when the hash key is in a data store, updating the data store based on a portion of the data fragment that differs from a stored data fragment corresponding to the hash key; and
        when the hash key is not in the data store, storing the data fragment in the data store; and
    when the data fragment is outbound data:
        calculating, by executing an instruction with the processor of the IoT device, a time-to-live (TTL) for the data fragment based on resources of the IoT device, the TTL identifying when the data fragment will be invalidated, the TTL calculated as at least one of a number of hops the data fragment can be transmitted before deletion or a time period before deletion; and transmitting the data fragment to a target node; and adjusting a size of a cache based on a frequency of data accesses to the cache.

9. The method of claim 8, further including selecting a storage type selected based on the frequency of data accesses to the cache.

10. The method of claim 8, wherein the TTL is based on at least one of power of the IoT device or a network node count.

11. A non-transitory computer readable storage medium comprising instructions that, when executed, cause one or more processors of an internet-of-things (IoT) device to at least:

store a data fragment in a cache;

classify the data fragment obtained at the IoT device as inbound data, outbound data, or cache data; if the data fragment is inbound data:

generate a hash key of the data fragment;

if the hash key is in a data store, discard the data fragment; and if the hash key is not in the data store, store the data fragment in the data store; and if the data fragment is outbound data:

calculate a time-to-live (TTL) for the data fragment based on resources of the IoT device, the TTL identifying when the data fragment will be invalidated; and transmit the data fragment to a target node, the IoT device and the target node included in an IoT network including a plurality of mesh devices in communication with each other to store and distribute data in a stateless fashion.

12. The computer readable storage medium of claim 11, wherein the instructions cause the one or more processors to update a stored data fragment that is in the data store when the hash key is in the data store.

13. The computer readable storage medium of claim 11, wherein the instructions cause the one or more processors to calculate the TTL for the data fragment as at least one of a number of hops the data fragment can be transmitted before deletion or a time period before deletion.

14. The computer readable storage medium of claim 11, wherein the instructions cause the one or more processors to calculate the TTL based on at least one of power of the IoT device or a network node count.

15. The computer readable storage medium of claim 11, wherein the instructions cause the one or more processors to track at least one of inbound data request or outbound data requests in a data historian.

16. The computer readable storage medium of claim 11, wherein the instructions cause the one or more processors to adjust a size of the cache based on a frequency of data accesses to the cache.

17. The computer readable storage medium of claim 11, wherein the instructions cause the one or more processors to select a storage type selected based on a frequency of data accesses to the cache.

18. An IoT device comprising:

means for classifying to classify a data fragment as inbound data, outbound data, or cache data; and means for generating to generate a hash key of the data fragment;

means for updating to, when the hash key is in a data store, update the data store based on a portion of the data fragment that differs from a stored data fragment corresponding to the hash key; and the means for updating to, when the hash key is not in the data store, store the data fragment of the inbound data in the data store; and means for calculating to calculate a time-to-live (TTL) for the data fragment based on resources of the IoT device, the TTL identifying when the data fragment will be invalidated, the TTL calculated as at least one of a number of hops the data fragment can be transmitted before deletion or a time period before deletion;

means for transmitting to transmit the data fragment to a target node; and means for adjusting a size of a cache based on a frequency of data accesses to the cache.

19. The IoT device of claim 18, further including means for selecting to select a storage type based on the frequency of data accesses to the cache.

20. The IoT device of claim 18, wherein calculating means is to calculate the TTL based on at least one of power of the IoT device or a network node count.

* * * * *